US012682330B2

(12) United States Patent
Kolchin

(10) Patent No.: US 12,682,330 B2
(45) Date of Patent: Jul. 14, 2026

(54) IN-STREAMING APPLICATION FOR FINANCIAL SERVICES FOR LLM-BASED OPERATING SYSTEMS

(71) Applicant: iWallet, Inc., San Francisco, CA (US)

(72) Inventor: Dmitriy Kolchin, Rolling Hills Estates, CA (US)

( * ) Notice: Subject to any disclaimer, the term of this patent is extended or adjusted under 35 U.S.C. 154(b) by 191 days.

(21) Appl. No.: 18/423,428

(22) Filed: Jan. 26, 2024

(65) Prior Publication Data

US 2024/0202687 A1 Jun. 20, 2024

Related U.S. Application Data

(63) Continuation of application No. 18/423,403, filed on Jan. 26, 2024, and a continuation-in-part of application No. 18/368,046, filed on Sep. 14, 2023, and a continuation-in-part of application No. 18/200,663, filed on May 23, 2023, and a continuation-in-part of application No. 18/090,866, filed on Dec. 29, 2022, and a continuation-in-part of application No. 17/985,419, filed on Nov. 11, 2022, and a continuation-in-part of application No. 17/882,916, filed on Aug. 8, 2022, and a continuation-in-part of application No. 17/398,590, filed on Aug. 10, 2021.

(51) Int. Cl.

| | |
|---|---|
| ***G06Q 20/10*** | (2012.01) |
| ***G06N 3/0455*** | (2023.01) |
| ***G06Q 20/04*** | (2012.01) |
| ***G06Q 20/32*** | (2012.01) |

(52) U.S. Cl.

CPC ......... *G06Q 20/108* (2013.01); *G06N 3/0455* (2023.01); *G06Q 20/042* (2013.01); *G06Q 20/105* (2013.01); *G06Q 20/3223* (2013.01); *G06Q 20/3276* (2013.01)

(58) Field of Classification Search

None

See application file for complete search history.

(56) References Cited

U.S. PATENT DOCUMENTS

| | | | |
|---|---|---|---|
| 10,628,825 | B2 | 4/2020 | Tavares |
| 11,288,657 | B1 | 3/2022 | Lewis et al. |
| 2005/0133588 | A1 | 6/2005 | Williams |
| 2009/0150294 | A1 | 6/2009 | March et al. |

(Continued)

OTHER PUBLICATIONS

Wei et al.; An anonymity improvement scheme of Secure Electronic Transactions protocols (Year: 2010).*

*Primary Examiner* — Nilesh B Khatri
*Assistant Examiner* — Yin Y Choi
(74) *Attorney, Agent, or Firm* — Law Office of Ilya Libenzon

(57) ABSTRACT

A method for preventing and analyzing fraud in financial services includes the steps of: continuously collecting multimodal data from a plurality of independent channels, including visual, auditory, and tactile data; analyzing the multimodal data using a Large Language Model (LLM) based operating system and fraud prevention modules to detect and prevent fraudulent activities; integrating third-party data from external sources to enhance contextual understanding and improve fraud detection accuracy; and communicating with users through any of the modalities to address potential fraud concerns or obtain additional verification.

5 Claims, 34 Drawing Sheets

(56) References Cited

U.S. PATENT DOCUMENTS

| | | | |
|---|---|---|---|
| 2013/0191250 | A1* | 7/2013 | Bradley et al. |
| 2021/0264429 | A1 | 8/2021 | Kramme et al. |
| 2023/0214925 | A1* | 7/2023 | Cella et al. |
| 2024/0054233 | A1* | 2/2024 | Ohayon et al. |
| 2025/0118432 | A1* | 4/2025 | Welser, IV et al. |

* cited by examiner

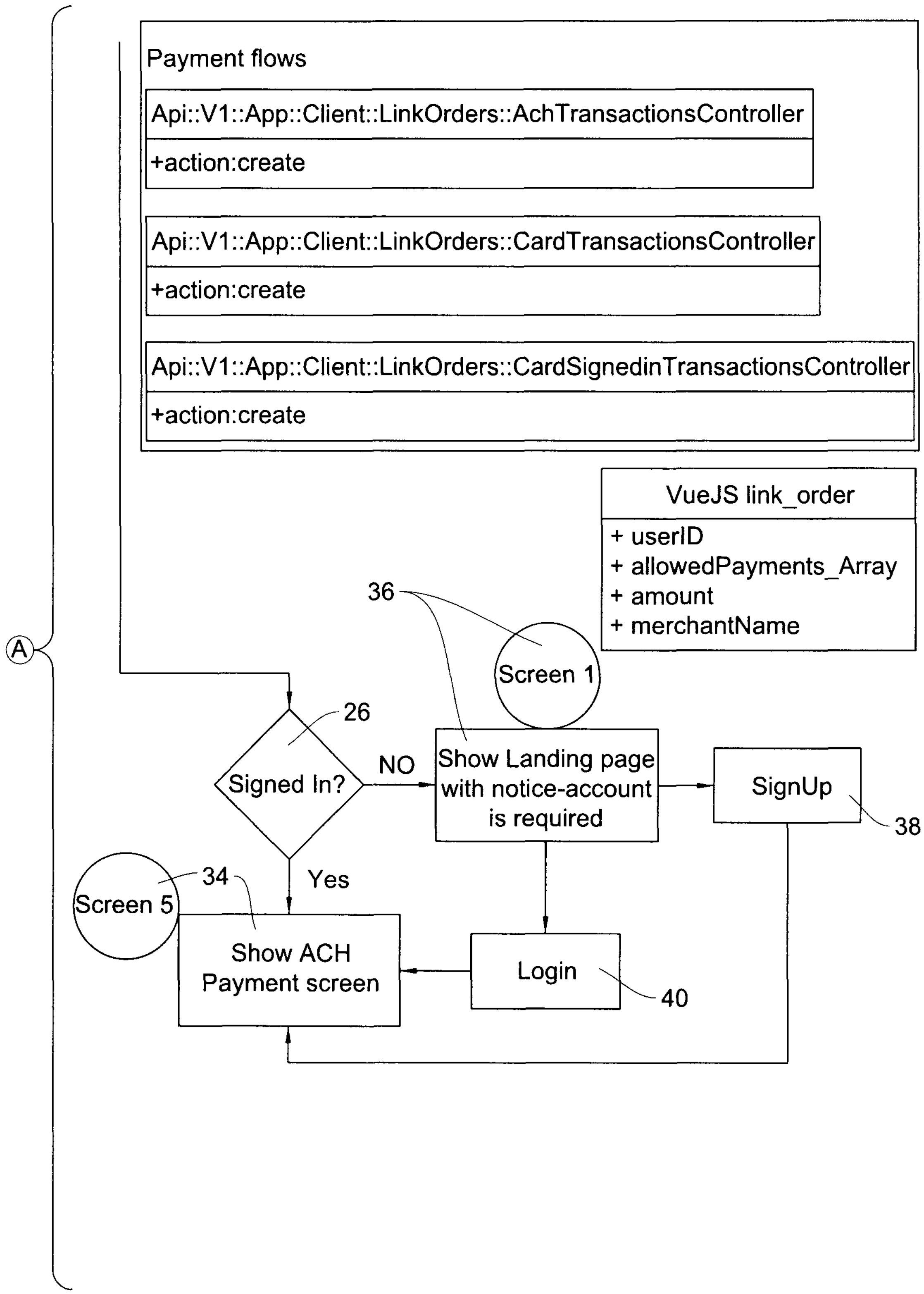
FIG. 2 (CONTINUATION)

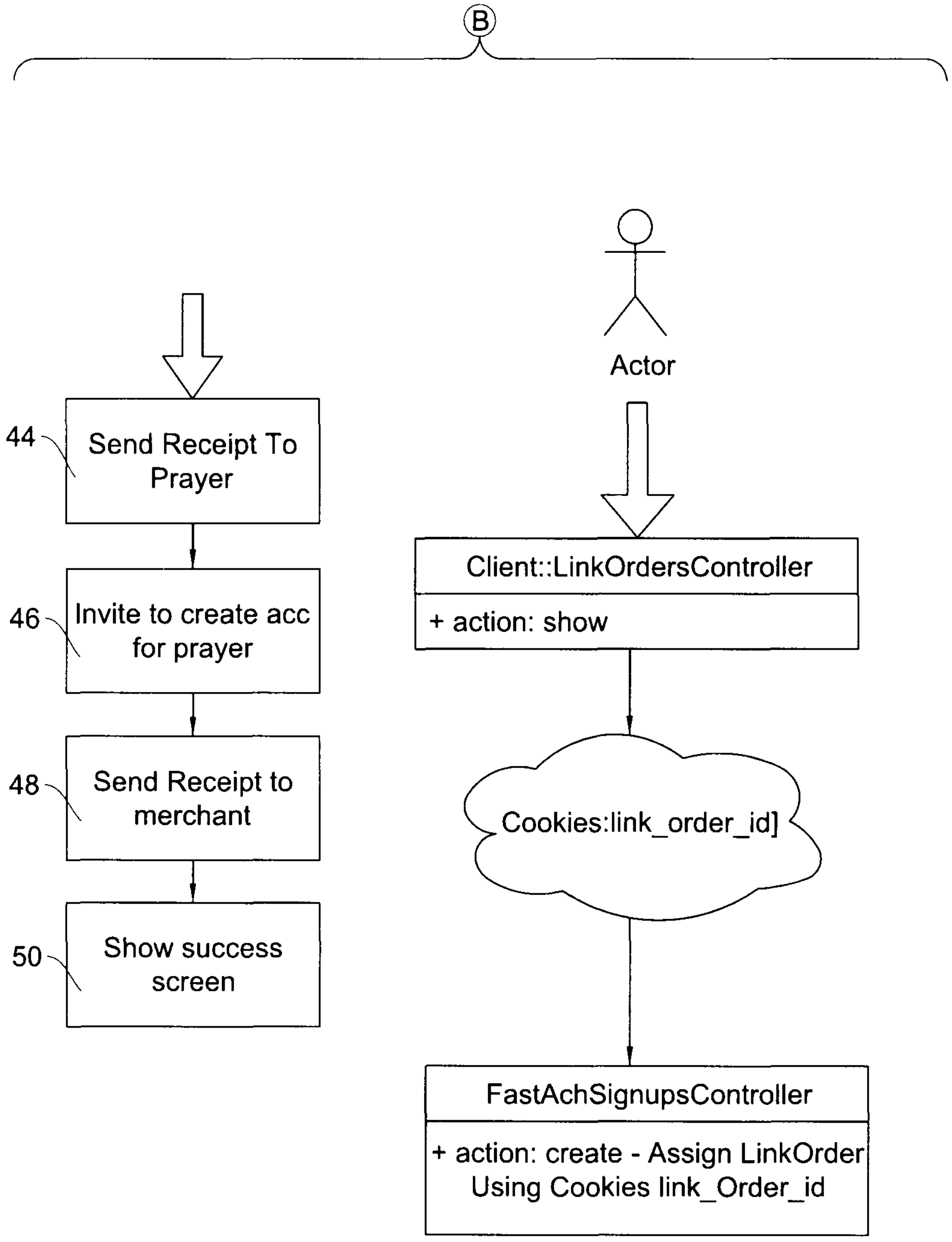
FIG. 2 (CONTINUATION)

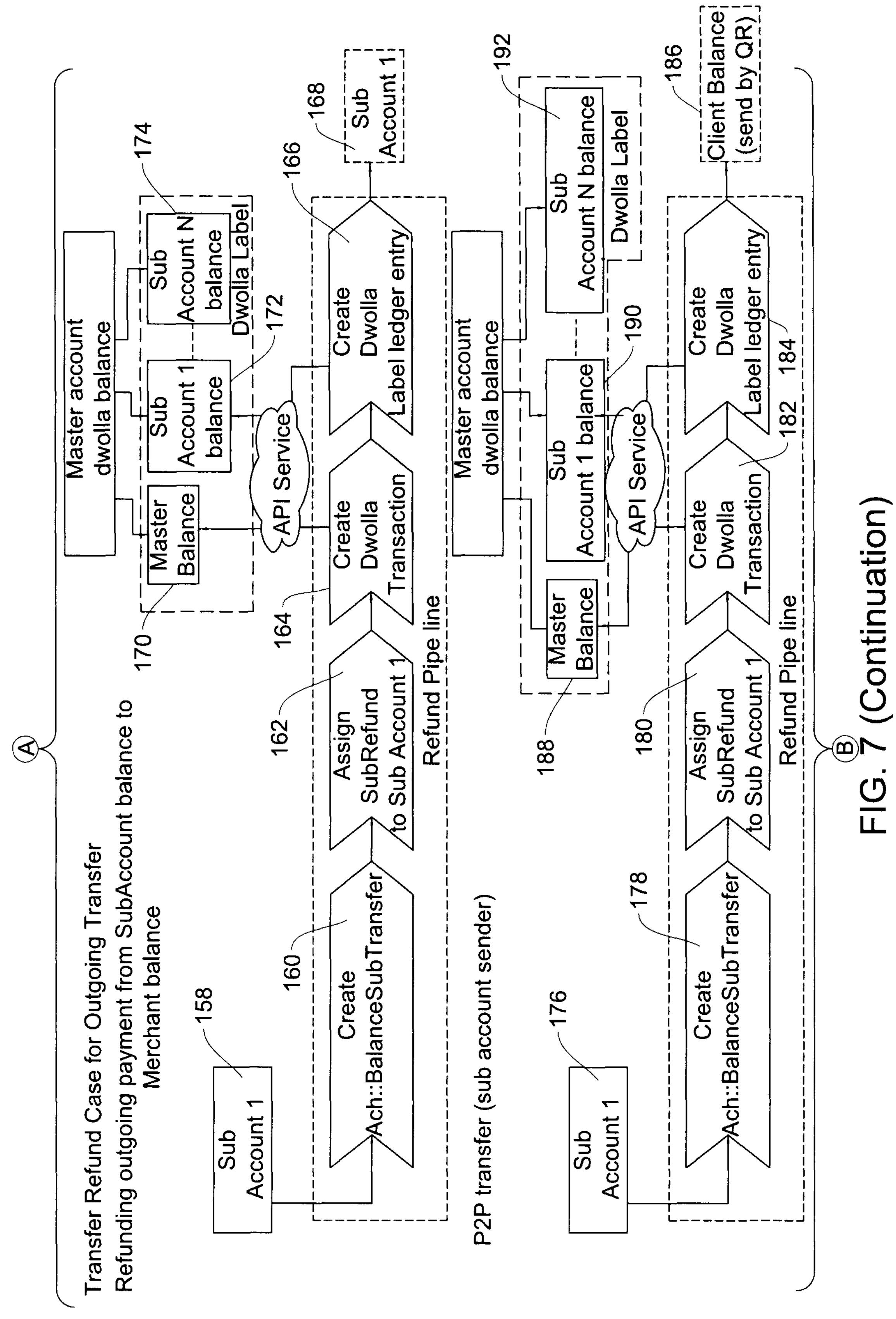
FIG. 7 (Continuation)

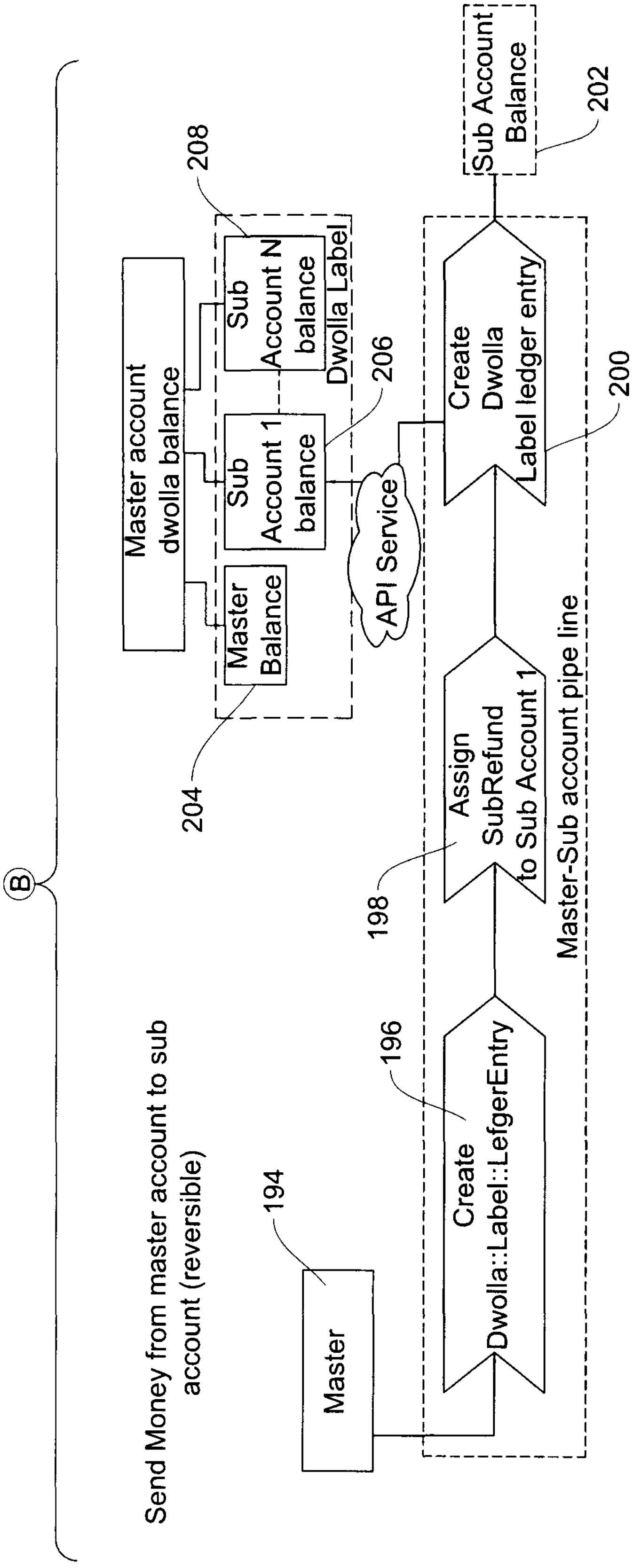
FIG. 7 (Continuation)

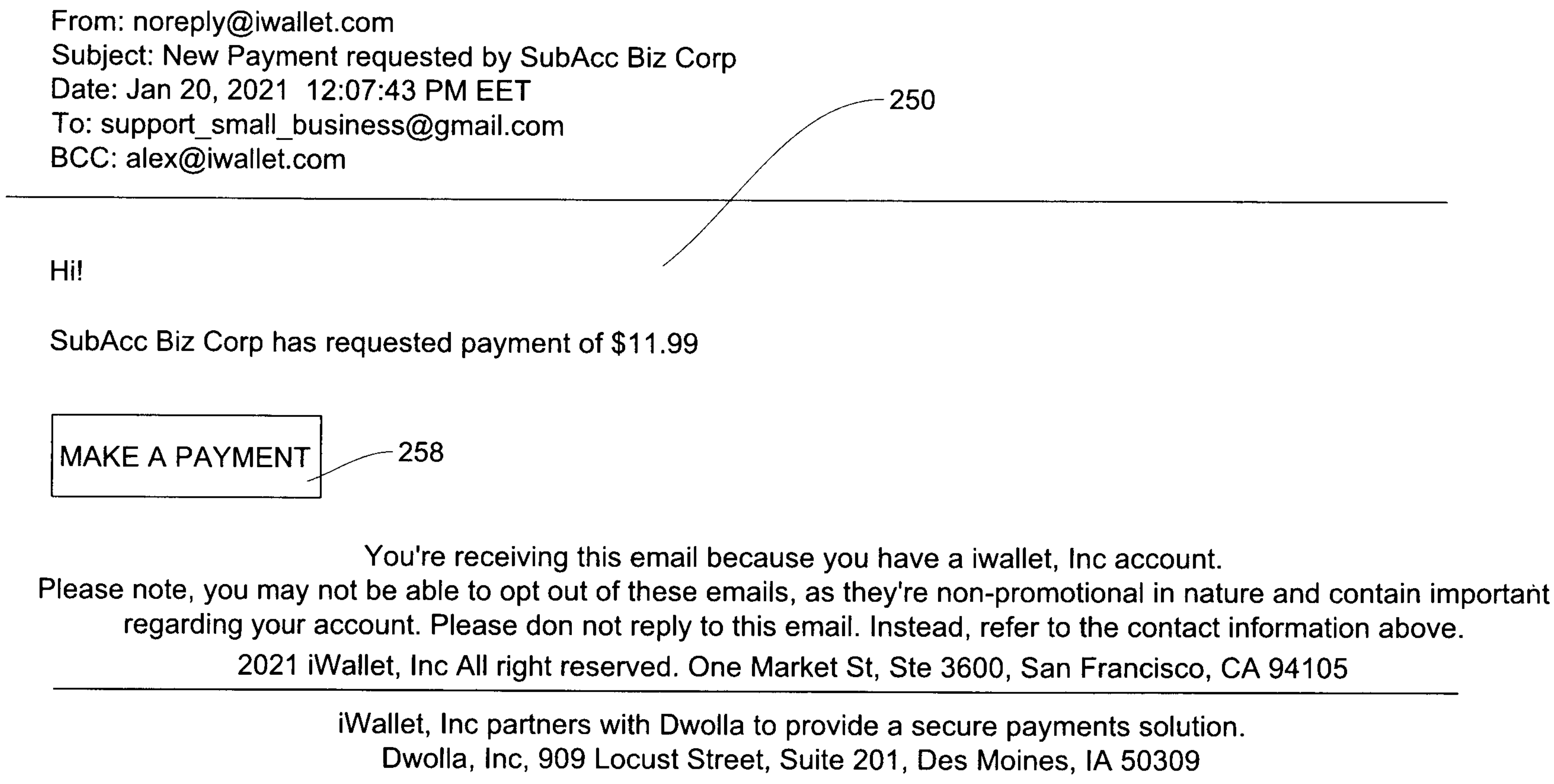

FIG. 10A

From: noreply@iwallet.com
Subject: New Payment requested by SubAcc Biz Corp
Date: Jan 20, 2021  12:07:43 PM EET
To: support_small_business@gmail.com
BCC: alex@iwallet.com

250

Hi!

SubAcc Biz Corp has requested payment of $11.99

| MAKE A PAYMENT | 258

You're receiving this email because you have a iwallet, Inc account.
Please note, you may not be able to opt out of these emails, as they're non-promotional in nature and contain important regarding your account. Please don not reply to this email. Instead, refer to the contact information above.
2021 iWallet, Inc All right reserved. One Market St, Ste 3600, San Francisco, CA 94105 iWallet, Inc partners with Dwolla to provide a secure payments solution.
Dwolla, Inc, 909 Locust Street, Suite 201, Des Moines, IA 50309

FIG. 10B
iWallet
iWallet
Payment
$11.99
to:Local Corp Inc
256
PAY WITH SECURED E-CHECK
No Fee
PAY WITH CREDIT CARD
(3.5%+30c fee)
Home
Acitivity
Scan to pay
Profile
Map

FIG. 10D
iWallet
Payment Successful
$11.99
Gross amount $11.99| iWallet fee $0.00
Order total $11.99 Paid to
Local Corp Inc
Auto code: 68075E| Jan 23, 1:51AM
254
Home
Acitivity
Scan to pay
Profile
Map

300

S310

Identifying a first payment source account and a second account held by an account holder

S320

Receiving transaction data associated with a transaction initiated by the account holder with a merchant using the first payment source account

S330

Requesting via a first network a first transfer of the transaction amount from the first payment source account within a predetermined time

S340

Performing, by a computing system, a pre- authorization charge of the second account in a pre-authorized amount

S350

Transferring the transaction amount to pay the merchant

S360

If the first transfer is not completed within the predetermined time, requesting via the second network a second transfer of the pre-authorized amount from the second account

S370

Releasing the pre-authorization charge of the second account if the transaction amount was successfully transferred from the first account within the predetermined time

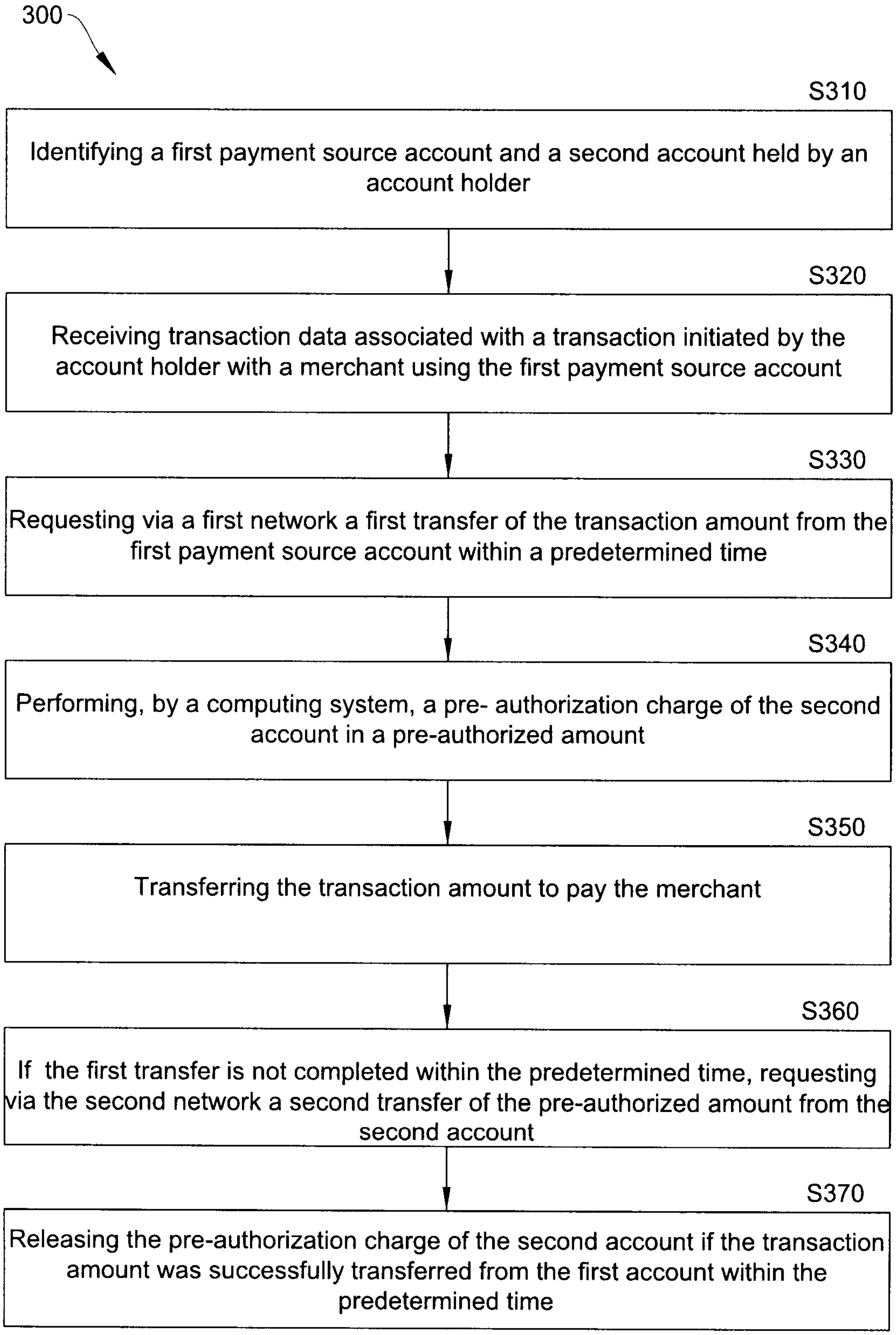

S410
receiving a request, from a user, to perform a transaction with a merchant

S420
generating a virtual check comprising a checking account number, a bank routing number, and a date S430
displaying the virtual check on at least one of a display of an electronic device of a user or the merchant S440
receiving input from the user corresponding to at least one of a plurality of check fields S450
receiving a virtual signature from the user S460
encrypting the virtual signature S470
storing the encrypted virtual signature in a database

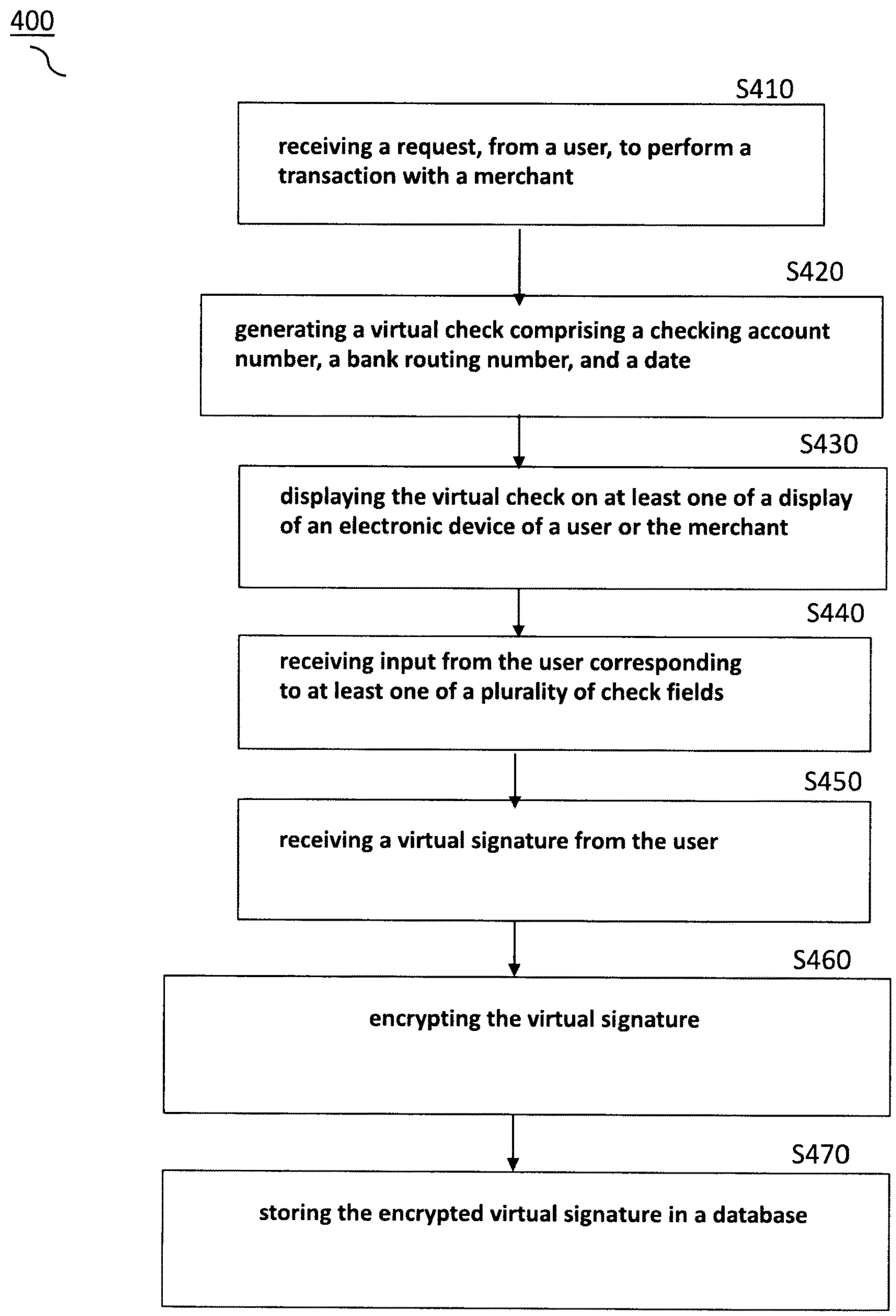

FIG. 17

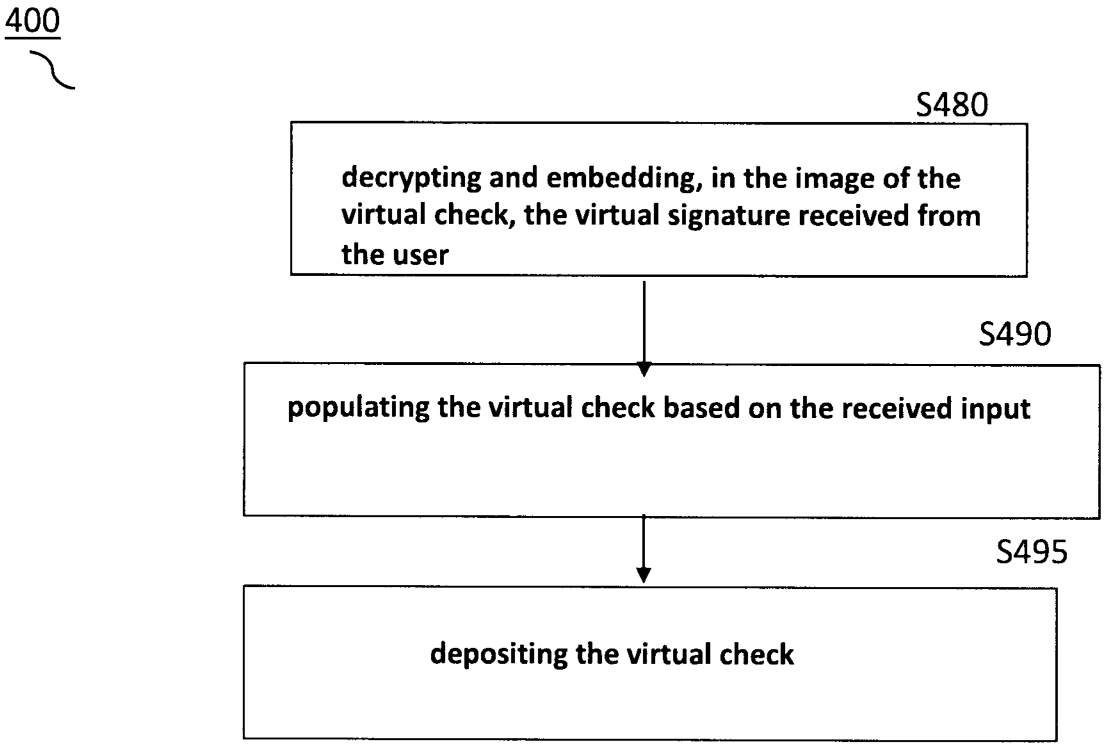
FIG. 17 (continuation)

Process Step (200)
Capture card/check image and store GPS location in image metadata

Process Step (210)
Pre-validate image: (A) FFT blur detection; (B) glare thresholding

OK?

Process Step (212)
If not OK, prompt retake; repeat pre-validation

No

Yes

Process Step (220)
Transmit link via SMS/email; receive virtual signature; store signature metadata incl. GPS

Process Step (230)
Compare GPS locations; determine card-present when within predetermined distance

Process Step (240)
Read NFC chip; decode TLV records incl. tag 0x5A; extract PAN/expiration

Process Step (250)
Perform zero-dollar transaction to verify card validity and store token

Process Step (260)
Extract device ID/phone number; collect sensor proof-of-transaction signals

Process Step (270)
Generate risk assessment data using transaction data and third-party data

Process Step (280)
Send token and risk assessment data to processor/payment network for authorization

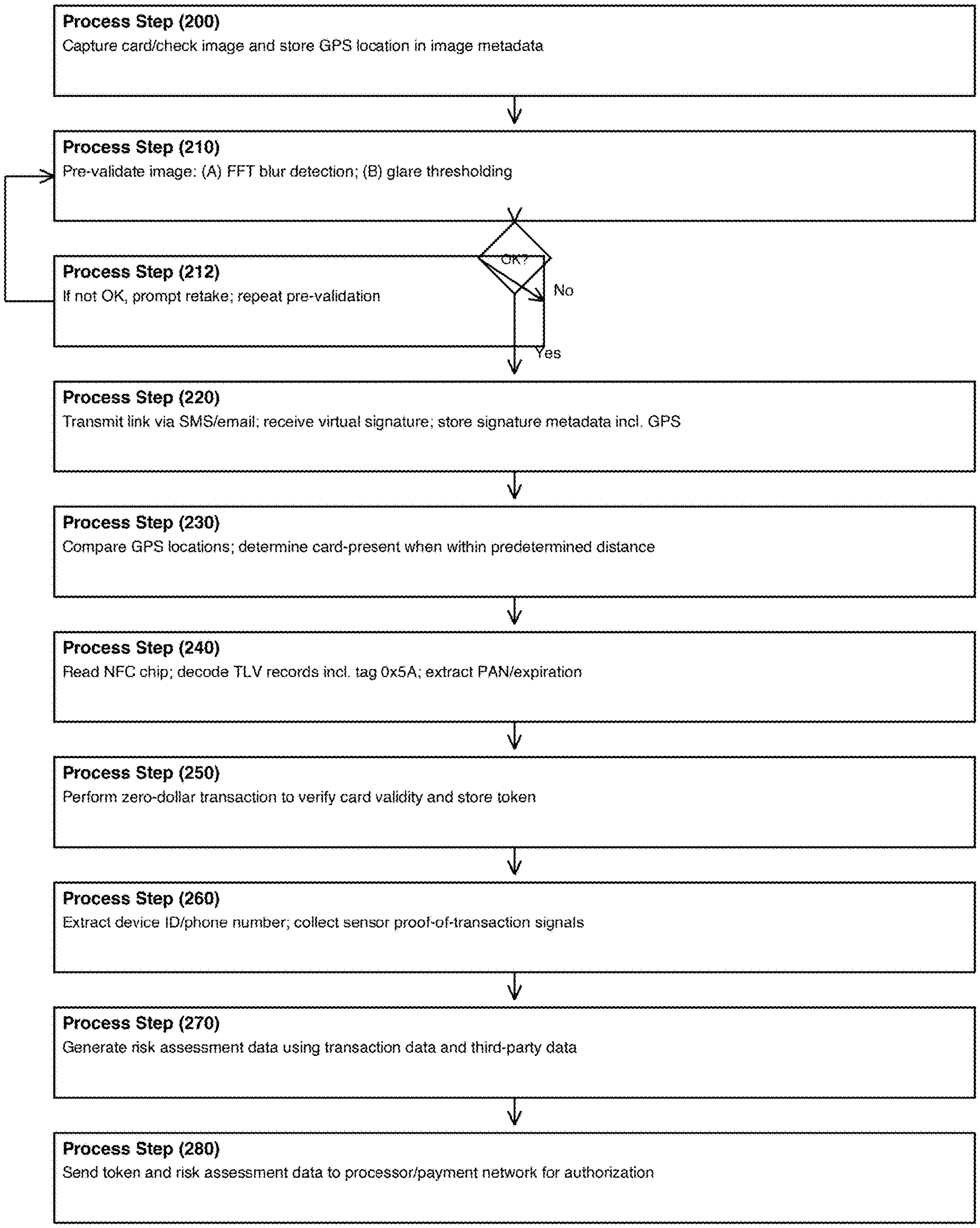

FIG. 20

IN-STREAMING APPLICATION FOR FINANCIAL SERVICES FOR LLM-BASED OPERATING SYSTEMS

TECHNICAL FIELD

The present invention relates to a system and computer-implemented methods for conducting secure electronic financial transactions.

BACKGROUND ART

Electronic transactions make it possible to conduct a payment efficiently and with minimal physical interaction between a consumer and a merchant. However, electronic transactions come with a number of risks to both the merchant and the consumer. Since surcharge fees laws changed, a consumer can be responsible for paying the processing fee. These processing fees can vary depending on the card chosen for the transaction, meaning that a consumer could pay a high fee when a lower fee was possible. In addition, surcharging does not work for tips collected at a restaurant because a restaurant cannot add a fee on top of the tips on the check after the consumer has left the building.

Also commonly used are automated clearing house (ACH) transactions. ACH is a form of electronic payment. Specifically, ACH is an electronic fund transfer through an ACH network including the Federal Reserve Bank from one account to another account, such as to a checking or savings account. ACH is typically used to process payments for settlement within a period of time, such as a few business days. ACH transactions are settled in a manner similar to the way checks are settled. The clearinghouse takes all ACH files received daily from its member banks, sorts them by the originating bank (the bank where the check was cashed or deposited) and the paying bank (the bank against which the check was drawn), totals the accounts, and credits or debits appropriate accounts accordingly.

When the transaction is an automated clearing house (ACH) transaction, there is a risk that the transaction will not finalize because it takes days to process an ACH transaction. The use of applications on computing devices allow for these electronic transactions to be calculated in real-time meaning that tips can be calculated in real-time on the customer's phone. This is further possible because information from the bank identification number (BIN) and other data make it possible to detect the fee in real time.

Therefore, there is a need for a system that calculates electronic transactions and their respective surcharges in real-time as well as a system that secures payment when the original payment does not go through.

SUMMARY OF THE EMBODIMENTS

A multimodal financial transaction system is disclosed. The system includes a. A Large Language Model (LLM) based operating system configured to continuously analyze a context window for multimodal triggers; b. A plurality of payment processing modules integrated into said LLM-based operating system, wherein said payment processing modules include: i. A paper check processing module utilizing LLM processing; ii. A credit card processing module utilizing LLM processing; iii. A mobile payment processing module utilizing LLM processing; iv. A QR code processing module utilizing LLM processing; and v. A bank transfer processing module utilizing LLM processing; and c. A plurality of modalities facilitating diverse channels of input and output between the LLM-based operating system and a user, said modalities including: i. Vision modality for computer graphics through a screen; ii. Audition modality for various audio outputs; iii. Tactition modality for vibrations or other movement; iv. Gustation modality for taste; v. Olfaction modality for smell; vi. Thermoception modality for heat; vii. Nociception modality for pain; and viii. Equilibrioception modality for balance.

A method for conducting multimodal financial transactions is also disclosed. The method includes: a. Analyzing a context window using a Large Language Model (LLM) based operating system to identify multimodal triggers; b. Selecting an appropriate payment processing module from a plurality of modules, each associated with different payment methods, based on the identified multimodal triggers; c. Initiating a financial transaction utilizing the selected payment processing module; d. Facilitating diverse channels of input and output between the LLM-based operating system and a user through a plurality of modalities.

A system for interactive communication with users within an in-streaming financial transaction includes a. A Generative Artificial Intelligence (Generative AI) module capable of generating dynamic and context-aware content in various formats, including text, image, video, sound, or combinations thereof; b. An in-streaming financial transaction application integrated with said Generative AI module, wherein the Generative AI module is configured to communicate with users in real-time during financial transactions; c. A communication interface enabling the exchange of information between the Generative AI module and the in-streaming financial transaction application; d. A database storing user profiles, transaction history, and contextual information for facilitating personalized communication through the Generative AI module; and e. A user interaction module within the in-streaming financial transaction application allowing users to engage in a dynamic conversation with the Generative AI module, wherein the conversation pertains to financial services, transaction details, and additional offers.

A method for interactive communication within an in-streaming financial transaction application, includes: a. Employing a Generative AI module to dynamically generate context-aware content in response to user interactions during financial transactions; b. Communicating with users in real-time through the in-streaming financial transaction application, wherein the Generative AI module tailors responses based on user profiles, transaction history, and contextual information; and c. Facilitating a dynamic conversation between users and the Generative AI module, wherein the conversation includes discussions related to financial services, transaction details, and personalized offers.

According to an embodiment of the present invention, a fraud prevention and analysis system for financial services, includes: a. A Large Language Model (LLM) based operating system configured to continuously analyze multimodal data from a plurality of independent channels, said multimodal data comprising: i. Vision data from visual sensors or cameras for capturing images or videos; ii. Auditory data from audio sensors or microphones for processing various audio outputs; iii. Tactile data from tactile sensors or devices capable of detecting vibrations or movement; iv. Gustatory data incorporating taste; v. Olfactory data incorporating smell; vi. Thermoceptive data sensing heat; vii. Nociceptive data recognizing pain; and viii. Equilibrioceptive data maintaining balance; b. A plurality of fraud prevention modules integrated into the LLM-based operating system, wherein said modules include: i. A multimodal biometric authentication module utilizing visual, auditory, and tactile data for user identity verification; ii. A transaction anomaly detection module analyzing transaction patterns using visual, auditory, and tactile data to identify irregularities indicative of fraud; iii. A geospatial analysis module incorporating visual and auditory data to verify the user's physical location during financial transactions; iv. A behavioral analysis module utilizing visual, auditory, and tactile data to assess user behavior and identify aberrations indicative of fraudulent activity; and v. A third-party data integration module fetching external data sources for additional contextual information to enhance fraud detection accuracy; and c. A feedback mechanism facilitating communication with users through any of the modalities to address potential fraud concerns or obtain additional verification.

In some instances, a method for preventing and analyzing fraud in financial services, includes: a. Continuously collecting multimodal data from a plurality of independent channels, including visual, auditory, and tactile data; b. Analyzing the multimodal data using a Large Language Model (LLM) based operating system and fraud prevention modules to detect and prevent fraudulent activities; c. Integrating third-party data from external sources to enhance contextual understanding and improve fraud detection accuracy; and d. Communicating with users through any of the modalities to address potential fraud concerns or obtain additional verification.

Other aspects, embodiments and features of the device and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed device and method, will be better understood when read in conjunction with the attached drawings. It should be understood, however, that neither the device nor the method is limited to the precise arrangements and instrumentalities shown.

FIGS. 10A-10D show the steps taken to pay using the web-based application.

FIG. 15 is a block-diagram illustrating a method of conducting a secure financial transaction in accordance with an embodiment of the present invention.

FIG. 17 is a block-diagram illustrating a method of conducting a secure financial transaction in accordance with another embodiment of the present invention.

FIG. 20 illustrates an exemplary method flow corresponding to the claimed multimodal data acquisition, geospatial verification, OCR pre-validation, NFC processing, tokenization, and fraud analysis operations.

DETAILED DESCRIPTION OF SPECIFIC EMBODIMENTS

Some embodiments of the disclosed system and methods will be better understood by reference to the following comments concerning computing devices. A "computing device" 100 may be defined as including personal computers, laptops, tablets, smart phones, and any other computing device capable of supporting an application as described herein. The system and method disclosed herein will be better understood in light of the following observations concerning the computing devices that support the disclosed application, and concerning the nature of web applications in general.

Figure 4:
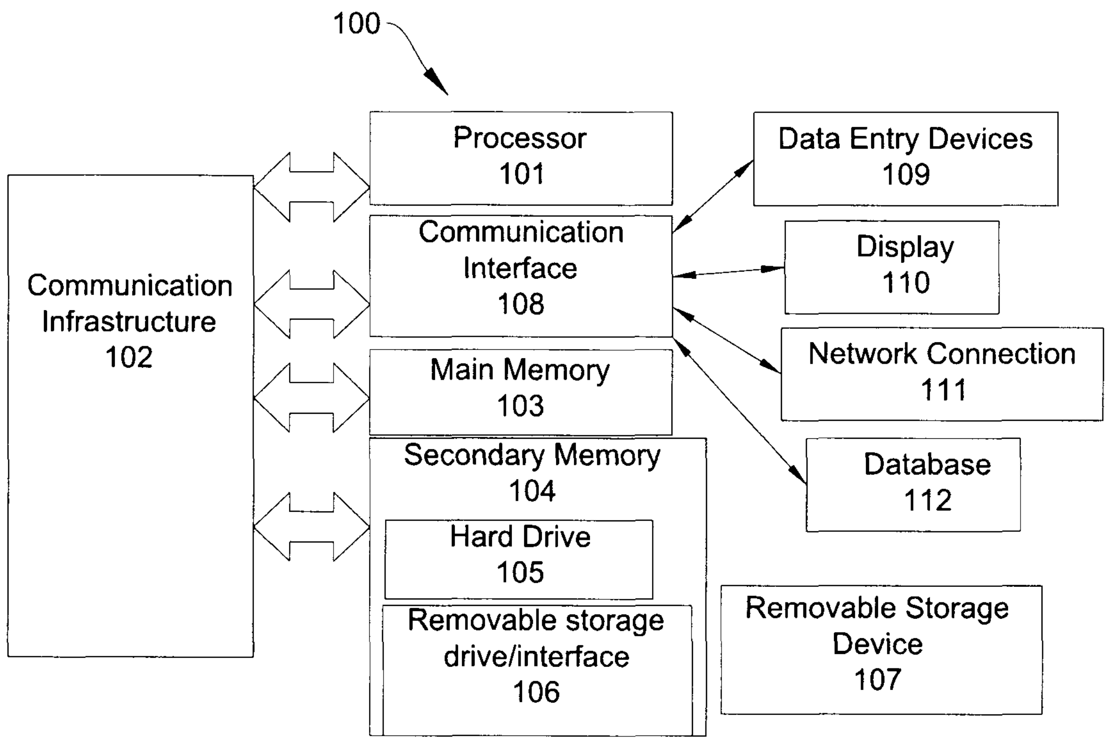
FIG. 4 is a block diagram depicting an example of a computing device as described herein.

Referring now to the drawings in detail. An exemplary computing device is illustrated by FIG. 4. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices" 109 are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers. In some embodiments, a computing device's "display" 109 is a device coupled to the computing device, by means of which the computing device can display images. Display includes without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system. Where embodiments are implemented using software, the software may be stored in a computer program product and loaded into the computing device using a removable storage drive or interface 106, a hard disk drive 105, or a communications interface 108.

Computer program code for carrying out operations of the present invention may be written in an object oriented programming language such as, but not limited to, Java, Smalltalk or C++. However, the computer program code for carrying out operations of the present invention may also be written in conventional procedural programming languages such as the "C" programming language. Computer readable program instructions for carrying out operations of the present invention may also be assembler instructions, instruction-set-architecture (ISA) instructions, machine instructions, machine dependent instructions, microcode, firmware instructions, state-setting data, or either source code or object code written in any combination of one or more programming languages described above. In some instances, the computer readable program can be executed in the reverse order, depending upon the functionality involved. It will also be noted that each block of the flowchart illustrations, and combinations of blocks in the flowchart illustrations, can be implement by special purpose hardware-based systems that perform the specified functions or acts or carry out combinations of special purpose hardware and computer instructions.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The computing device 100 may employ one or more security measures to protect the computing device 100 or its data. For instance, the computing device 100 may protect data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext may be unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Figure 5:
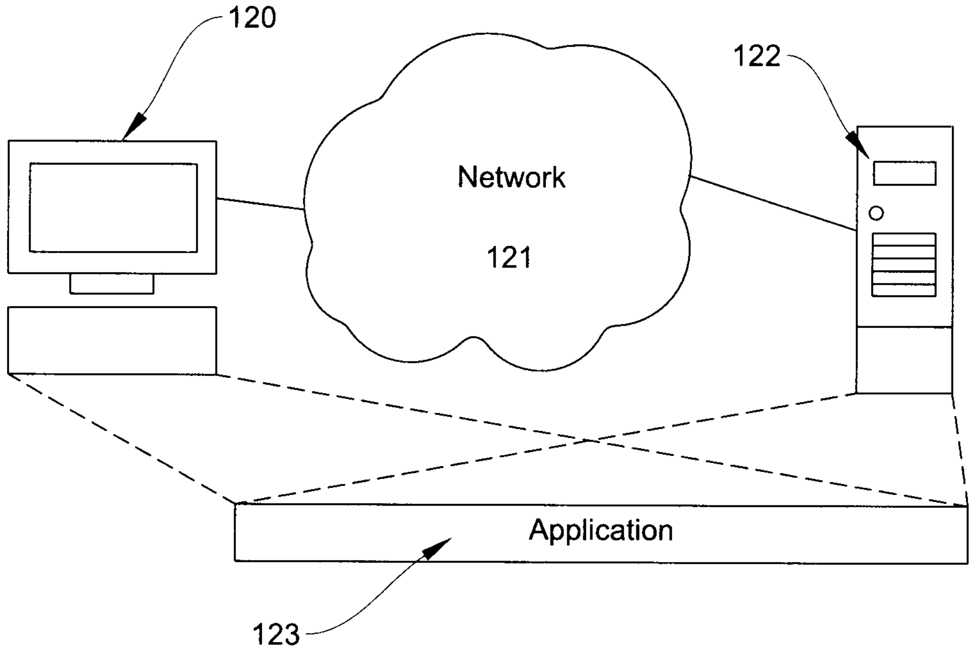
FIG. 5 is a block diagram depicting an example of a network-based platform, as described herein.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 5. Web application platforms typically include at least one client device 120, which is a computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also a computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs,"

and frequently are loaded onto the browser from the server 122 at the same time as the other content the server 122 sends to the browser. However, it is also possible to write programs that do not run on web browsers but still cause a computing device to operate as a web application client 120. Thus, as a general matter, web applications 123 require some computer program configuration of both the client device (or devices) 120 and the server 122. The computer program that comprises the web application component on either computing device's system FIG. 4 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

The one or more client devices 120 and the one or more servers 122 may communicate using any protocol according to which data may be transmitted from the client 120 to the server 122 and vice versa. As a non-limiting example, the client 120 and server 122 may exchange data using the Internet protocol suite, which includes the transfer control protocol (TCP) and the Internet Protocol (IP), and is sometimes referred to as TCP/IP. In some embodiments, the client and server 122 encrypt data prior to exchanging the data, using a cryptographic system as described above. In one embodiment, the client 120 and server 122 exchange the data using public key cryptography; for instance, the client and the server 122 may each generate a public and private key, exchange public keys, and encrypt the data using each others' public keys while decrypting it using each others' private keys.

In some embodiments, the client 120 authenticates the server 122 or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum. The authorization may be the authorization to access a given process. In some embodiments, the certificate may identify the certificate authority.

The linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publicly available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity, and links the file to the entity in a verifiable way. The digital signature may be incorporated in a digital certificate, which is a document authenticating the entity possessing the private key by authority of the issuing certificate authority and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

The server 122 and client 120 may communicate using a security combining public key encryption, private key encryption, and digital certificates. For instance, the client 120 may authenticate the server 122 using a digital certificate provided by the server 122. The server 122 may authenticate the client 120 using a digital certificate provided by the client 120. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between the client 120 and the server 122; for instance, the secret may be a private key for a private key cryptographic system. The secret may be a datum from which the private key may be derived. The client 120 and server 122 may then use that private key cryptographic system to exchange information until the secure communication protocol in which they are communicating ends. In some embodiments, this handshake and secure communication protocol is implemented using the secure sockets layer (SSL) protocol. In other embodiments, the protocol is implemented using the transport layer security (TLS) protocol. The server 122 and client 120 may communicate using hyper-text transfer protocol secure (HTTPS).

Figure 1:
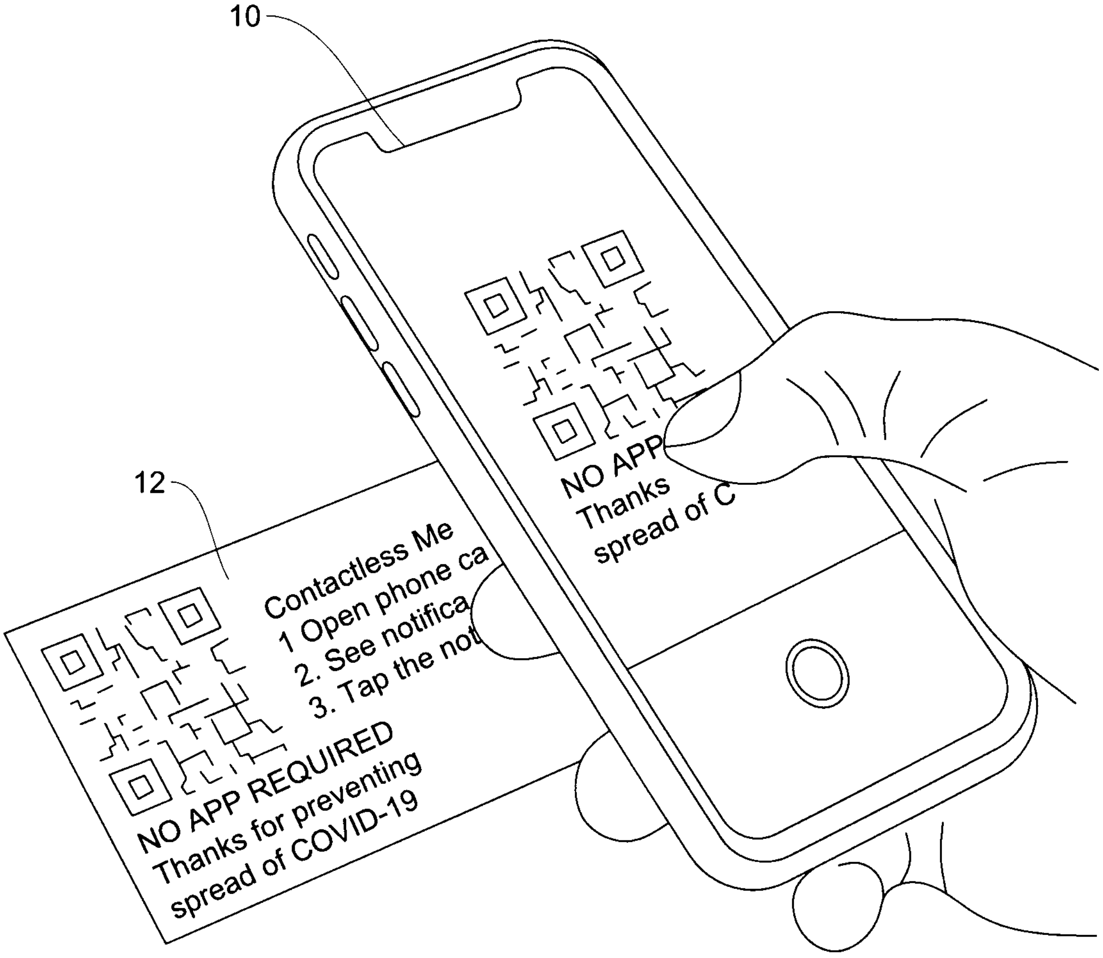
FIG. 1 is a front perspective view of a computing device initiating the electronic payment process.
Figure 6:
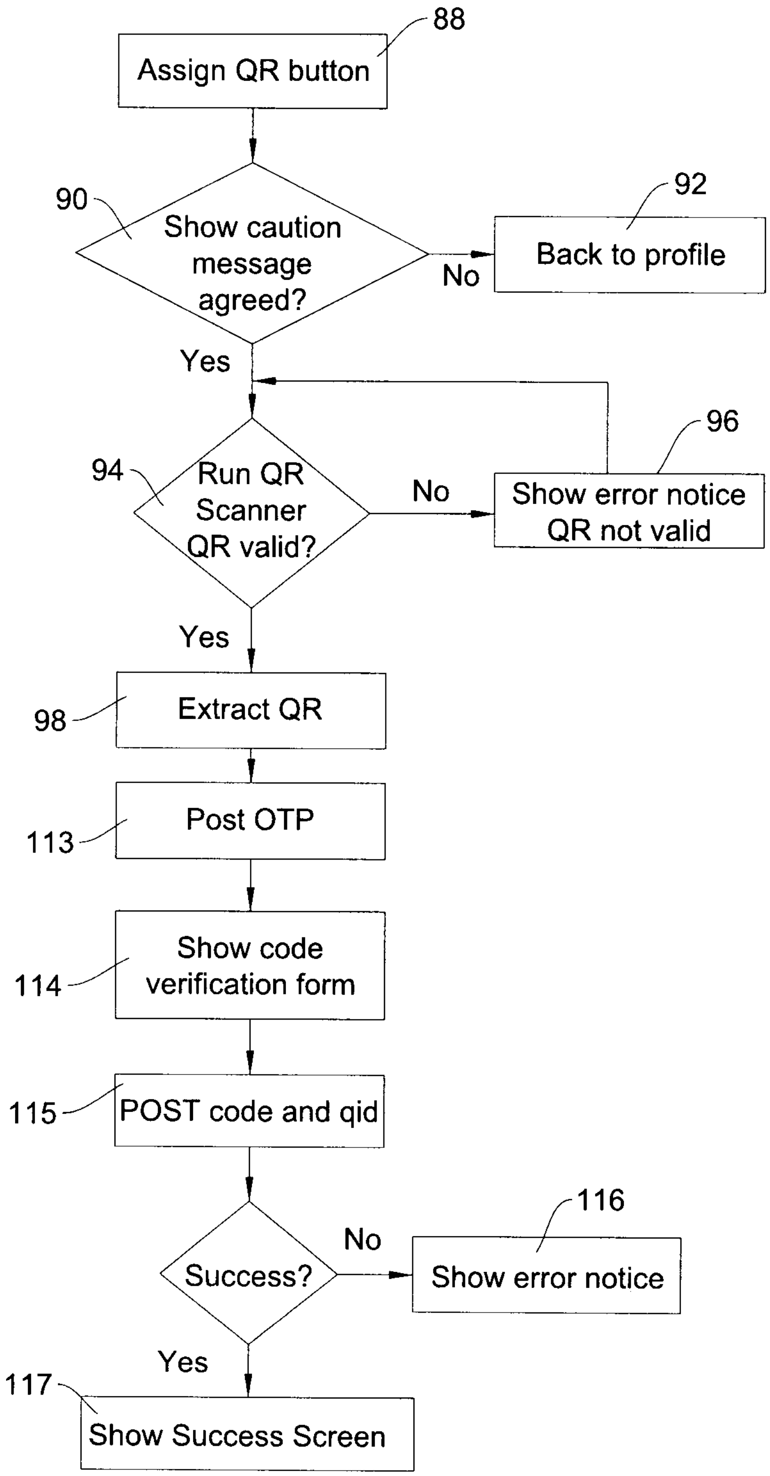
FIG. 6 shows a general flow of the process to assign a new QR-code according to various embodiments of the disclosure.

As illustrated in FIG. 1, there is shown a front perspective view of a mobile device 10 scanning the QR code on a paper card 12 using the built-in camera. In some embodiments, the QR code can be printed on other mediums such as sticker, laminate, and transparency. FIG. 6 illustrates a general flow of the process to assign a new QR code for a merchant. A QR code will contain data related to the merchant. The consumer will need to open up the software application on their mobile device 88. A caution message 90 will pop up prior to scanning the QR code. Once a consumer agrees, the built-in camera on the mobile device will scan the QR information onto the web-based application 94, 98. If the QR code is not valid, an error notice will appear 96. If the QR code is valid, the web-application will send a one-time passcode (OTP) 113 to the consumer's mobile device through an email or text. On the web-application, a code verification form will pop up 114, the OTP will need to be manually input onto the code verification form 115. If the OTP is input incorrectly, an error notice will appear 116, if the OTP is input correctly, a success screen will pop up 117.

Figure 2:
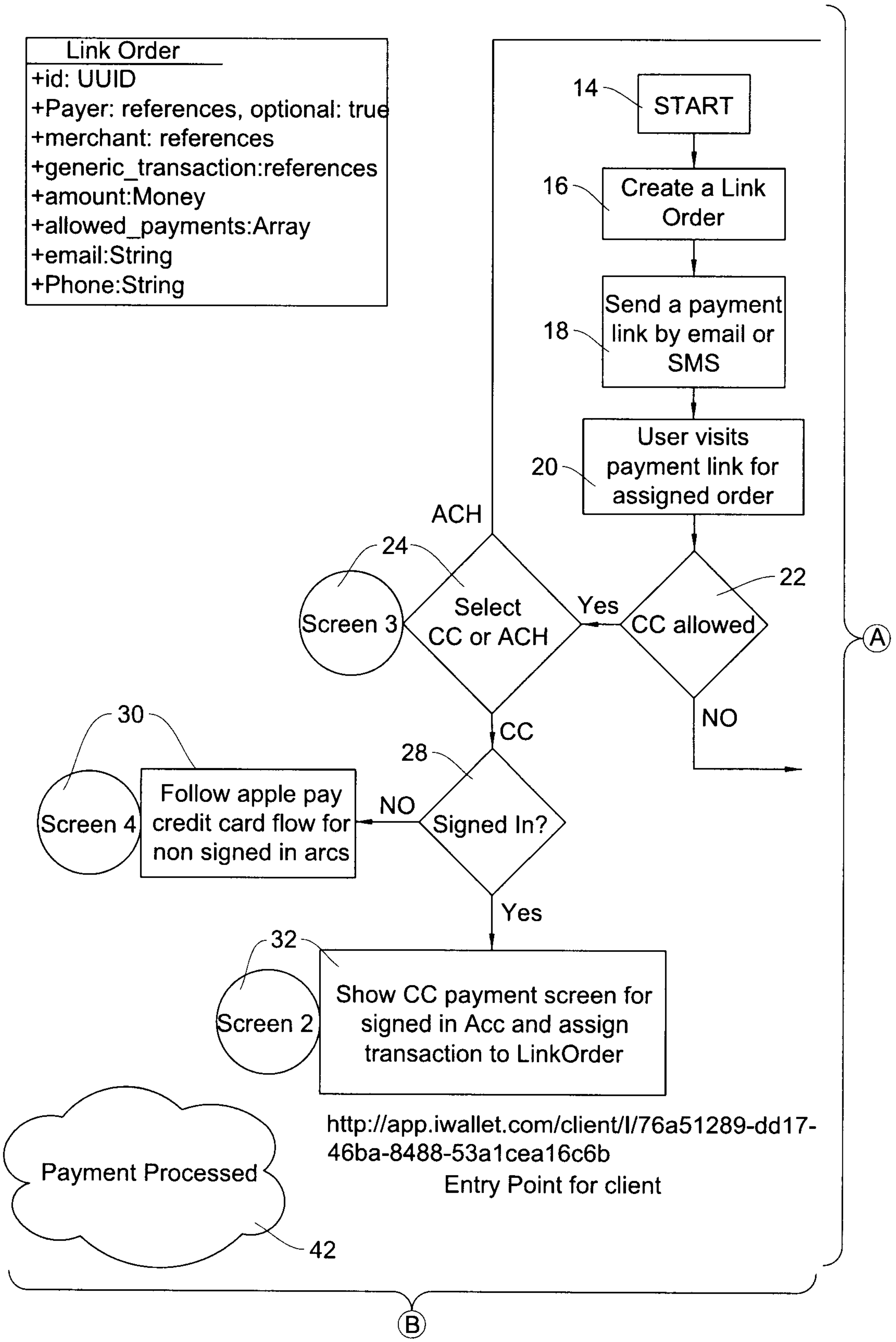
FIG. 2 shows a schematic view of a merchant-controlled payments processing link according to various embodiments of the disclosure.

FIG. 2 demonstrates a schematic view of a merchant-controlled payments processing link. The merchant creates a link 16 and sends the link by email or text 18. The user will visit the payment link for the assigned order 20. The process followed to complete the transaction will depend if a credit card is allowed 22, if the consumer selects a credit card or ACH 24, if the consumer has signed up for a consumer account 38, or if they're logged in 40. After the payment is processed 42, the consumer and merchant will receive a receipt 44 and 48.

Figure 10B:
Figure 10C:
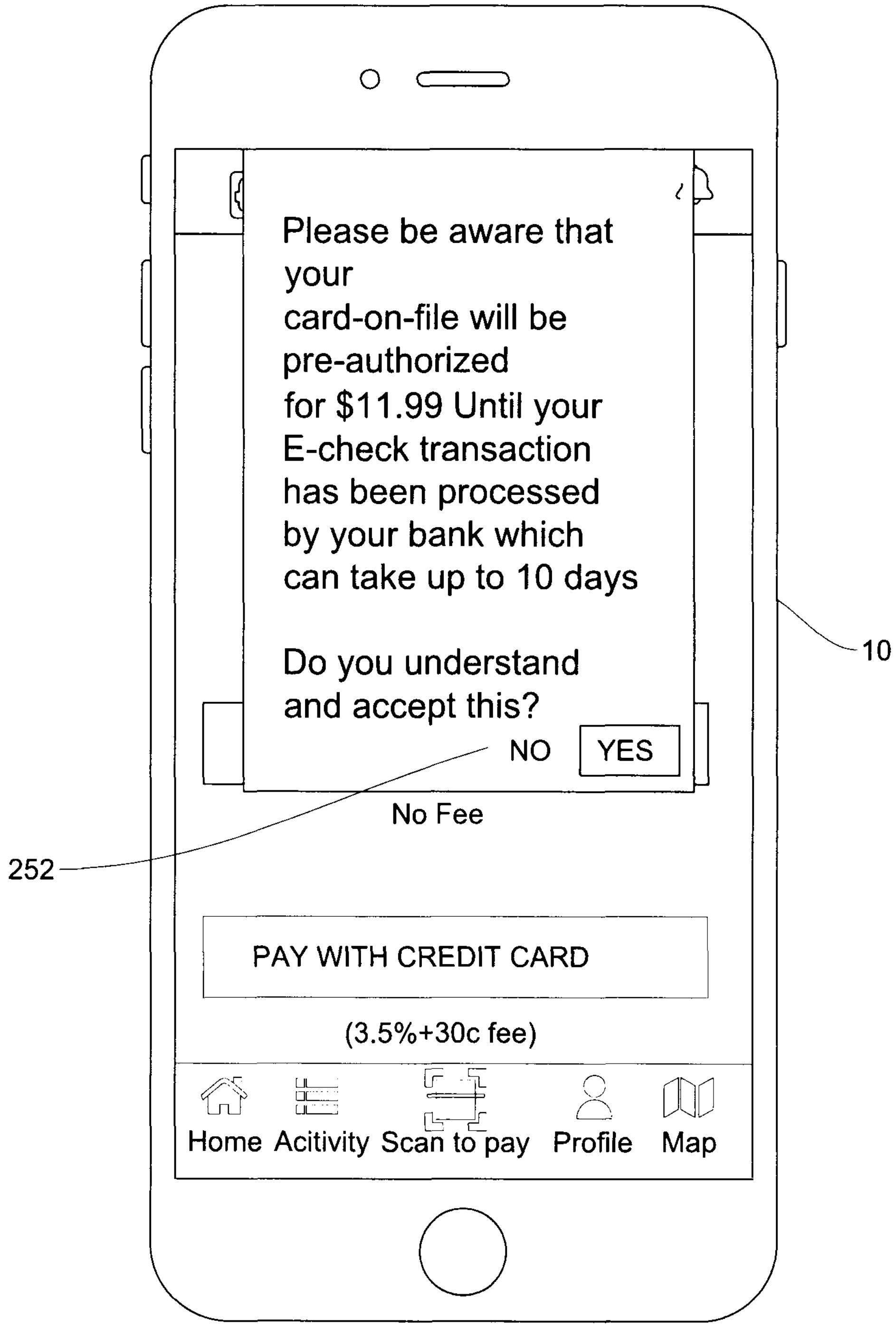
Figure 10D:

FIGS. 10A-10D depict the steps as they appear on a mobile phone. In this embodiment, the merchant sent a payment link through email 250 with a clickable button that allows for the consumer to make a payment 258. FIG. 10B displays a screen showing the requested payment with two options to complete the payment 256. According to law, there can be no additional surcharge on an ACH transaction, therefore there is no fee attached to the e-check option. The credit card option demonstrates the surcharge amount that will be added to the payment requested, therefore a consumer and merchant can determine if the transaction will be finalized and what the total charge will be. A notice appears once a payment option is selected 252. In this embodiment, the credit card option was selected as can be seen in FIG. 10C. FIG. 10D displays a payment successful screen demonstrating that the payment was finalized and instantly indicates the total charge of the electronic transaction 254.

Figure 7:
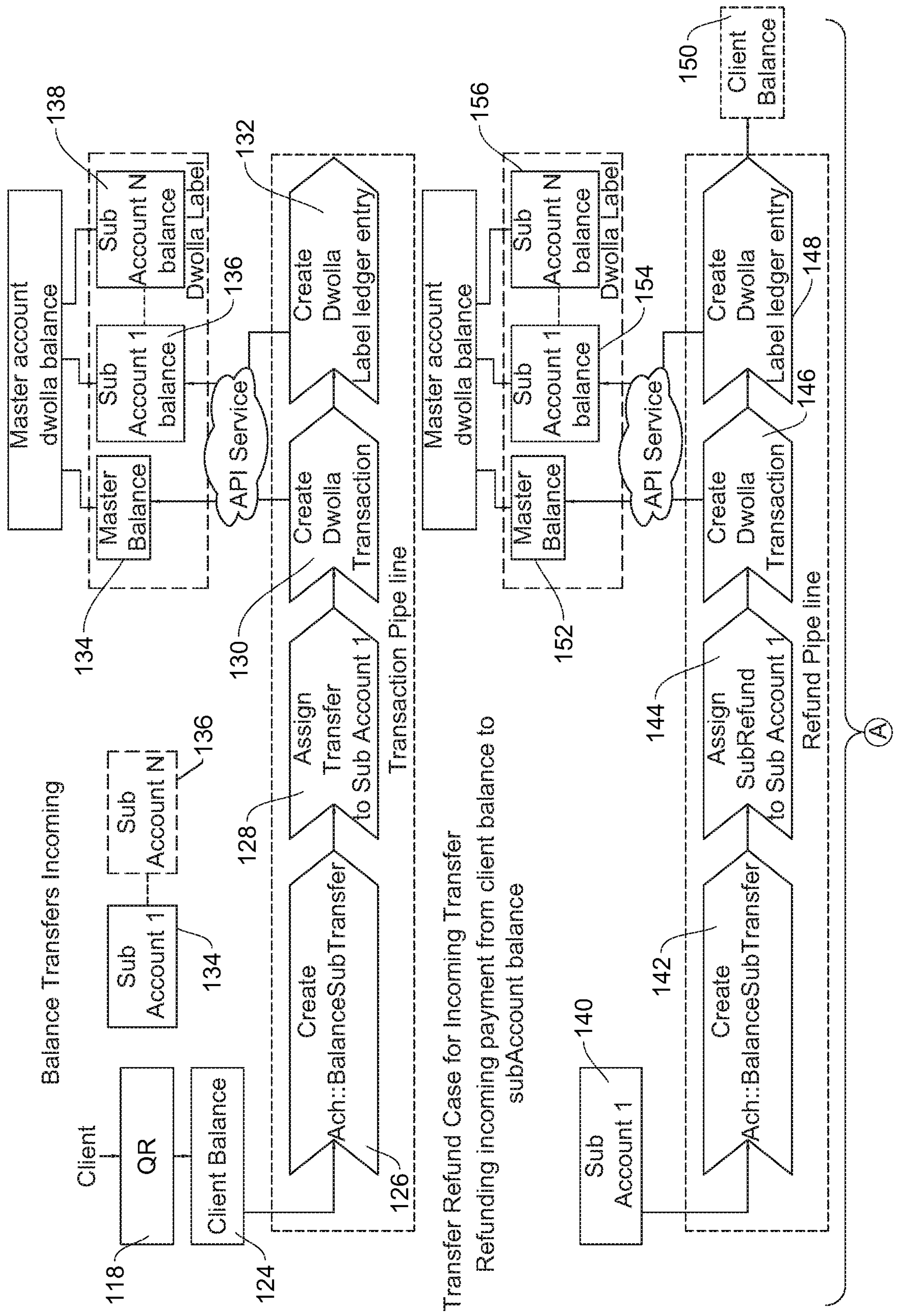
FIG. 7 depicts a schematic view of the process to create sub-accounts according to various embodiments of the disclosure.

FIG. 7 depicts a schematic view of the process to create sub-accounts. 118-138 show step by step how to create a sub account and how to transfer incoming money. 140-156 depict the steps taken to refund incoming payment from client balance to subaccount balance. 158-174 demonstrate the steps taken to refund outgoing payment from subaccount balance to merchant's balance. 176-192 demonstrates the steps taken for a p2p Pipe line transfer. 194-208 demonstrate the steps taken to send money from a master account to a sub account. This transfer can go either way thus it is reversible.

Figure 3:
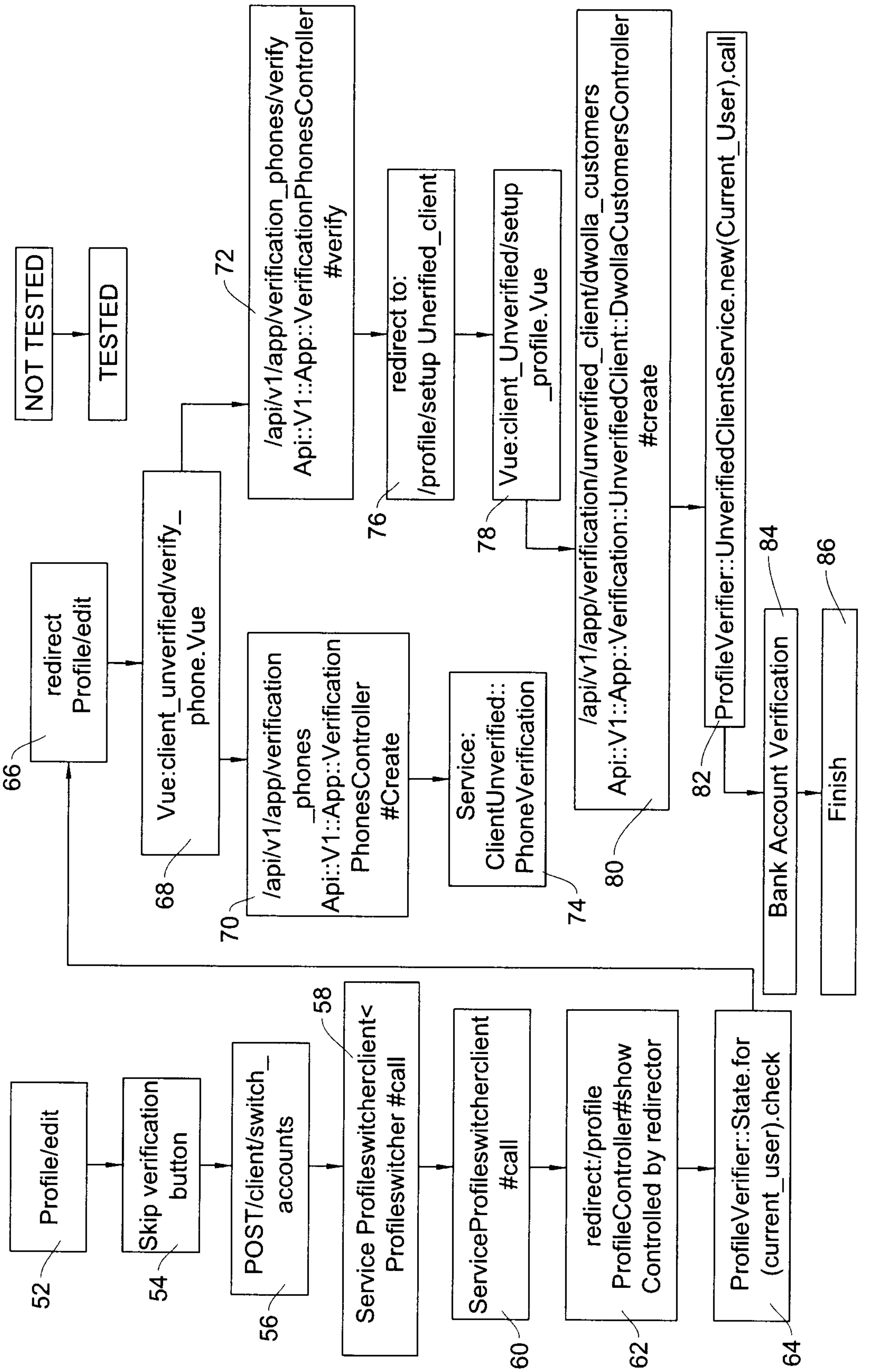
FIG. 3 depicts an exemplary flow chart that illustrates an exemplary method for returning a customer to the same profile/edit page after signing up for e-check according to various embodiments of the disclosure.
Figure 8:
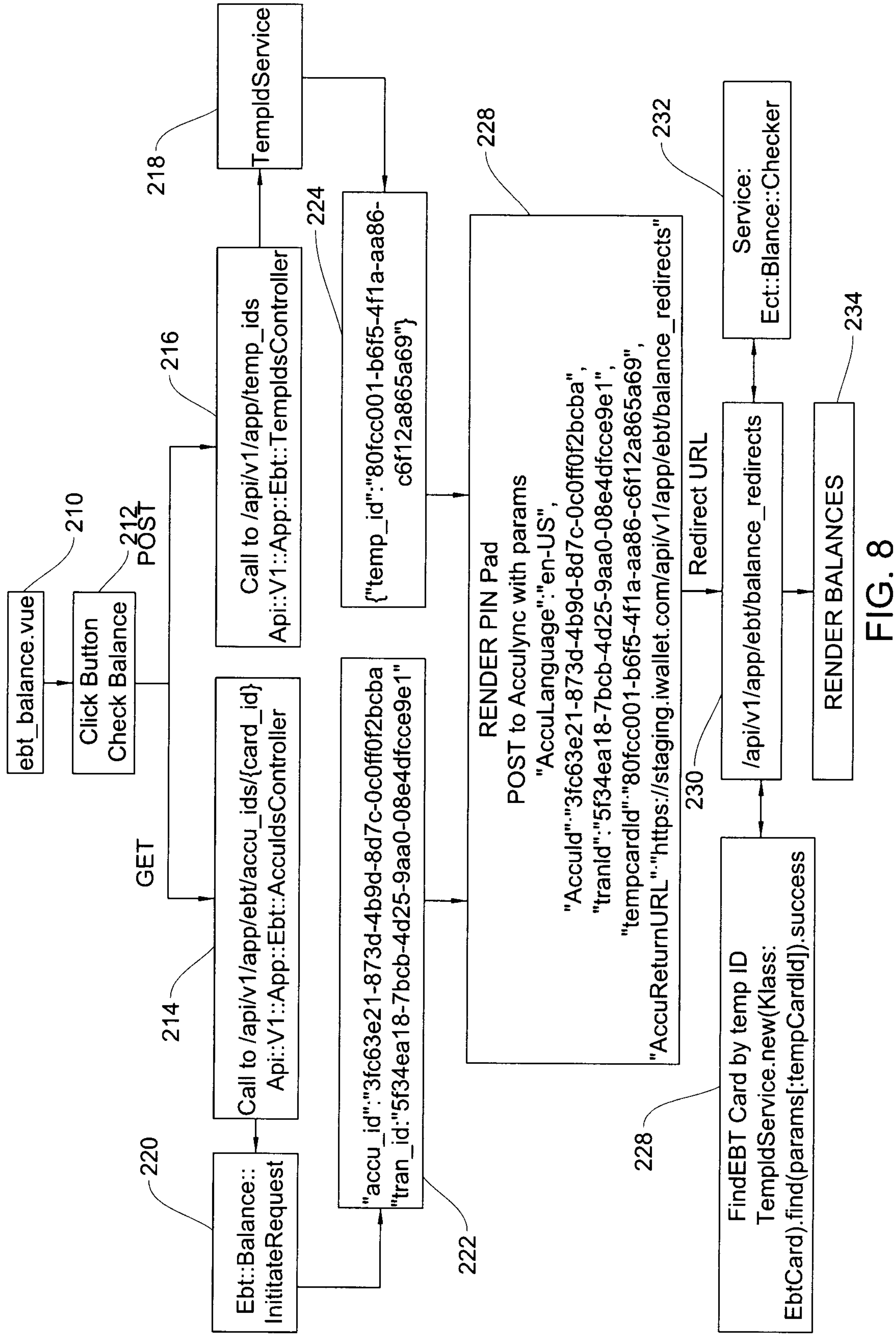
FIG. 8 depicts an exemplary flow chart that illustrates an exemplary method for checking the balance of an EBT according to various embodiments of the disclosure.
Figure 11:
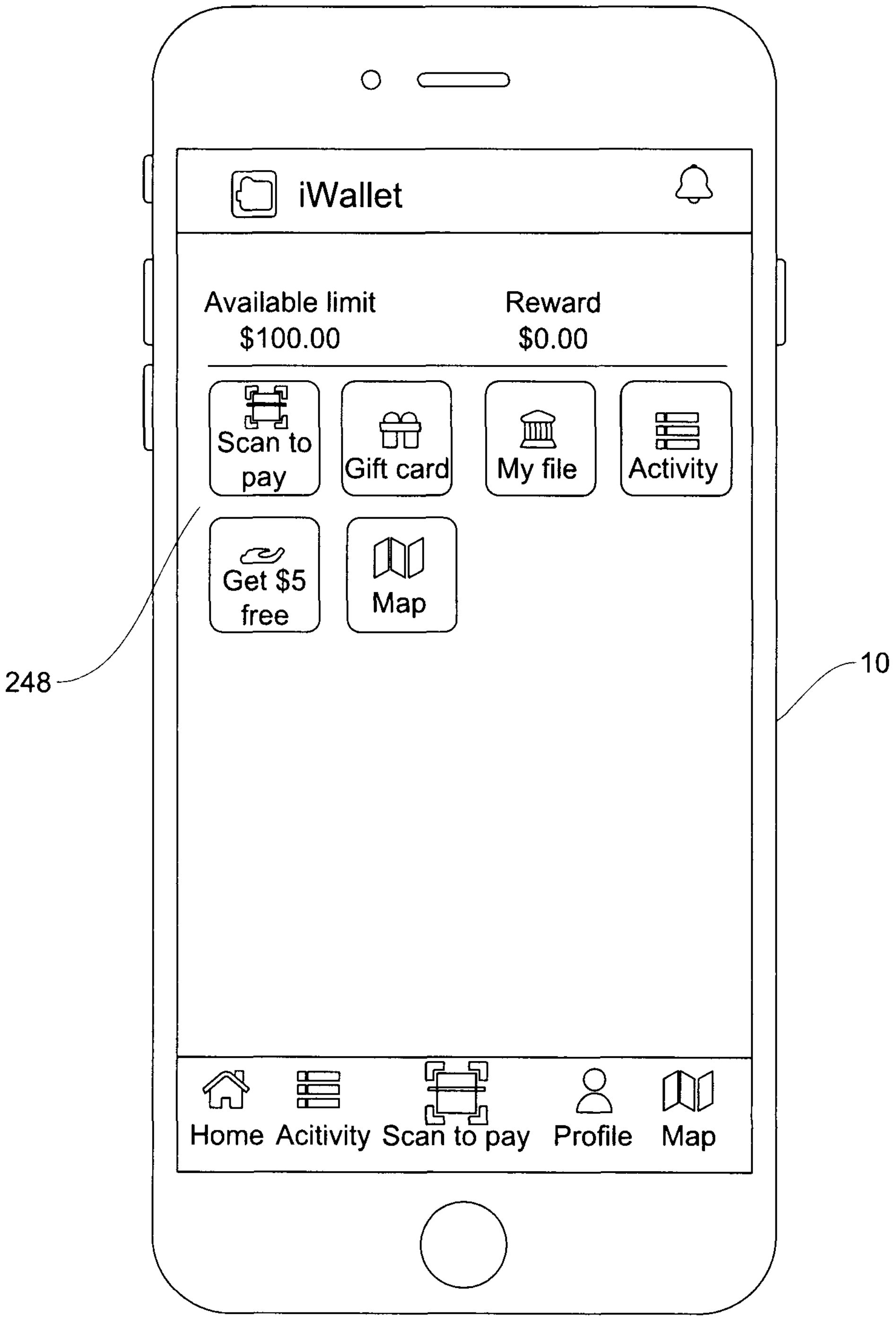
FIG. 11 depicts the home screen of the mobile application of the present invention.

FIG. 11 depicts the home screen of the web-based application 248. This screen demonstrates the options a consumer has to conduct a transaction such as a "Scan to Pay" option, "Gift Cards" option, and "My Bank" option, amongst others. This screen also allows you to view and edit your activities, profile, and map. FIG. 8 depicts an exemplary flow chart which illustrates an exemplary method for checking the balance of an EBT 210-234; and FIG. 3 depicts an exemplary flow chart which illustrates an exemplary method for returning a customer to the same profile/edit page 52-86 after signing up for e-check.

Figure 9A:
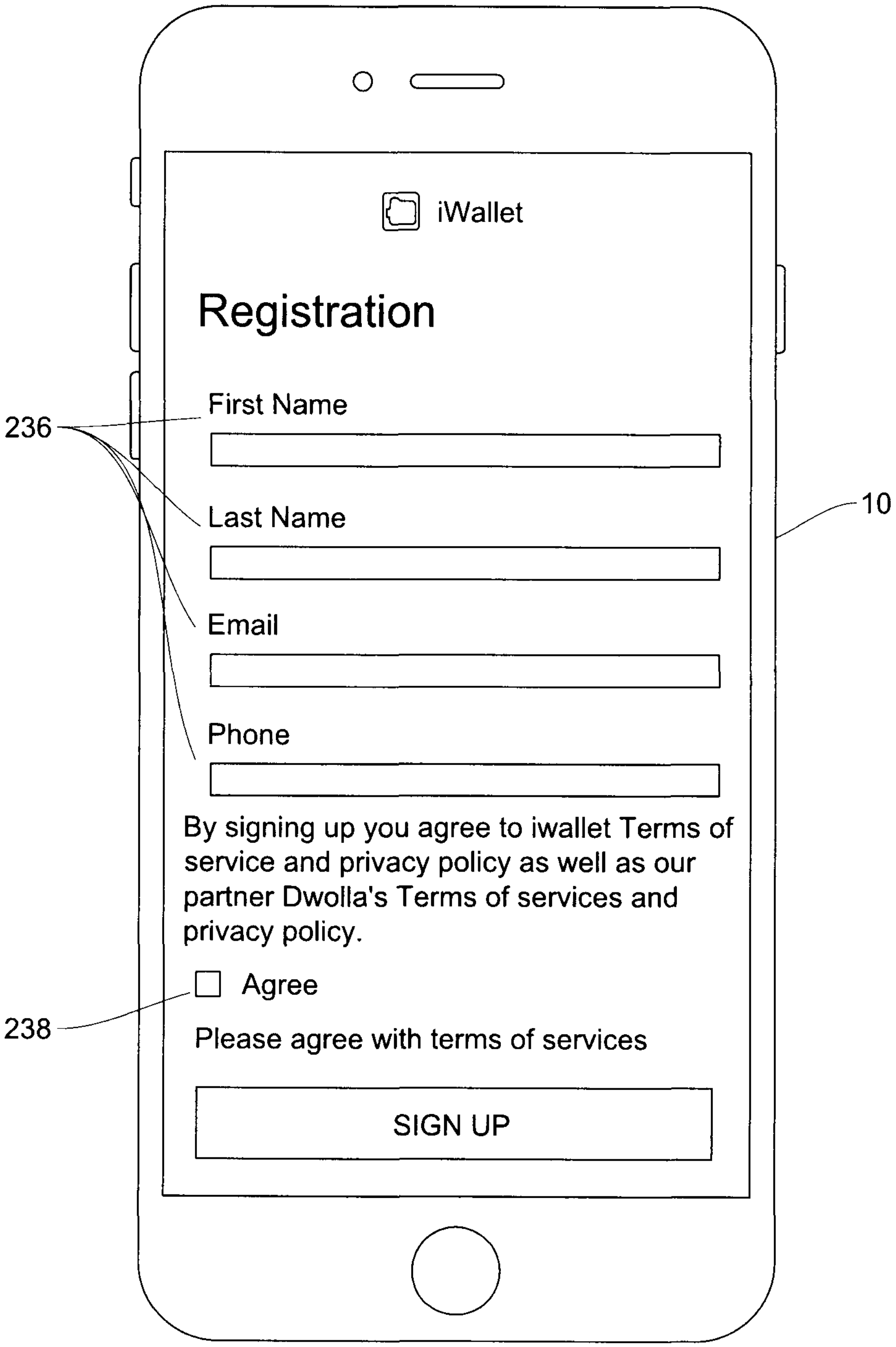
FIGS. 9A-9E depict an exemplary flow chart that illustrates an exemplary method for setting up a customer account according to various embodiments of the disclosure.
Figure 9B:
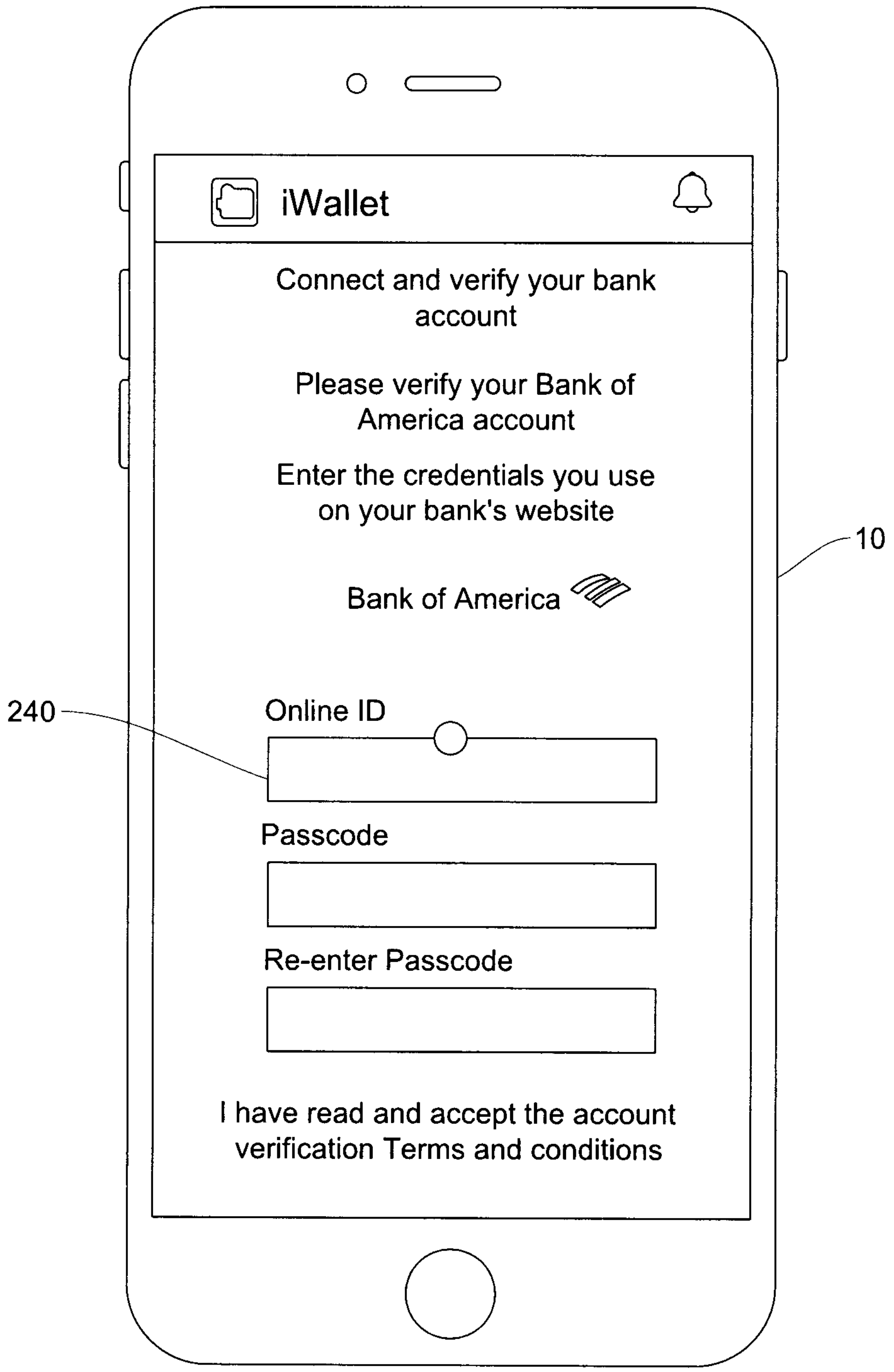
Figure 9C:
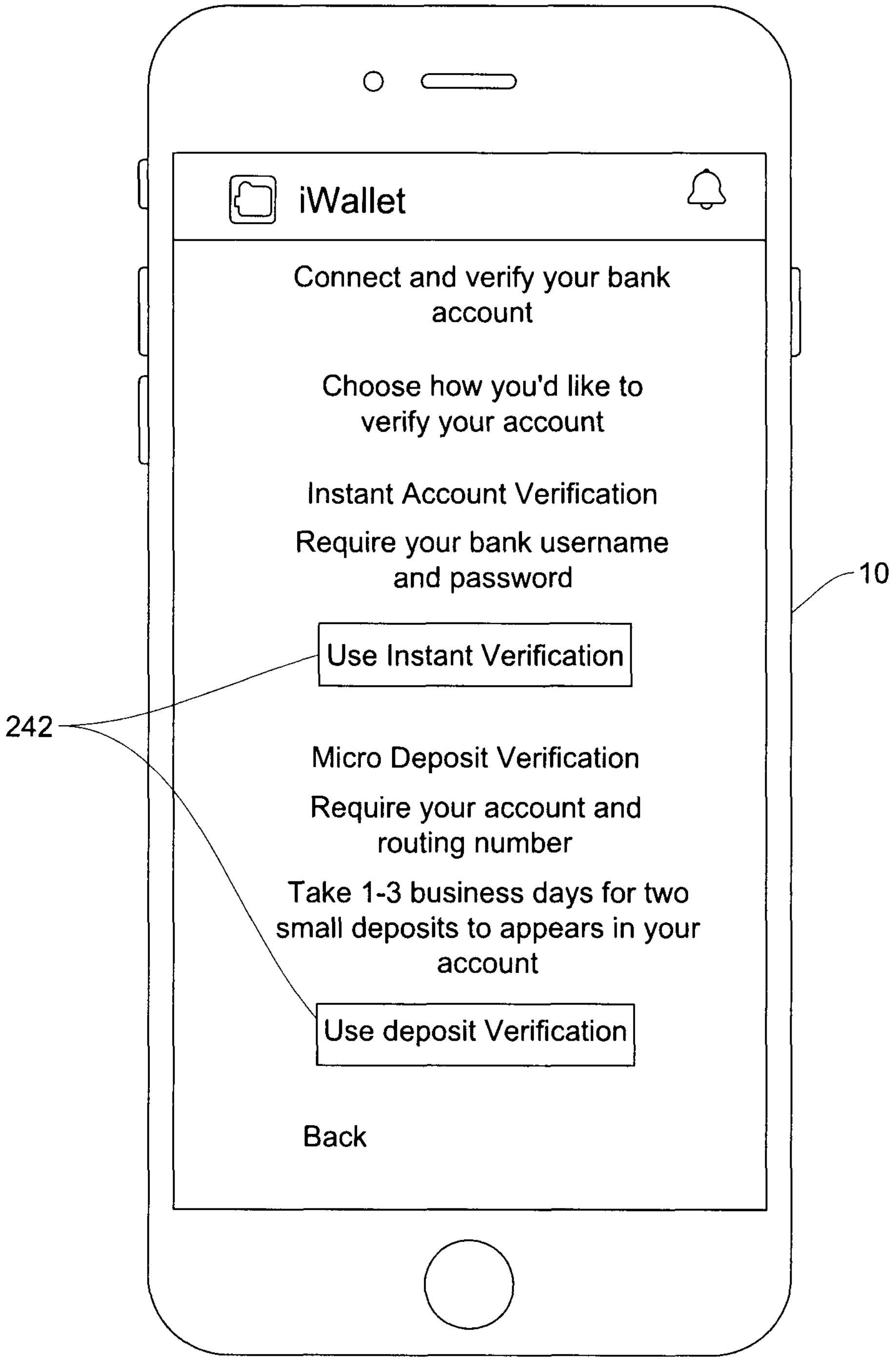
Figure 9D:
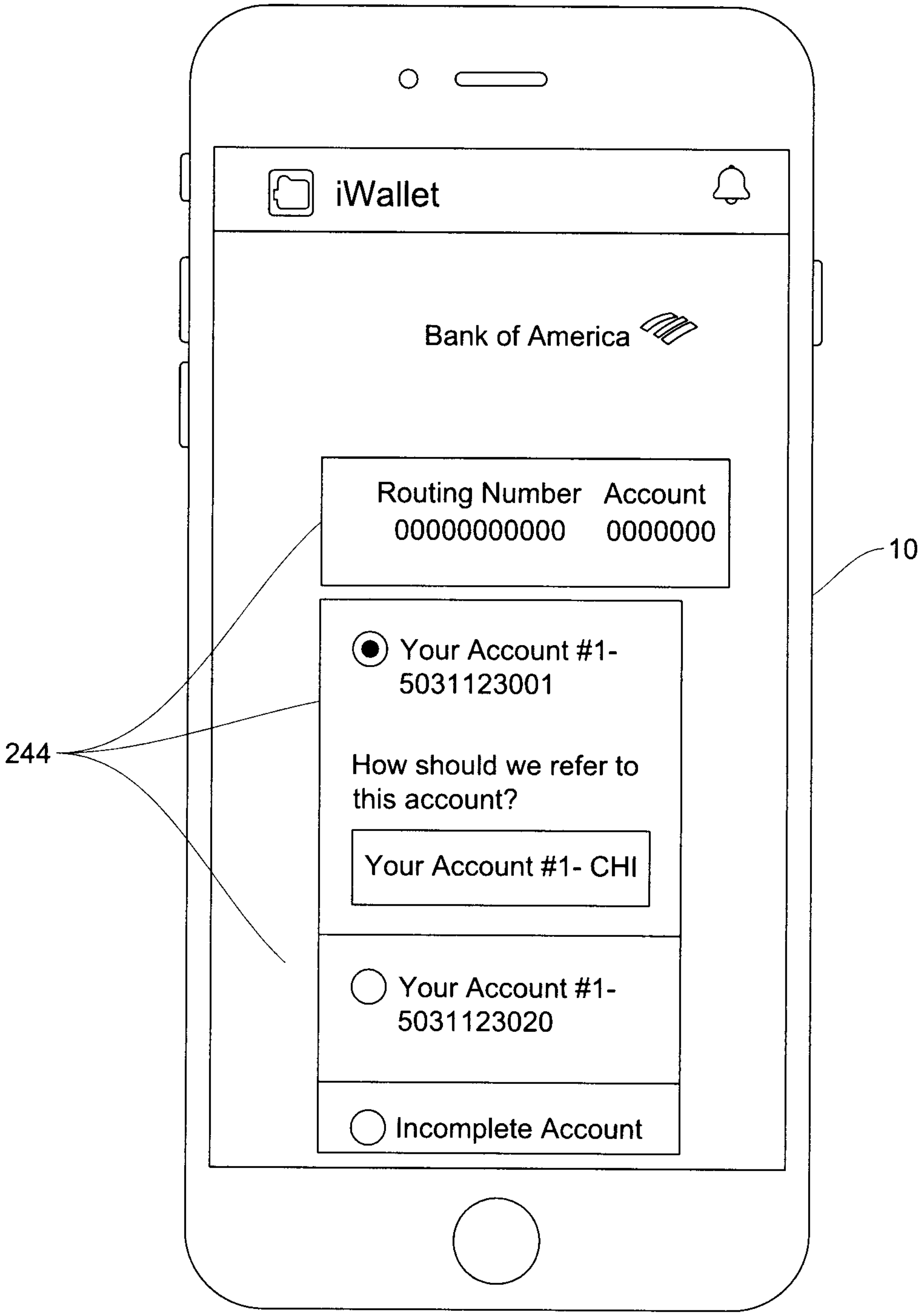
Figure 9E:
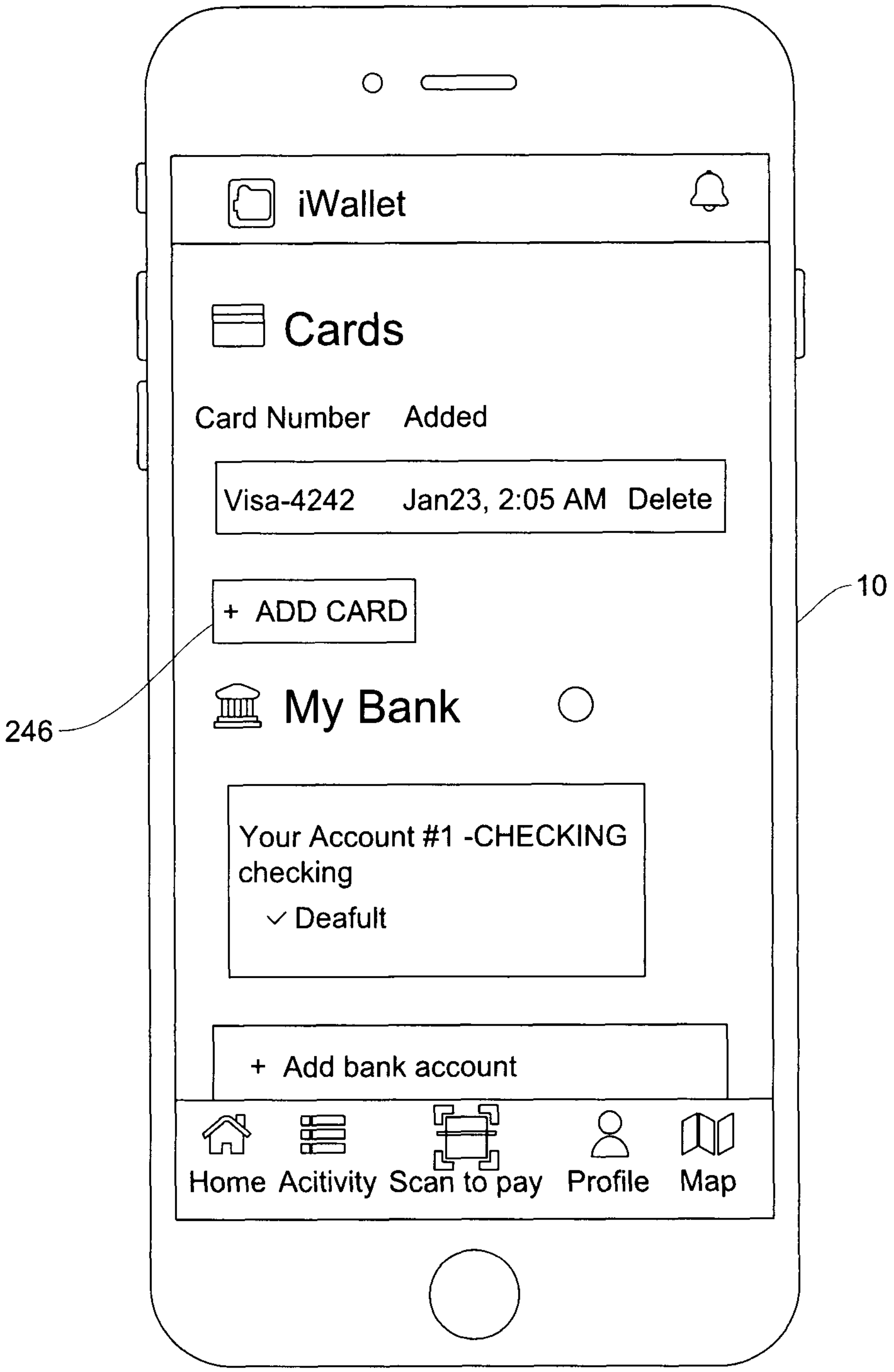

FIGS. 9A-9E depict an exemplary flow chart that illustrates an exemplary method for setting up a customer account in the order that the steps will appear on the web-application. FIG. 9*a* shows a registration page, here a consumer will need to input their first name, last name, email, and phone number 236 as well as click on the box indicating that they agree to the terms of service and privacy policy 238. The consumer will next need to set up a password. FIGS. 9B-9D demonstrate the next steps once the password is set, meaning the consumer will be prompted to add a bank checking account 240, then verification of the bank checking account 242. There are two ways to verify a bank account, instant account verification and micro deposit verification. The instant account verification can be verified in seconds and requires the consumer's bank username and password. The micro deposit identification requires an account number and routing number, this verification takes 1-3 business days and requires two small deposits to appear in the bank account. FIG. 9D demonstrates what the checking account will look like once added and verified 244. FIG. 9E illustrates the steps required to add the back-up credit card information 246.

In accordance with the methods of the present invention, the system is configured to perform a real time interchange detection to surcharge consumers at a fairer price. Interchange-plus is a pricing model used by credit card processors to determine the per-transaction cost paid by merchants. The model consists of two components—the interchange fee determined by the card networks and a markup set by the credit card processor itself. Historically it was only available (and interesting) to merchants, because merchants were not paying for the processing fees, but now the surcharging law changed. And when/if the consumer is paying the fee, they would want to minimize the processing fee by choosing the most optimal card to use. Interchange historically has been calculated at the end of the statement period for the merchants. The system of the present invention is configured to, using BIN and other data, to detect the fee in real time—BEFORE the transaction is processed, NOT after.

The system of the present invention is further configured to allow for automatically choosing payment method based on preferences and lowest cost in the interchange-plus pricing model, as disclosed above, based on the merchant type and payment source type.

The presently disclosed system and related method are designed to solve a problem associated with tips at a restaurant. Commercially available systems do not provide merchants with the ability of surcharging for tips at a restaurant. Because as a restaurant owner, a merchant you cannot add a fee on top of the tips on the check after the customer has left the building. For example, 3.5% may not be charged on that tip since the customer could not be notified before leaving. However, in the real-time interchange calculating system of the present invention, the tips are calculated in real-time on the customer's phone.

The system is further configured to provide merchants with secured ACH transactions. It is well known that ACH transactions are slow and can't be guaranteed. The system of the present invention is configured to use a pre-authorization feature of the credit card to secure an ACH in accordance with the following steps. For example, a consumer needs to buy a used fridge from a merchant. The consumer sends the merchant an ACH (the merchant does not ship a product yet). The consumer needs to back it up with a credit card (only costs 0.10%, not 3%). Once the ACH transaction is backed up by a credit card, the merchant sends the product (such as a fridge, for example) immediately. If the ACH bounces, the merchant captures the card charge, otherwise the card is released without the charge. The method of secured ACH/secured E-check of the present invention can include the following steps. 1. a customer account is created, 2. checking account is added, 3. credit/debit/prepaid card is added, 4. merchant decides if they accept unsecured E-checks or not, 5. in case the merchant only takes credit and secure E-check, invoice is sent by the merchant, 6. customer choses A (free E-check) or B (not free credit card), 7. in case A is chosen, then credit card is pre-authorized for a full amount (otherwise transaction is declined), 8. ACH is initiated and can take 1-3 business days to process, and 9. after confirmation of ACH payment, the credit card pre-authorization is dropped (i.e., the credit card is not charged.

In accordance with the embodiments of the present invention an ACH can be secured by various methods, including a credit card, debit card, pre-paid card, or bitcoin or the like. In one embodiment of the present invention, a merchants do not even have to change their existing credit card processor. The system of the present invention is configured to control pre-authorization and release of pre-authorization via API of any processor to secure an ACH transaction.

In some instances, the system of the present invention is configured to provide the ability for credit card payee to reverse processing fees (and cc payment) within a predetermined amount of time if they pay the same amount with ACH or other free/cheaper network. In some instances, it allows to recoup losses (using any connected payment source) in case the original ACH transaction has failed.

In accordance with the methods of the present invention, the system is configured to handle dispute resolutions, especially related to ACH. Commercially available systems and methods do not provide online solutions for handling these type of disputes. Even major credit card companies don't have access to full information/data, when speed is important at preventing disputes. The presently disclosed system is configured to provide a lot more data such as GPS, better description of the business and even notes of the transaction, for example at much higher speed of response, which is important at preventing transaction disputes that merchants hate so much.

The system is further configured to allow for USDA EBT (SNAP) card fraud detection using mobile phone sensor data (GPS, accelerometer, magnetometer, and the like) and a PIN. For example, the system is configured to track GPS data associated with financial transactions and detect an abnormality (e.g., all the transactions had been done in the vicinity of the merchant's business at a particular radius, thereby creating a pattern, however, if the transaction is associated with the GPS coordinates was outside of the historical GPS radius (not in accordance with the pattern), the system is configured to flag this particular transaction and alert the merchant).

According to some embodiments of the present invention, the system is configured to allow for refunding of excessive processing fees as follows. Maximum cap is 4% and debit surcharging is not allowed. The cost is 2%. Profit on credit is 2%, minus 1% on Debit. Plus 0.10% profit for the merchant. The rest can be refunded back to the consumer, for example, as a cashback rebate at the end of each month, or at other suitable predetermined time or times. According to another embodiment of the present invention, the remaining portion can be refunded back to the merchant, for example, as a cashback rebate at the end of each month, or at other suitable predetermined time or times. This is due to the fact that if the merchant wants to accept Debit, it usually costs 1% (and is 50% of the volume), wherein it's not permissible to surcharge Debit by law. Hence, the system of the present invention is configured to give a 0.9% cashback rebate to the merchant calculated as 1.9%–1%-0.9%, for example.

Figure 12:
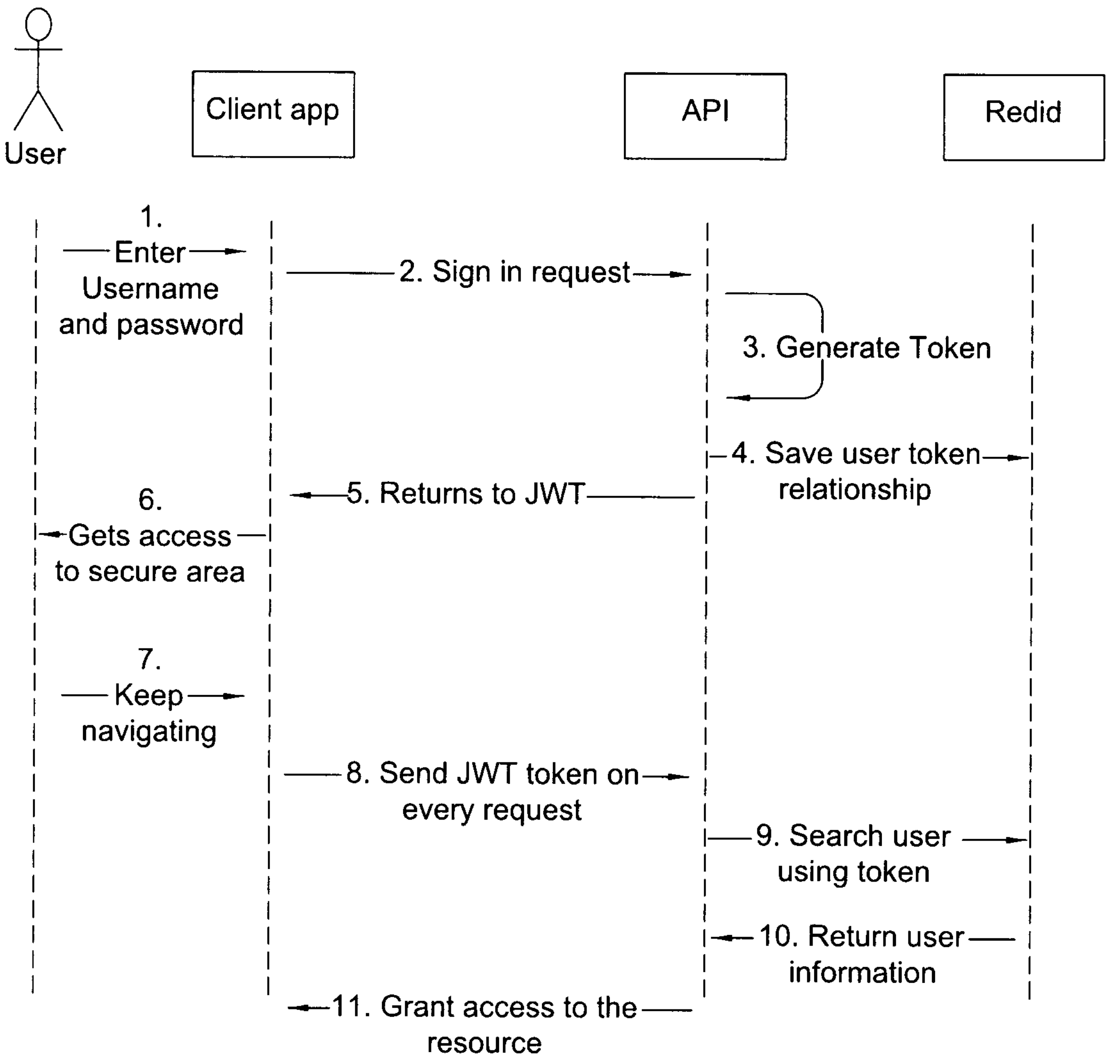
FIG. 12 is a schematic diagram illustrating the authorization system for mobile applications in accordance with the embodiments of the present disclosure.

The authorization interaction rules between a user, client application, API and Redis (server side architectural patterns) for implementing the methods of the present invention are illustrated in FIG. 12.

The system of the present disclosure is also configured to generate a secured mobile check as part of a good check assurance practice in conjunction with the mobile remote deposit capture (mRDC) process. The system is configured to allow a merchant, when the merchant needs to accept a check from a client, to perform the following steps. The merchant can a. immediately deposit the check using a camera of the mobile device (by scanning front and back of a check), b. run that check and associated client's information through bad check database (run the name of the client or account and routing number through database to check against the transaction history and see if there were any red flags associated with bounced checks, or any other delinquencies by the client/consumer); wherein c. the client, in turn, can provide guarantee of a good check using any of the following methods ("QR pledge"): credit card, crypto tokens, any other asset classes (promissory notes, brokerage account, HELOC, or other suitable financial instruments), thereby allowing the merchant to tap into QR pledge assets of the client in case the client's check is bounced.

In some instances, the system is configured to allow the client to back up a check with other kind of pledges (i.e., additional asset class) such as digital fingerprints from the phone, various social media websites on the internet or other sources of value or truth.

The system of the present invention is also configured to issue an approval code for each financial transaction involving credit cards, checks and the like. This approval code is often written down on invoices by hand and then read back by a person or a computer. However, some letters and numbers are very similar in appearance and can be easily mistaken one for another. In order to avoid any confusion, the system of the present invention is configured not to use the following letters/digits when generating an approval code: B=8, G=6, I=1=1 (lowercase L), O=0, Q=D, S=5, and Z=2.

The system of the present invention is configured to prioritize transactions according to the status of the financial transaction and allows a merchant to send a text message to an end user (i.e., a consumer) so each credit card and/or ACH credit card-backed transaction is singed off (confirmed/acknowledged) by a consumer via a text message (aka no-touch e-signature). For example, the system is configured to allow the merchant to send a text message to the consumer that the financial transaction is approved. The consumer has to send back a confirmation/acknowledgment by text to the merchant. In a situation when the end user did not approve the transaction, the transaction will remain in "pending" status (aka "waiting for e-sign"). The unapproved transaction will sit at the top of the transaction list to remind the merchant that it needs to be finalized. It should be noted that the described-above e-signature confirmation process of the present invention is designed to minimize the chances of customer-originated disputes associated with financial transactions.

The system of the present invention is configured to increase the speed of processing a financial transaction by selectively allowing for a faster processing based on the consumer's financial credibility and/or behavioral patterns (i.e., regular customer, always pays on-time, and the like). The method can be described as follows (from the merchant's side), wherein the consumer scans a QR code generated by a merchant (the merchant can attach a QR code to the counter for case of access or show a QR code on a mobile device, etc.). 1. The consumer scans the merchant's static QR code, 2. the consumer enters the amount and clicks "PAY" button, and 3. the consumer receives an approval code immediately upon clicking the "PAY" button thereby bypassing a typical route of sending an API request to the server after the "PAY" button is pressed, hence increasing the transaction speed. The described-above process of pre-authorization (aka cache) the financial transaction is designed to cut the processing time. In some instances, the system is configured to make an appearance that the transaction went through, just showing that the money was sent, without confirmation of them being received.

Likewise, the described above method can be utilized in a case where the consumer presents the merchant with the consumer's QR-code generated by the system of the present invention, and the merchant scans the consumer's QR-code to automatically withdraw a certain amount. The system allows the merchant to leverage a cached database of repeat users (consumers) with high credibility evaluated based on various parameters such as financial credibility, spending patterns, GPS data and the like) to improve the speed of financial transactions.

The system of the present invention is also configured to allow, for the benefit of consumers, to automatically choose and prioritize the most optimal payment method or methods. For example, considering a consumer wants to pay for a shopping cart using an EBT (SNAP USDA) card (so-called food stamps) or other cards/crypto or other asset classes. There might be some items that are non-EBT eligible or a user/consumer can run out of EBT money. If the consumer has more than one payment source saved in the system of the present invention, the system can automatically select and use the next preferred payment source on the list to improve the speed of transaction and to realize potential savings. Thus, the system of the present invention is configured to allow the consumer to determine preferred payment methods and create a priority list from which the system will automatically select and use a payment method in order of priority. In addition, the system is also configured to recommend to the consumer a preferred payment method or methods specific to a particular consumer.

The system is also configured, for the benefit of the merchant, to help the merchant conduct financial transactions through most favorable route or routes (using processors such as NYCE, FIS, Clober and the like). The system allows the merchant to create and store a merchant-specified priority list of processors. The system is also configured to recommend and automatically choose a preferred processing route based on cost, speed of transactions, number of declines and general rating associated with a particular processor.

The system of the present invention is configured to generate a QR code that combines multiple functions by providing a link to a customizable landing page linked not only to various applications for conducting financial transactions such as Zelle, Venmo, Apple Pay and the like, but also to other kind of applications, pictures, pdf (restaurant menus, for example), social media sites and more. It provides the ability for the merchants as well as consumers to create landing pages with multiple payment options and other valuable information and applications. For example, a consumer attending a restaurant can be presented with a QR code provided by a merchant with a link to a landing page with multiple payment options and a restaurant menu, as well as the means to order the food to go or reserve a table, along with the nutritional information about the food provided by the merchant.

According to another embodiment of the present invention, the system provides a check cashing/conversion on demand at the local financial branch as a service, for the benefit of merchants. Since the merchants might wish to get a check cashed faster, the merchant may employ a gig-worker or an employee to pick up a check from the merchant's site and then go to a physical branch and convert the check into cash or cashiers check or any other guaranteed asset such as checking account transfer in the same bank. For this purpose, the system of the present invention is configured to provide a list of gig-workers for the merchant to order check cashing on-demand service. In some instances, a financial institution such as a bank, might choose to accept an image of the check instead of the actual physical check. In this case, a gig-worker does not have to pick up a physical check from the merchant but only needs to receive a virtual copy of the check, and the system of the present invention is conveniently configured to send an image of the check to a gig-worker to perform the task without the need to pick up the check on-site from the merchant.

The system of the present disclosure includes an advanced bad check management module configured to send notifications to the consumer with options to remedy the situation when the consumer initiated financial transaction did not go through (credit card declined, check bounced, etc.) by offering to the consumer to extend a payment date or breaking down the required amount to be paid into small portions. Likewise, the system can send to the merchant a notification that the consumer chose to remedy the situation and how the consumer is going to do that. The method applied to a situation where a mobile check deposit was rejected by the bank for any reason can be described in more detail as follows. Providing that the system contains consumer's information and consumer's secured assets (such as a credit card, for example), the following method of the present invention can be applied. 1. Payee and payer will automatically be notified (by sms/email/messenger or any other means). 2. Payer will have an option to use their other payment source or allow the check to be re-deposited. 3. Payer will have the ability to contact customer support to clarify the situation (clerical errors, etc.). 4. Payee will have the option of charging a bad check penalty fee or wave the penalty fee. 5. Check re-deposit can be scheduled immediately or at a certain future date. 6. Before re-depositing the check can be run against extra layers of verification (other more expensive databases) that are normally not done due to extra costs. 7. Payer might have an ability to communicate with the payee electronically to settle the bad check by some other means.

Modern banks still process paper checks, which are usually transmitted as images, once scanned via the mobile remote deposit capture (mRDC). The system of the present invention allows a user to scan images of both sides of a check using a mobile computing device such as a smart phone or the like (just like a typical modern banking), however, the system of the present disclosure provides the ability to access mobile check deposits to any sub-account, unlike with a typical modern banking system wherein the access is granted for only the main account holder.

Additionally, the system of the present invention includes a QR-code-to-instrument converter module configured to generate a virtual check using all the required information linked to a QR code, in cases where a merchant or a consumer does not have a physical hard copy of a check book. Instead of providing a paper check version a payer can provide a QR-code that will contain all the needed information, the QR-encoded information such as: a. account/routing number, b. amount, c. date, d. payee name (i.e., who the check is made out to) e. signature, and f. check number. Similarly, the system can generate a void check, in cases where a void check is required by a financial institution to set up an automatic payment, for example.

A payee can scan the encoded QR-code, and the system is configured to decode it into a regular paper check image, allowing the payee to endorse it in the back of the check as usual, but electronically, and submit it to the bank as an image-check for processing (hence, generating a virtual check image of a filled-out check with endorsement on the back, amount, payable to, etc.). In some instances, the system can store the payee's signature and endorse the check automatically with payee's permission or pre-authorization.

The information with the QR-encoded check can also be encrypted, so in order for Payee to be able to decrypt it, a Payer will have to provide a passcode using the following methods: a. Passcode can be sent by SMS for security, b. Passcode can be generated by a time-based pre-approved Authorization applications, c. Passcode can be pushed as a push notification, d. Passcode can be transmitted verbally, e. Passcode can be presented as a 2nd QR-code, or f. Passcode can be stored on a USB-memory device.

It will be appreciated by a person skilled in the art that the method of creating a virtual check as described above can be applied to QR-encoding credit cards, invoices/bills or and any other documents or financial instruments. For example, to generate virtual invoices linked to generated QR codes (for proof of "paid in full") with or without security features, or for other non-fungible QR codes (like promissory note or warranty or proof of service, or proof of payment) with or without security features as described above in relation to the process of generating a virtual check.

In some instances of the present invention, the system includes a monthly statement monitoring tool ("hidden fees guard") for the benefit of both merchants and consumers. It's common in the financial world to have free tools to analyze a credit card merchant statement to see businesses' true costs of processing, because some processors pad interchange, add hidden fees, etc. Some credit card processors increase processing fees from month to month, by just printing a small font text at the bottom of statements. Since business owners usually don't know how (or don't have time) to properly monitor this type of information, their credit card processing fees often get out of control.

The system of the present invention provides a merchant credit card statement monitoring service. The merchants can instruct the processor to send a copy of their monthly statements by fax/email/mail/etc. to a special monitoring service module provided by a system of the present invention. That service module is configured to automatically monitor all the changes and will alert the business if something went wrong and needs the owner's attention. The same methods can be applied to other bank monthly statements such as checking accounts, credit cards, loans, insurance, brokerage accounts and the like. The system is also configured to provide the same monitoring service as described above to consumers, allowing the consumers to track hidden fees in credit card statements and be alerted with regard to various deadlines such as loan payoff due dates, etc.

The system of the present invention is also configured to provide an extra level of security to financial institutions and their customers when it comes to financial transactions involving cashing and depositing checks. Each bank has its own policies regarding cashing and depositing checks, but virtually every bank in the United States (and in many if not most countries in the world) requires that a payee endorse a check to accept it. Because of the rising incidence of check fraud and theft, banks require checks be endorsed. Endorsement can take various forms and could include wording such as "For deposit only" or the like, or digits, like the account number. It can also have a media file like a signature (or driver's license, or other IDs, or physical fingerprint, or digital fingerprints). The system of the present invention is configured to generate and add a small QR-code linked to a check, thereby providing a bank and a check writer an extra level of security. The QR-code can be embedded into a physical check or a virtual check generated by the system of the present invention as discussed supra, or can be stored in a separate location or in any digital or print form (such as a database, email, SMS text message for example). This approach of endorsing a check with a QR-code enables users with a two-way tracking. With regard to tracking on bank's or payer side, a QR-code can automatically help identify a person or business making a deposit (especially in cases where a person is not a signer on that account), which can help with tracking down a check later, should any issues associated with the check arise. With regard to tracking on the payee side, a QR-code can contain payer information such as service address, ID, name, invoice number, etc. So that if the check bounces, a payee can quickly identify a person who wrote this check, even if the information on the front of the check is missing.

The system of the present invention is configured to increase the speed of the mobile remote deposit capture (mRDC) process. It makes the funds available immediately to verified merchants as well as secured-type of processing merchants as described above (i.e., if a financial transaction such as ACH is backed by a credit card, the system is configured to issue an advanced funding immediately, because the risk of such transaction is low).

The system of the present invention is also configured to provided risk management for secured or non-secured mRDC/ACH financial transactions based on certain criteria. Some mRDC/ACH transactions might be funded immediately, and some may be held for extra time to clear, based on one or more of the following parameters: a. how the transaction was secured (e.g., backed by credit card, etc.), b. history of transactions, c. amount, d. GPS location patterns, e. device digital fingerprints patterns, and f. check writer's personal information or absence of that information.

In some instances, the system of the present invention provides users with the partial mRDC check refund ability via ACH. Once the check routing/account numbers are read by the system of the present invention, it provides the merchant and the customer with the ability to negotiate and agree to additional special terms, thereby enabling the merchant to refund the customer a partial refund by depositing it back to the customer's account (for example, an installation of an equipment was longer than agreed upon and the customer demanded a partial refund).

In some instances, the system of the present disclosure is configured to allow for partial mRDC check extra charges via ACH beyond written amount. Since the check routing/account numbers were read by the system, the merchant can have a check writer agree to special terms beyond the amount written on the check. In these terms routing/account numbers will be used by the system of the present invention to add any extra charges if needed without requiring the customer to write a new check, thereby eliminating extra paperwork and saving time and effort.

The system of the present invention is also designed to import an mRDC image of the check not only from camera, but also from other media sources such as emails, SMS, ftp, Skype, messengers and the like, making it possible for the user (be it a merchant or a consumer) to submit any kind of image of the check for processing.

Figure 13:
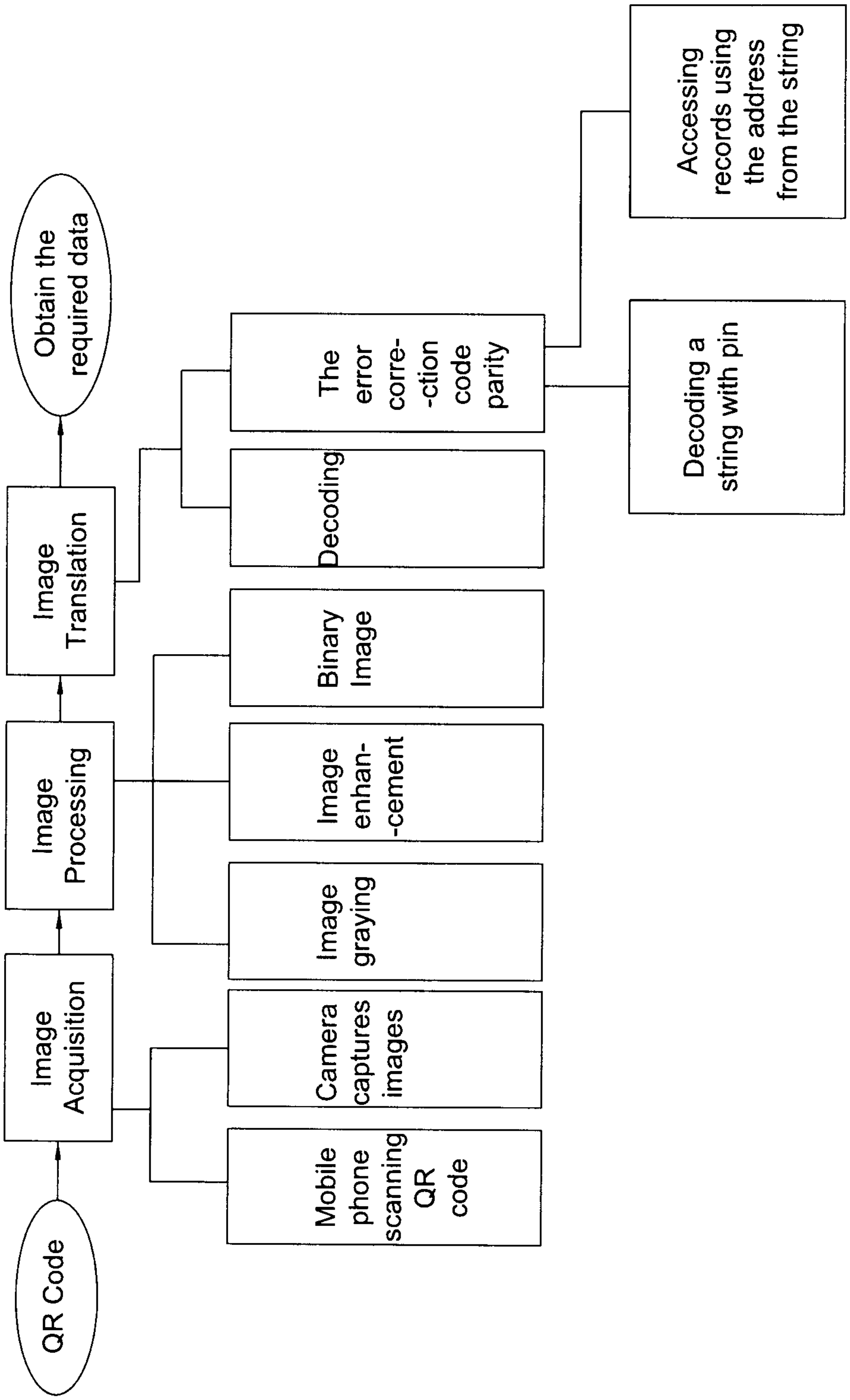
FIG. 13 is a schematic diagram illustrating a method of reading QR-encoded checks in accordance with an embodiment of the present invention.

In some instances, the system of the present invention is designed not only to create QR-encoded checks, as previously discussed, but also to read QR-encoded checks, store the information and convert it into a check, if needed. The exemplary method of obtaining the required data from a check in accordance with the present invention is illustrated in FIG. 13.

The system of the present disclosure can be configured to create recurring transactions from a single mRDC check image (e.g., to set up a monthly rent payment or membership fee). Once the check's routing/account numbers are read off of the check image, the system can store that information and allow the merchant to bill the customer on a regular recurring basis.

The system of the present invention is also configured to bill a check writer (not a merchant) processing fees by extracting account/routing numbers from mRDC and running an extra ACH transaction. Because a check's routing/account numbers can be saved off of the check image, that means that the system of the present disclosure can save that info and run any extra debit or credit transactions for processing fees, thereby allowing a processor to charge extra fee (if, for example, a customer's check was bounced due to insufficient funds).

The system of the present disclosure is also configured to extract from a check the information of a check writer (such as full name, address, amount, etc.). Unlike all modern commercially available software-based systems which are not designed to analyze any other check information except routing/account numbers, the system of the present invention can extract and store other information that is written on the check, which can be used to detect and evaluate the check risk profile.

The system is also designed to encode the check writer's name, address, other information (such as account/routing numbers), or combination thereof using a QR-code to be used on the check with or instead of the text printed on the check in the top left corner.

The system of the present invention is further configured to create a non-fungible token (NFT) for each check to prove its uniqueness utilizing the block-chain technology. That token can be in the form of a QR-code, which can be printed on a check. The token can comprise numbers, letters, or combination thereof, unique for each check.

The system of the present disclosure is also designed to upload a check image or check data to a blockchain (a digital ledger such as Ethereum, for example) to prove the check's uniqueness and/or authenticity.

Figure 14:
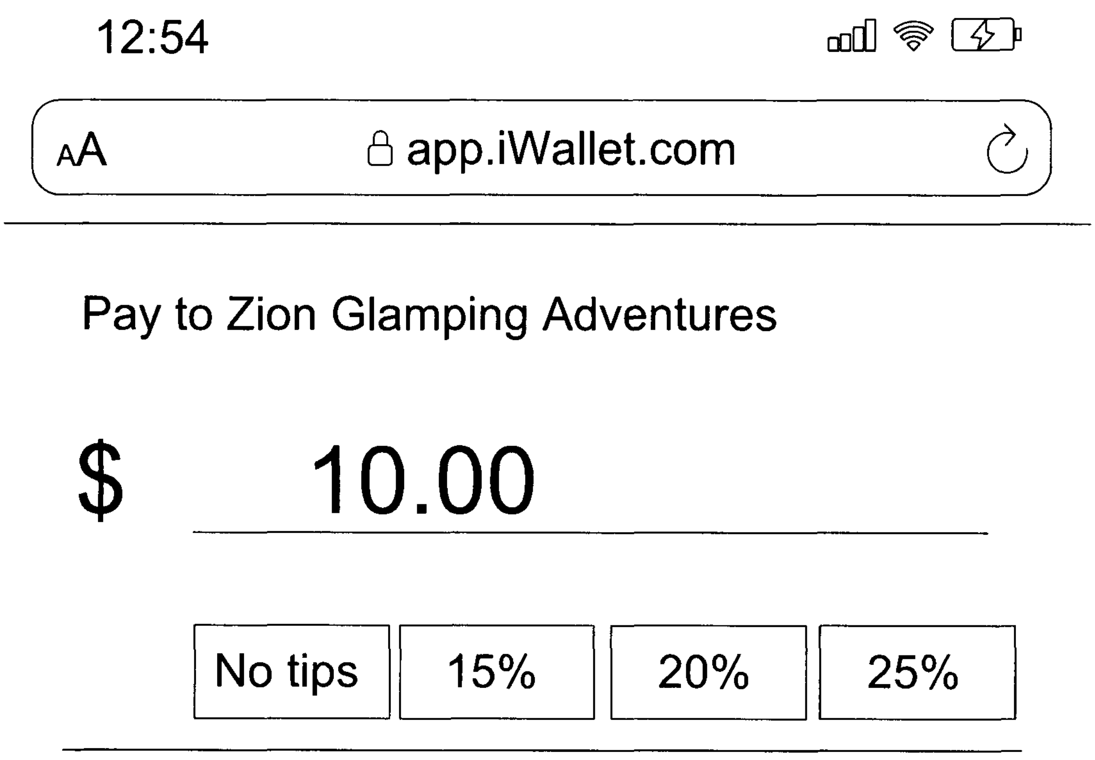
FIG. 14 is a screenshot of the application allowing a check writer to add a tip amount upon confirmation.

The system of the present invention is configured to provide a check writer with the ability to add tips as part of confirmation when writing a check, wherein the tips are charged through the ACH network as a separate transaction. It's a critical functionality for the benefit of merchants, because so many people in the hospitality industry in the US depend on tips. In accordance with the method of the present invention, when a merchant needs to process a check, a merchant would need to take a picture of the check, then an sms or email will be sent to the check writer to confirm the amount and accept the terms of service (such as penalties for bad check, etc.). Right there on the same confirmation page, a check writer will be able to give tips as illustrated in FIG. 14.

The system of the present invention is configured to provide the ability for depositing mobile checks by end consumers (i.e., check writers) remotely, in case where a check writer is remote (not present on-site to accept with the mobile application) and would like to pay by check. The system of the present invention is configured to allow a merchant to send a web link to the check writer by email, sms, messenger, or the like, where the check writers will be able to process a deposit using their mobile phones. Such remote payment by customer to the merchant's bank account provides a more secure way of payment. In some instances, the system is configured to split the payment in accordance with the consumer's instructions. For example, a customer can write a check for $500 and the system can split it five ways, sending $100 for each merchant as per customer's instructions, thereby allowing customers to choose to whom and how much to pay (such as in general contractor/sub-contractors scenario).

The system of the present invention is configured to provide extra security for the benefit of the merchants as well as processors for transactions involving remote mobile check deposits by the end consumer/check writer. In some instances, the system is configured to request security information to verify the identity, which may include a remote drivers license or any other ID image upload by web link and/or SSN and DoB for verification purposes.

The system of the present invention is also configured to select surcharging fee based on the amount of a transaction using a sliding scale approach, predicating on the fact that up to certain amount customers are willing to pay legally allowed 4%, but larger amounts demand lower processing fee, for example 3% for amounts over $500 and 4% for under $500. The system is configured to adjust the surcharging fees based on the amount (for example, the larger the amount the lesser the surcharging fee, using a sliding scale approach charging consumers based on the amount of the financial transaction). In some instances, the system is configured to provide merchants with the ability to adjust the surcharging fees using the sliding scale approach dependent on the amount of financial transaction.

The system of the present invention is configured to provide the ability for merchants to add an e-invoice when sending a check request wherein the invoice and a check request (payment link) are sent together to a consumer. In some instances, the system is configured to generate an invoice with the embedded payment link, which can be linked with secured ACH or mRDC or virtual check.

The system of the present invention is configured to provide merchants and/or processors with the ability of choosing payment method manually using checkboxes, for example or dynamically based on perceived risk such as external data associated with the customer's profile, for example. Thus, the system provides merchants and/or processors with the ability to choose a payment method (i) manually or (ii) automatically (e.g., based on the credit score, type of merchant transaction, merchant category code (MCC), credit load (debt to income profile) or the like), or (iii) processing fees can be automatically adjusted based on the risk profile (for the benefit of merchants and/or processors).

There is a new instant payments network that the largest banks in the US created in 2017 called Real Time Payments (RTP). It uses the same routing/account #s as an ACH network, it just needs to be sent for processing to a different server. It covers now only about 50%-70% of the population, so it's not widely used yet. The advantage of the new RTP network is that the transfer is instant (unlike 1-3 days for ACH). The system of the present invention is configured to determine if a transfer is eligible for RTP (based on a routing number) and if so, process it immediately, such that a "secured transaction" as described above will not be needed. Similarly, it applies to mRDC transactions: if the system of the present invention detects that a paper check is eligible for RTP, it runs an instant transaction via RTP, rather than waiting for a slower ACH processing.

A method for conducting secure electronic financial transactions in accordance with an embodiment of the present invention is illustrated in FIG. 15. Method 300 includes identifying, by a computing system, a first payment source account held by an account holder and a second account held by the account holder (step 310), receiving, by computing system, transaction data associated with a transaction initiated by the account holder with a merchant using the first payment source account, the transaction having a transaction amount (step 320), requesting, by a computing system, via a first network a first transfer of the transaction amount from the first payment source account within a predetermined time (step 330), performing, by a computing system, a pre-authorization charge of the second account in a pre-authorized amount (step 340); transferring the transaction amount to pay the merchant (step 350), if the first transfer is not completed within the predetermined time, requesting, by a computing system, via the second network a second transfer of the pre-authorized amount from the second account (step 360), and releasing the pre-authorization charge of the second account if the transaction amount was successfully transferred from the first account within the predetermined time (step 370). It will be understood by a person skilled in the art that the account holder can be a direct account holder or a co-signer or a person who has access to the account by proxy or by virtue of other legal means. The pre-authorization charge can be equal to the full transaction amount or can be a percentage of the full transaction amount (for example, it can be equal to the 50% percent of the total transaction amount); in some instances, it can be more than the transaction amount (especially in cases involving transactions of higher risk wherein the credibility of the account holder is low, for example). It will be understood by a person skilled in the art that the step of transferring the transaction amount to pay the merchant (step 350) means transferring funds equal to the transaction amount.

The system is also configured to impose a processing fee on the transaction at the rate being a percentage of the transaction amount. In some instances, the processing fee can be imposed on the pre-authorization charge. The processing fee can be also imposed on a tip amount. The system is also configured to adjust a processing fee imposed on the transaction for the account holder based on risk assessment data before the transaction is processed. The risk assessment data can include phone sensor data such as GPS coordinates, accelerometer, magnetometer, BIN, transaction amount, credit score, type of merchant, type of payment source, debt to income ratio, time of the day, GPS location, social media profile, own IP address history and from other sources, user-agent history, history of phone calls, connected funding sources, movement of funds between funding sources, email domain, original registration information, prove of digital identity from other blockchain services. The system is also configured to adjust a processing fee for the merchant based on the risk assessment data as defined above.

According to the method of the present invention, the system is configured to refund excessive processing fee back to the merchant or to the account holder. The first network can be an automated clearing house (ACH) network and the first transfer is an ACH transfer. In some instances, the first network can be mobile remote deposit capture (mRDC) network and the first transfer is an mRDC transfer. The second account can include a credit card, debit card, prepaid card, crypto account, brokerage account, or bank account, or combination thereof. The system is also configured to reverse processing fees within a predetermined amount of time to the account holder.

According to the method of the present invention, the system is configured to perform a dispute resolution and fraud detection based on the risk assessment data as defined above.

The method can also include the step of generating a secured mobile check as part of a good check assurance practice by allowing the merchant to deposit the check using a camera of a mobile device; running the check and associated client's information through a bad check database; and providing by the account holder a guarantee of a good check using QR-code generated link to the second account; thereby allowing the merchant to tap into the assets of the second account. It can also include the step of issuing an approval code for each transaction, wherein the code does not include the letters/digits selected from B=8, G=6, I=1=1 (lowercase L), O=0, Q=D, S=5, and Z=2; thereby avoiding confusion associated with the similarities between letters and digits.

In some instances, the method can include the step of marking the transaction as pending until the transaction is approved by the account holder. The approval of the transaction by the account holder can include the approval of the terms of the transaction. The method can include the step of increasing the speed of the transaction based on the account holder's financial credibility by adjusting the predetermined time.

The second account can include one or more accounts and the pre-authorization charge of the second account can be made using one or more accounts (for example a pre-authorized charge of $10,000 can be divided up among several accounts, such that, for example, $5000 is charged to a first credit card and another $5000 is charged to a second credit card). The ACH pre-authorization release time can be adjusted based on the transaction amount or risk of transaction based on the risk assessment data (e.g., the pre-authorization can be held for 60 days for a high-risk transaction and for 20 days for a lower risk transaction).

The system of the present invention is configured to provide a secure way of uploading checks to ensure that sensitive/confidential data is not being exposed by enabling merchants to send check image link/token for remote uploads. In a situation when the merchant and the consumer are located too far apart from each other, the system provides a merchant with the ability to send a consumer an sms/email containing instructions/request to upload a front and back image of the check. A merchant can also send a special link with a link to the application that will allow consumers to upload the image. However, consumers might not like wasting their time on uploading unknown applications. In that case, the system allows a merchant to send to a consumer a website link that will allow secure uploading of images. In both cases the images will be uploaded to an iWallet server, and each image will have a link/token associated with it. A token/link (along with other transaction information such as amount, name, address, ID, date, security information) will then be sent to the merchant or the processor to initiate a transaction. This approach ensures that the sensitive/confidential data is not exposed and provides extra security to consumers and merchants.

With reference to the earlier discussion of sending a confirmation link to confirm/accept terms of credit card or mRDC transactions, there are several ways to deliver the link which are provided by the system of the present invention:

1. by scanning a dynamic QR-code on the 2nd phone (merchants' phone),
2. by sending an email,
3. by sending an SMS message from the server (from the application with a button), and additionally,
4. by sending an SMS from the merchant's phone directly (as a regular person to person sms, not from the server), wherein the system of the present invention (iWallet) is configured to (ii) generate an url link and enable the merchant to copy the link and send an sms message to the consumer outside of the iWallet and (ii) also can send a text to the merchant with the link, which is especially relevant in situations where telephone operators such as Verizon blocks text messages from IP phone coming from the server.

The system of the present invention is also configured to allow for offline mobile check transactions uploads (mRDC). In case a merchant's mobile phone doesn't have a connection, the system enables the merchant to upload an image of the check into the application memory and upload it later to the cloud when the connection is restored. Thus, the image of the check is stored in the local memory of the mobile phone and once the connection is established, the image is uploaded to the cloud/server or (ii) it can be encrypted image with public key and then once uploaded to the server, the service can process it, decrypting using private key. The same approach can be used for consumers when a consumer's mobile phone does not have a connection.

The system of the present invention also provides for depositing the front of the check only (not the backside of the check) for mobile deposit mRDC transactions. Most of the modern checks have the same back of the check and most banks usually do not even require checks to be endorsed. The system of the present disclosure is configured to detect a typical check template for a type of check, based on proportions. Usually either small size for personal check (6"×2¾") and bigger size for business check (8¼"×3"), or cashiers check (3.5×8.5); and then automatically add a required text information in the endorsed area, which is typically "For Deposit Only" or "Mobile Deposit" plus sometimes a bank account number of the merchant or other information as required by the bank of the processor. This approach increases the speed of the transactions, because the consumer does not have to take a photo of the backside. The system generates the back of the check for processors and can endorse it by inserting a signature either electronic (such as/Joe Doe/for example) or actual signature of the consumer stored in a database, if endorsement is required by the bank; if bank does not require endorsement, then backside won't contain a signature.

The system of the present disclosure is configured to provide for multiple check depositing with a mobile phone. Currently there are two check depositing solutions on the market: single check mobile deposits, which are very slow, or a portable check scanning machine, such as Panini X for PC, which is expensive. The system of the present disclosure is configured to take a picture of multiple checks at the same time, create a bi-tonal image, geometrically position and correct the image, and then divide the image into separate checks either on the mobile device or on the server. Then each check, including the amount, will be verified manually or electronically using OCR technology (a user will verify and confirm the amount for each check). After that the backside of the check can be added as described above, and then both sides can be converted to the appropriate format (tiff, jpg, png, etc.) and the check can be sent for processing to the bank. In some instances, a standard desktop scanner can be used or any other image-capable device; and then a user can upload an image of multiple checks to the system.

Figure 16A:
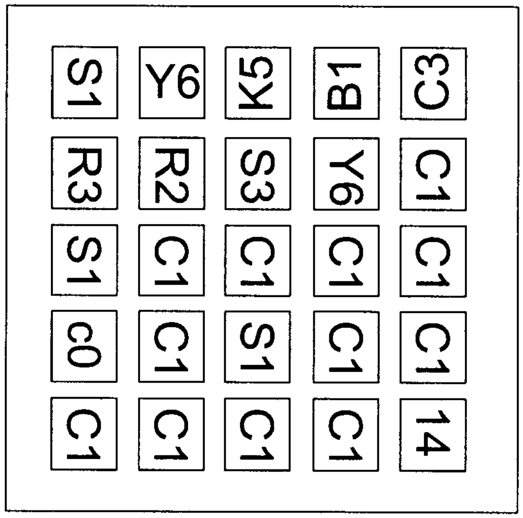
FIG. 16A-16E illustrate a method of the present disclosure for multiple check image scanning and recognition.
Figure 16B:
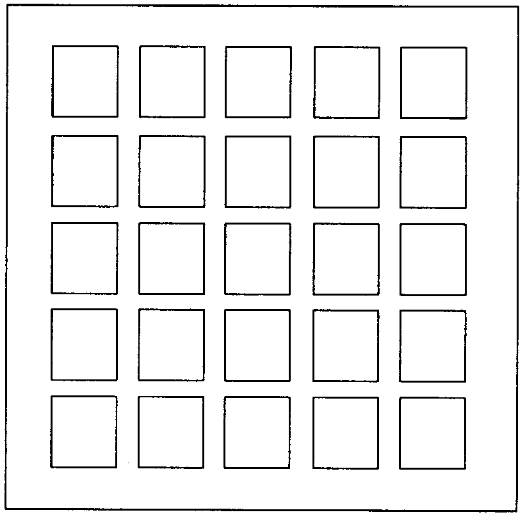
Figure 16C:
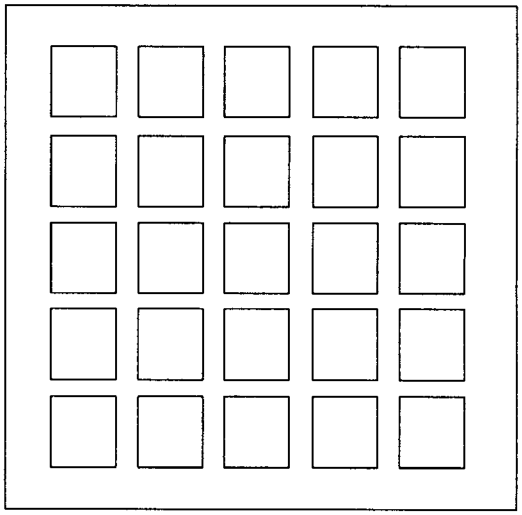
Figure 16D:
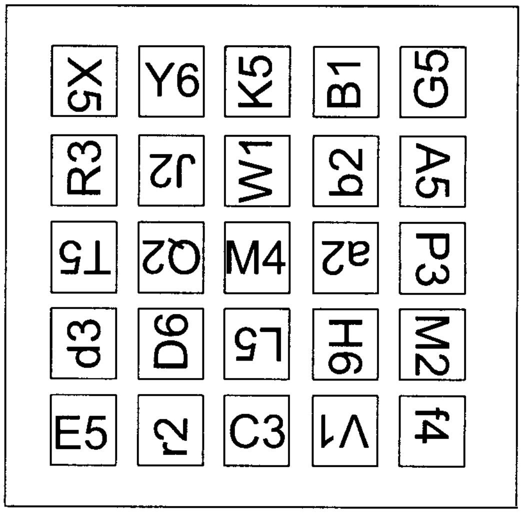
Figure 16E:
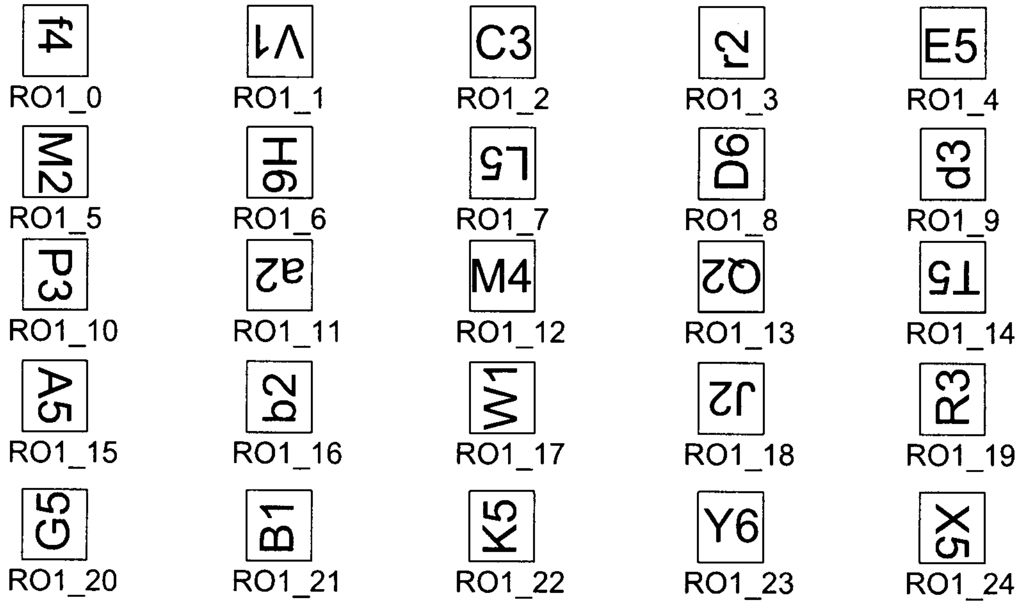

Since all checks are rectangular in shape and have standard dimensions, the system is configured to utilize the rectangular detection algorithm. One of the many approaches can be described as follows. 1. Convert an image to grayscale and median blur to smooth image. 2. Sharpen the image to enhance edges using a Gaussian smoothing filter and subtract the smoothed version from the original image (in a weighted way so the values of a constant area remain constant). 3. Threshold (If the pixel value is smaller than the threshold, it is set to 0, otherwise it is set to a maximum value) 4. Perform morphological transformations (erosion of noise). 5. Find contours and filter using minimum/maximum threshold area. 6. Crop and save ROI (rectangular of interest) using Numpy slicing. 7. After the ROIs are extracted, then the check amounts are confirmed by a user. 8. Then the checks one by one are sent to the processor. The method of multiple check depositing can be described in more detail with reference to FIGS. 16A-E. The image can be sharpen with cv2.filter2D( ), using a generic sharpen kernel as illustrated in FIG. 16A. It will be understood by a person skilled in the art that other kernels can be also used for sharpening as well as blurring an image. Then the image can be converted into a binary image by threshold as illustrated in FIG. 16B. Next step is to perform morphological transformations as shown in FIG. 16C, for example. Then, finding contours and filtering using cv2.contourArea( ) with minimum/maximum threshold areas as shown in FIG. 16D, and then, as illustrated in FIG. 16E, cropping each desired square region using Numpy slicing and saving each ROI as follows:

```
x,y,w,h=cv2.boundingRect(c)
ROI=image[y:y+h, x:x+h]
cv2.imwrite('ROI_{      }.png'.format(image_number), ROI)
```

The system of the present invention is configured to generate checks in accordance with the following process. Merchant deposits a check via mobile app and enters checkwriters phone number. The checkwriter receives an SMS inquiry such as "Did you authorize a check for a certain amount payable to a particular person/organization? Reply Yes/No or Reply STOP." If the reply is "Yes", then the checkwriter receives the next question: "Would you like to save time and write a check by using an application next time? (yes/no)." Next time the checkwriter needs to write a check using the following information: the amount, phone number of who will receive the check; pay the check out to name; and electronic signature. The front and back of the check will be auto-generated, so that a check-receiver (merchant) can deposit it on any mobile-banking application, including the system of the present invention. It should be noted that, as it currently stands, it wouldn't work for a deposit at a regular bank though, because the printed check will not have magnetic ink.

The following is a more detailed cryptography explanation of the described-above check auto-generation process. For an electronic signature to be legally binding in the US, it must meet the following requirements, such as intent to sign. 1. First of all, e-signatures are only valid if the person intends to sign. Like traditional signatures, there should be intent to sign in order for electronic signature to be legally binding. 2. Consent to do business electronically. 3. Clear signature attribution. 4. Record retention. Finally, records created for each transaction must be retained and available for reproductions as long as they accurately reflect the agreement for all parties. Each auto-generated check will have a text ID (e.g., UUID 36 characters) or a QR-code with encoded ID that will be located on the check (probably in the memo area). That UUID will have a unique record on the iWallet's server that will store the following information (aka audit trail) that is required for the signature to be valid by law (and more). Each audit trail includes the name and related email address of each signatory, a history of authentication, the created digital signatures, the IP addresses of signatory, GPS location of the payor, browser user-agent of the payor, the document's chain of custody (i.e., uploaded, sent, viewed, signed, etc.), timestamps for signature, completion status, who was the check sent to (pay to name), which phone number (or email) was the check sent to, what time was it sent, what time was it retrieved by the payee, IP of the payee, browser user-agent of the payee, GPS location of the payee, and timestamp it was deposited by the payee. According to another embodiment of the present invention, for stronger security, it would be possible to encrypt UUID using a private key of a trusted Certificate Authority (provided the identity of the person is verified in-person and trusted by CA) and use the resulting hash fingerprint for proofs of signature.

In some instances, the system of the present invention is configured to generate a virtual check by utilizing a check number generation, starting from, for example, number 100,000 to avoid confusion or allow for a user-defined number, where a user can select a number of his/her choosing).

The system of the present invention is also configured to provide the ability for a checkwriter to write a check by voice (for Siri, Alexa, Google home and the like): "Hey Siri, write a check to XXX, amount XXX." Siri's skill (plug-in) will need to confirm that person's name, amount and phone number. It might also be an artificial intelligence AI (or application agent) that will auto-write a check based on predetermined parameters.

When the system of the present disclosure generates a virtual check on the receiver's side, the receiver can print out a check or take a picture of the check off his second screen with a mobile phone to deposit a check. The system is also configured to add metadata to the check image file. All modern files store metadata, e.g., PDF, JPG, TIFF, PNG, and the like. The system can utilize the so-called exchangeable image file format (EXIF). That way the image recognition might not be needed. After the file is imported into the program, it will be first analyzed by software to extract this kind of data. The system of the present disclosure can store all check's data, plus encryption keys to avoid tempering. Image recognition might be required in certain cases to confirm authenticity and avoid fraud and could include an image or code or hologram, for example.

The system of the present invention is also configured to provide for review harvesting. Review posted on social media sites such as Google, Facebook, Instagram and the like are very important in our day and age. Just like after using Uber/Upwork a review can be solicited to help both consumers and businesses. A typical review process would include asking for thumbs up/down, if "down" then it goes to feedback form and if "up" it offers to leave a review on social media sites or wherever customer has an account. The process of the present disclosure is related to several payments flows. 1. QR-code payment with web-app (no iWallet app), it will land on a success web-page (Safari/Chrome) where a review is solicited; 2. QR-code payment in the iWallet app (application-based review is solicited); 3. When a credit card is charged by a merchant, typically iWallet merchant apps ask for the customer's phone number along with a card number. That phone # can be used to solicit feedback by SMS. 4. Same situation as in point number 3 above for checks and ACH payments. Each merchant would then have statistics such as: 1. Average rating on each platform (FB/IG/G/etc.); 2. Number of reviews on each platform; and 3. Historical data. This is also useful for companies with multiple employees/contractors as each contractor's performance can be tracked. Each contractor/employee can have one or more review sites.

The system of the present invention is further configured to provide for resolution optimization. It is always important to minimize the size of the check image because of speed of data transfer and processor load. The system is configured to start with the minimal size of the image and if it's rejected, increase the resolution 2, 3 more times until the image resolution is enough to avoid OCR-engine failures. OCR failure rate might also be based on other factors such as darkness of the check background color (black is ideal). So an image resolution (and file size) can be optimized by the system of the present disclosure based on other external factors such as colors, camera quality, processor speed and connection speed.

In a typical mobile banking deposit app a user has to click "take a picture of the check" button in order to initiate mobile check scanning. However, after testing it with our user we've realized that some users do not understand that they need to click the "submit" button after scanning the check to start the check processing. So according to a method of the present invention, an improvement has been made in the process by removing some extra tap for "taking a picture." The system provides a user with the ability to go straight into "check depositing camera mode" after tapping "deposit check" button on the home screen, thus saving one tap/click and going straight to taking a picture, which results in time saving.

In accordance with a method of the present invention, tips auto-check generation can also be done by payor based on the image of the original check. Similar to an ACH transaction tip (as discussed earlier), the system of the present disclosure can create a virtual check that can be deposited via a mobile device camera later by taking a picture of the computer screen or a one side of the printed paper check. This new virtual check generated by the system of the present invention is in addition to the regular paper check, thereby creating a combination of a physical check and a virtual tip check.

Sometimes it happens that a check amount is not entered correctly by the merchant when using a mobile deposit. The system of the present invention is configured to provide the ability to void a check (if done the same day), or to hold a check deposit for 15 minutes (or for a predetermined time) before initiating an ACH transaction to avoid potential errors and to give merchants an ability to redeposit a check with corrected information, when there is a discrepancy between the amount written on the check and the amount entered by the user.

The system of the present invention is configured to track and record GPS coordinates for each financial transaction in real-time for security purposes and to make it easier for consumers and/or merchants to recognize the origin of the transaction. However, in accordance with a method of the present invention, the GPS location information can also be transferred asynchronously, which is done to prevent transactions from being stuck and to help with the fraud score of the merchants.

As it's known the checks bounce sometimes and when one is doing a mobile deposit it is not easy to manage it. The system of the present invention provides further means of communication between the customer and a merchant, especially in cases where the customer does not believe what the merchant is saying (for example when the check bounced with R16-code "Frozen Account"). In these situations, it is possible to retrieve a returned check image from the bank (which is different from original image) and present it to the check writer in person (on a mobile phone or screen or paper) or by electronic communication such as email, sms, messengers, and the like. It is important because with this information the check writer can show this check directly to the bank and it will help alleviate potential confusion.

In another embodiment, a returned check image might be sent automatically directly by the merchant's processor to check writer's email, sms, messengers, and the like. The merchant or the check writer can request the system of the present invention to provide a bounced check image, or alternatively the system of the present invention can send it automatically to merchant and/or check writer.

Field service technicians sometimes have a problem with charging credit cards via the app or by phone call for various reasons. One way to charge a CC for a merchant is by taking a picture of the card holder's card and sending an email, sms, messengers, and the like to a particular email/phone number (of the merchant which is registered by the system of the present invention). All that's needed is the card image and the amount. The receiving server will recognize the sender's email, sms, messengers, and the like and will charge the card (either manually by service-side reps or automatically by image recognition software). A merchant can have multiple sender's IDs associated with him/her. The system of the present disclosure is configured to automatically provide card approval number in the merchant's feed with the ability to further void or refund the charge as needed. It will also send the confirmation and/or related error message back to the sender's ID (or multiple IDs).

Since sending a card by SMS/email violates PCI DSS security requirements, there is a better way to send a card image via internal phone application provided by the system of the present invention. That way the system is configured to encrypt everything and completely remove the image after card number recognition and tokenization, which makes it much more secure.

With reference to the discussed-above financial transactions involving secured checks backed by credit cards, the system of the present invention is also configured to provide the following functionality. A merchant can choose to secure only a portion of the check with credit card pre-authorization. In some instances, there might be also several credit cards used to secure a check. According to some embodiments of the present invention, the card pre-authorization might also cover more than the amount of the check to cover potential processing fees and other fees. According to another embodiment of the present invention, the system is configured to require a check to be secured over a certain limit. The limit can be set by the merchant (business owner) for his/her employees to use, ranging from zero to any number, for example.

The system of the present invention is designed to solve the problems associated with the optical character recognition (OCR) check processing.

The problems with some of the checks usually happen when a signature (an obstruction) goes over the ACH digits, such that the OCR engine struggles to process a check. For this reason, to reduce OCR errors, the method of the present invention allows for cleaning up the check manually or automatically before the check gets sent for OCR processing. Manually, the backoffice personnel can perform some minor clean ups to have just enough clearance for OCR to recognize the font. Automatically, the system is configured to remove the obstruction by training a Computer Vision Convolutional neural network to recognize a typical check font(s) and clean it up before submitting it to OCR processing by restoring a background image of the check. Additionally, the system of the present invention allows for an override feature to manually type in number by merchants or other personnel.

The system of the present invention allows for detecting unusual lower and upper limits of a user input. To deposit a check (or process a card) a merchant usually has to manually enter the amount into the system's application. However, zeros are always missing because it's easier to type in $1.00 instead of $100.00. When processing transactions for certain industries/certain merchants, the algorithm of the present invention can learn a typical amount that is usually being deposited, such that if the transaction is too small or too large, in addition to OCR recognition the software can flag the transactions with an unusual amount for either processor processing, algo processing, merchant processing or check-writers processing by making one of them confirm and double check an unusually low or high amount.

The system is further configured to assign rating to accounts based on history. Since for each transaction it is known a combination of: (a) account/routing number, and (b) account/routing/check number the system can assign each combination (a) a history. It can recognize account/routing combinations and give each account/routing a rating (similar to user ratings used by various e-commerce sites such as eBay, for example) of what % of checks went through from a particular account and how many checks were written before. So that if it's even just 1 check with 100%, it would give comfort to the merchant. For combination (b), the system can track the history of each check, voids, refunds, tips, redeposits, and fails, which makes it easier for a merchant to check the status of the check. For example, if the rating is less than 3 stars, the merchant can notify a consumer and require providing some additional assurance such as a check backed by additional mode of payment, e.g., a check backed by a credit card as described above.

The system of the present invention is further configured to help users in the situations involving multiple login names and server timeouts. When an account holder (sub-contractor or any other merchant) processes checks for several companies, there are cases where there should be a quick way to change logins in order to change the company account that the check will be deposited into. That can be done manually by the user by choosing from a list of pre-saved or new login names. The system can also automatically recognize the "pay to the order of" field and help correct or warn a user of a potential error in the name of the account. The system can also predict the correct account to be deposited in based on GPS location, amount, time of the day and other identifying check information. In case when the system's server is working, but processor's (bank's) server is down, the system can either automatically republish the transaction when the processor server comes back online or completely delete the transaction to prevent errors after a certain amount of time.

The system is further configured to assist users in cases when a background of a scanned check is too light for detection thereby providing a solution that would tell a user that they need to use a darker background; the scanned check should have darker or sharper background to see better edges, because the OCR engine needs to distinguish the borders of the paper check and to do that, the dark background is required. So, to avoid this type of error (inability to detect check borders), the software can detect it, warn the users, and explain to them what to do to avoid frustration associated with the described-above problem. The system can provide users with recommendations to change the background when scanning a check (put a check on the dark background, for example).

The system of the present invention is designed to detect an incorrectly printed MICR line. Because the OCR engine needs to see special account/routing/check # delimiters at the bottom of MICR line of the check. So, if some of the delimiters are missing or incorrect, it would cause an OCR. To avoid this type of error (missing delimiters), the system of the present invention can detect it, warn the user and either send a check for manual processing or automatically fix the problem by adding a virtual delimiter so that the OCR machine can pass it.

The system also allows for a one click copying of transaction approval number by allowing users to copy transaction approval # (authorization code showing that transaction went through) with just one tap. Since merchants need to save the approval # and paste it to other applications such as scheduling or accounting, etc., the system makes it cashier for them such that instead of highlighting and writing it down manually, the system can allow the users to save the approval code in the phone buffer by simply tapping on it.

The system of the present invention is equipped with wrong check amount flagging capabilities. As was discussed earlier in the instant application, there might be situations when the application-entered check amount is incorrect and differs from the written-on-the-check amount. There are processes to review it automatically and manually as was discussed earlier. The users of the application (i.e., merchants) need a way to flag an incorrect amount to be able to easily resolve the issue. The system provides a "flag wrong amount" feature, which is a button that would automatically send a notification to the team or directly to a partner to review the amount and adjust it accordingly and allowing merchants to change the incorrect amount after the check has been processed.

The system is also configured to provide the check image security (MICR line). Paper checks have exposed routing and account numbers (MICR line) and it might not be safe and non-compliant with the PCI payment card industry standard to save and show images of checks. The method of the present invention provides a solution that includes the following steps: blurring the MICR line after a predetermined amount of time; deleting the MICR line after a predetermined amount of time; and partially blurring/deleting the MICR line after a predetermined amount of time. An admin might have access to override this, which can be reversable for it can be restored, if needed. Also, in case a check doesn't go through or in case of similar authorization/clearance events, the MICR line will be made automatically available.

The system can also allow for a bad check interception due to an error. In a situation when a check was optically recognized by an OCR engine, but there is a mistake in the MICR line/code, possibly due to signature or other obstructions, a bank would return such a check with an error "unable to locate account" or any other check errors. In accordance with the method of the present invention, to improve the user (merchant) experience, the system is configured to intercept this bad check, re-run it through another OCR or through manual review and automatically resubmit this check again without merchant's involvement.

After a check has been deposited into the check21 system, merchants and banks don't know what to do with them. Since a check becomes a legal digital copy after being scanned, it can be given back to the check writer and/or discarded if the OCR system decides that the check is legible enough and will not require re-scanning. The detection and prediction of that is usually done upon recognizing MICR characters in real-time on the scanning device or on the server. The system of the present invention is configured to make determination whether to keep the check or discard based on the assigned confidence level the scan is correct (for example, if the confidence level is more than 90% then it's okay to discard).

The system also provides for bad check management method. Since Check21 images are returned electronically to the system by the bank, for a large merchant it's important to manage all bad checks in one place. The system includes a "Dispute" page that would be further divided into "unrecoverable" (stopped, closed account, etc.) and "recoverable" checks (NSF, etc.). Unrecoverable checks can only be submitted along with an issuing bank letter or other official confirmation that can be delivered physically or electronically that the check is now good and can be redeposited. Recoverable checks can be re-run by simply pressing a resubmit button. A bad check notification is usually sent to a customer (by email, sms, msgr, etc.), but the dispute panel will also have "read"/"unread" status so that the merchant can make sure no checks are missed.

Bad checks can also be assigned further for sub-users (such as an accountant) to follow up on and to either recover the debt or make notes and to write it off and to account for it. Bad check's images will be sent to sub-users along with the description of the problem.

The system of the present invention further includes security and readability features. For example, the checks that don't have a clear picture will be identified and dynamically asked for a re-scan via an additional pop-up screen/window in the system's application. For security, checks can be assigned a risk score based on the following factors.

1. Must be Personalized. Complete name and address pre-printed by the bank (no P.O. Boxes).
2. Date must be current, i.e., never post-dated.
3 Bank I.D. #
4 Payee must be your company.
5 Amounts written and numerical must be the same.
6 Bank name and address must be printed on the check.
7 Bank and customer computer numbers must be printed on check.
8 Customer signature—Must be signed in your presence.
9. Approximately 85% of all bad checks are written on accounts only a few months old and bear check numbers between 101 and 150—this can be detected by software/method of the present invention.

If a check has a high-risk profile, it can be de-risked by: asking for persons ID; pulling their soft credit (asking credit questions); asking for a secured check backed by a credit card, for example; and asking to verify their bank account using services such as Plaid. Bad checks might have an extra service provided by the system of the present invention to automatically send a "Letter Notice" with signature required and be put through to collections or "Bad check program" that is used in multiple states, wherein the system auto sends letters on behalf of the merchant.

It is known that some business owners do not want their sub accounts to see a list of old transactions due to various reasons such as potential competition and security concerns. To address the wishes of those business owners, the system of the present invention is configured to restrict the view of check/card transactions to a certain number of transactions or days for sub-accounts.

The system provides a solution for a 3-part check mobile detection. It's very common for businesses to receive payments by business checks, which are in the form of a 3-fold checks. The problem here is that all major mobile based systems are looking for the check to be a certain shape and can't process 3-fold checks. In accordance with the method of the present invention, this problem is solved in these two ways. First version is when the whole 3-part sheet is photographed. In this case the MICR line can be located and depending on which part of the sheet it is located (top, middle or bottom), the check can be extracted. A user might also be asked to confirm which check if there is more than one check that is detected. Second version is when the check is photographed with one portion of the sheet being exposed (white) and since the image processing algorithm is looking for 4 dark sides, it will not be able to extract the image based on the old algorithm. To solve this issue an MICR will again be detected and check truncated based on the MICR position. A user input might be requested in case the check is not clear. For a situation with top white, a check number in combination with MICR position can be used. For a situation with left of write white—"pay to the order of" for left side or "dollars"/"signature" can be used to detect the right side of the check.

There are many commercially-available services that provide "check guaranteed" service for a percent (%) of the processing amount. These services very often do not want to or cannot (not allowed by law) accept certain check types such as: temporary checks (detected when the check number is less than 101); third-party checks (detected when the pay to name doesn't match the merchant name); money orders (detected when there is a word "Money orders" on it); payroll checks (detected when the pay to name doesn't match the merchant name); and checks written to employees or self (detected when the pay to name doesn't match the merchant name). The method of the present invention provides the following solution. Instead of declining checks like this or whenever there is a risk profile or compliance restriction, it is possible to use a Secured check guaranteed by another asset that is described above such as the credit card backed or any other asset-backed transactions. Additionally, the system is configured to provide custom check guaranteed, against a particular merchant(s) or transaction types or check risk profiles as opposed to paying for all the checks across the board.

The system provides users with the following set of additional features that will be described below in more detail. It allows for recognizing bank messages to create better action and better user experience. If a check is returned by the bank, it's common that a bank would write an additional note on the check that is not visible for software or for API. That's why the system provides for a new way to process check 21 images (check returns) looking at the image of the returned check, using OCR technology, recognizing the writing and sending to merchants (system's users) thereby extracting additional information and sending to merchants.

The system provides for automatic recognition of batch discrepancies (batch is a number of checks per day that is sent for secondary manual review) and connecting them to incorrectly processed checks. It's common in check21 situations to have a user enter an incorrect amount. In these instances, a check might be automatically adjusted by the bank and then the whole daily batch will be affected. In accordance with the method of the present invention, the system can analyze the check and ask for manual/human overview to 100% understand where the discrepancy came from.

The system is configured to automatically recognize missing signature (or date, etc.) error in a situation when a check writer forgets to write down a signature on a check or date the check. The system's OCR software can detect this condition and warn the user (merchant or check writer) thereby preventing the merchant from depositing bad checks.

The system is also designed to automatically reach out to a check writer in case of a missing signature or date to get an electronic signature or date (to sign a digital copy of the check).

The system provides the ability for a check writer to securely self-upload a check image (send bill) rather than having merchant taking a picture. It is usually common for a merchant to deposit a check of the payee (check writer). However, the system now has a way to send to the check writer a link, which will allow the payee (check writer) to upload a picture of the check in a more secure way. Thus, not only the image will be encrypted, but also the more sensitive routing/account numbers of the check.

The system provides for reconciling check/card transactions by having two tabs: reconciled and non-reconciled. Since it is very important for a merchant to understand where the transactions came from, the system includes an ability of an advanced check register where each check is moved from "unreconciled" tab to "reconciled" after it is reviewed by the owner/accounting person.

The system is further configured to generate customer reviews after capturing remote customer signature on mobile application. The system provides a way to generate online reviews for merchants that receive paper checks by sending a link to capture customers signature to finalize a transaction or to capture customers check securely. After clicking "submit" button, a user is forwarded to a review page to help boost online reputation for a merchant; thereby providing a review page for users to leave review of merchant's services.

The system is configured to provide an ability for bad check writer that is marked in the system as not-acceptable to upload supporting documentation to clear the not-acceptability. Since the processors do not want to take/process checks from check writers that had a bad check at least once before. The processors need a bank letter or similar proofs from the check writer that the checking account is in good standing. The method of the present invention makes it possible to allow a check writer (or a merchant) to upload supporting documentation to clear the bad status; and the system will send the supporting documents to a bank/processor.

The system is configured to import a check image with either automatic check boundaries or manual check boundaries (in case if there is no dark background). A lot of times when sending an electronic check image, the users tend to scan a check in the scanner, instead of taking a picture on the dark background, which is supposed to help OCR engine to recognize a scanned check. If that happens, and the software is having hard time importing such image, it's possible to manually (provided by the system to a user to edit boundaries by cutting out the boundaries of the check to submit an OCR acceptable image.

The system provides a method for merchants to reconcile each check batch by sorting by amount to make it easier to find transactions. If the amount is the same (service call), then the merchants must open every single check, which is a tedious task. The system is configured to either show check writer's name (from automatic OCR recognition), or add a button to quickly show each check, at least for the checks that have the same amount.

The system provides an ability to postdate a check to address situations when check writers don't have the money in their account right away and merchants are content with accepting a check in a week, but doing the job today. After clicking "submit", the system can generate a prompt: would you like to deposit the check "now" or "later" and if "later", it will post-date the check to the desired date. It can also offer to finance a check writer and lower the risk for the merchant.

When doing thumbs up/down reviews for credit card processing flow or check processing flow, it is possible to add reviews not for the whole company, but on a sub-account level, where each technician can harvest reviews for their own area by having its own url for users to leave a review.

The system is configured to provide for operating in an offline mode (for check only, as credit cards already have their own mechanism). In general, it is a postponed transaction, which will be saved locally by the system in its application in state "pending" and then, when the internet is back, it will process a payment, thereby allowing merchants to run offline transactions one by one so that they can see approvals and declines. In case of decline it will show a decline on screen; and an extra email for offline decline will be sent too.

The system is equipped with a feature that allows adding a processing fee (a.k.a. service fee) to process a check. Since check guarantee service has a percent (%) fee attached to it due to risks, it is possible to convert a mobile check deposit into an additional ACH transaction to cover the processing fee.

The system is configured to provide for credit card dispute and check dispute resolution. It is very common for consumers to dispute their credit card and sometimes checks charges. It might happen for various reasons such as fraud, dissatisfaction, unauthorized use, and the like. Often, it is required to provide proof of the transaction, however banks do not take voicemail files as proof. For this reason, the system of the present invention created a capability for merchants to upload voice recording files that will be transcribed automatically or manually into a written form. In addition to that, a paper with voice transcription will have a voice recording URL and an encoded by QR URL with the ability for banks to open said files and listen to them as proofs.

Since some banks don't like the universal backside of the check or pay close attention to it, the system is configured to capture backside of the check for checks over certain age (e.g., over 3 months old) and/or over certain amount (e.g., over $1,000) and/or for certain banks.

The system provides for capturing a check image to send a secure link to the check writer to upload a check via Check21 messaging system. Virtual check image is saved by the system and the user can use the link to generate checks fast, just by typing an amount and payee's name. When the merchant sends request to pay to the check writer and the check writer takes the picture of the check and then uploads it to a secure website, the system is configured to offer to the checkwriter to use that image as a template to generate new checks; thereby allowing the check writer to send the link with the mobile check image as a payment to merchants The system also provides for tracking the "viewed" status of the link sent by email or sms, etc. of the secured Check21 capturing link, when a check writer would receive a link from the merchant, which is beneficial for both the merchant and the check writer. It allows showing originating sub-account in the dashboard when the secured Check21 link is sent (for tracking purposes how the check was originated, i.e., by which sub-account. It also allows sending a secured Check21 image from the checkwriter to the merchant based on the template that is generated as per method discussed in the above paragraph.

A method for conducting secure electronic financial transactions in accordance with an embodiment of the present invention is illustrated in FIG. 17. Method 400 includes receiving a request, from a user, to perform a transaction with a merchant (step 410), generating a virtual check comprising a checking account number, a bank routing number, and a date (step 420), displaying the virtual check on at least one of a display of an electronic device of a user or the merchant (step 430), receiving input from the user corresponding to at least one of a plurality of check fields (step 440), receiving a virtual signature from the user (step 450), encrypting the virtual signature (step 460), storing the encrypted virtual signature in a database (step 470), decrypting and embedding, in the image of the virtual check, the virtual signature received from the user (step 480), populating the virtual check based on the received input (step 490), and depositing the virtual check (step 495). The method 400 can further include the step of encrypting and storing the account number and the routing number of the virtual check in a database.

According to another related embodiment of the present invention, the method for conducting electronic financial transactions includes receiving a request, from a user, to perform a transaction with a merchant; generating a virtual check by scanning a physical check filled out and signed by the user; displaying the virtual check on at least one of a display of an electronic device of a user or the merchant; receiving a virtual signature from the user; encrypting the virtual signature; storing the encrypted virtual signature in a database; and depositing the virtual check. The method can further include the step of encrypting and storing an account number and a routing number of the scanned physical check in a database. It can also include the step of decrypting and embedding the virtual check with the virtual signature if the physical check was not signed by the user.

According to some embodiments of the present invention, the system can be integrated into various web-based, mobile and desktop applications (such as wordpress/Chrome/quickbooks, etc.) by virtue of plug-ins thereby allowing users to conduct financial transactions as described above while using various applications. For example, the quick books reconciliation plugin configured for automatically downloading approved transactions to QuickBooks.

In some instances, albeit rare, some banks could decline an image of a check, in particular a check's backside, issuing the so-called X02 error code due to an invalid check image. According to a method of the present invention, instead of sending the check's image via Check21 rail, the solution is to provide a seamless experience for the merchant by converting a physical check image into the account/routing number and sent as an ACH transaction, when/if the check returns with the X02 error code due to a not-matching backside image.

In relation to a detailed discussion above about automatically detecting check's backside from the dimensions of the front side of the check, it has been realized that it's also possible to use the backside image based on the routing number. Since usually each bank has a set routing number and each bank has the most common check design, it is possible to detect the design of each check based on the routing number.

Since some check images are out of focus, the system of the present invention makes a user take three or more photos. When a software detects that a user is trying to process the same amount more than 3 times in a row within a short amount of time, the system accepts that check and sends it to "manual override". Then, the operator manually looks at it and helps the software to process it by removing the background or doing other photoshop-like operations. The problem is that sometimes all three of those pictures are not acceptable and more images are needed, that is why a video of the check from different angles is needed. The solution is switching to "live" mode (3+ seconds video) when doing 2nd and 3rd pics for override with an intent to get more information and get better-quality pictures. In this live mode, the system of the present invention can also ask the user to rotate the camera around the check 360 degrees (similar to an iPhone Facetime scanning setup feature) in order to get a video from different angles.

According to another related embodiment of the present invention, the method for conducting electronic financial transactions includes identifying, by a computing system, a first payment source account held by an account holder; receiving, by computing system, transaction data associated with a transaction initiated by the account holder with a merchant using the first payment source account, the transaction having a transaction amount; requesting, by a computing system, via a first network a first transfer of the transaction amount from the first payment source account within a predetermined time; receiving a virtual signature from the account holder; encrypting the virtual signature; storing the encrypted virtual signature in a database; and transferring the transaction amount to pay the merchant. In some instances, the method can also include encrypting and storing the transaction data in a database; charging tips through the ACH network as a separate transaction upon receiving the virtual signature from the user; confirming and accepting terms of service upon receiving the virtual signature form the user; and performing a reputation management comprising an on-line review harvesting by providing a user with a review page upon receiving the virtual signature from the user for leaving reviews for merchants' services.

The system is further configured to perform decrypting the virtual signature upon the account holder's authentication (i.e., verifying login credentials of the account holder, etc.) and processing an invoice prepared by the merchant for payment by populating the invoice with the decrypted signature. The system can be further configured to perform decrypting the virtual signature upon the account holder's authentication and populating a credit card receipt with the decrypted signature. According to some embodiments of the present invention, the method can further include collecting meta data associated with the signature writing process, encrypting and storing the meta data in the database. The meta data associated with the signature writing process can include various parameters, such as the pressure applied by the account holder upon writing, which can be detected and measured by a pressure sensor of an electronic device used by the account holder or merchant; the speed of writing, which can be detected by means of time stamping; the sequence of characters (i.e., in which order each character in the signature is written); the GPS coordinates, which can be determined by a GPS sensor of an electronic device used by the account holder or merchant; IP address, screen resolution, and date and time of the signature.

Banks and especially credit card companies draw a sharp distinction between card/check/etc. "present" transactions and card/check/etc. "not-present" transactions. This is done primarily for the purposes of fraud prevention. In-person transactions have much lower fraud rates. In credit cards most of the transactions are called "present" when they are swiped or tapped. Keyed in transactions are generally considered card-not-present. However, whenever merchant generates an imprint of the card, that card can be called a "card-present". Since imprinters are rarely used now and the cards don't have embossed card numbers anymore, there must be a new way, which is offered by the following method of the present invention.

Since smartphones are so popular now and they all have cameras, this can be used in addition to GPS locations.

1 Card/Check/etc. image can have a GPS location built in.

2. The above GPS location can be matched to customers' location at the time of charging.

3. The way to detect a GPS location of the cardholder is either through:
   a. records of the cell phone company, or
   b. by sending cardholder and link (by sms/email/etc.) and capturing cardholders GPS location at the time of signature. So if the GPS location of the merchant and GPS location of the payee are within allowed range, a transaction can be called "card-present."

For the purpose of cardholder authentication, there might be other tools that can be used to detect "virtual presence" of the cardholder. Such as 3d video and matching customer's ID or other combinations of satisfactory presence and authenticity. It should be noted that in addition to the GPS, other technologies, such as GSM triangulation and Bluetooth, for example, can be employed for the described-above purpose of determining "card-present" transactions. The described-above method of fraud prevention can be applicable to various cards (e.g., credit card, debit cards, gift cards and the like as well as checks or any other suitable financial instruments). An exemplary method of the present invention could include the following steps: (i) taking a photo of the card of the client, (ii) storing a GPS location where the photo was taken, (iii) determining a GPS location of the client (by sending an SMS to the client asking to sign in order to determine where the signature was made), (iv) if the GPS locations are matched, then it means that the client is present, i.e., card transaction is "present." In some instances, the transaction can be called "card present" if the location of the client is within a predetermined distance (e.g. 500 ft. or 1000 ft.). In some instances, a video call to the client/card holder can be employed if the card holder is remotely located to validate the "card holder present" situation.

There are two requirements to validate the "card-present" status, which is (i) a card needs to be present, and (ii) a cardholder needs to be present. The first requirement can be detected using the following method, using just a smartphone with no extra hardware: a) using NFC (by reading special non-visible NFC markers) merchant's phone or cardholders phone or other authorized party; b) using NFC (by writing special non-visible NFC markers into NFC memory) merchant's phone or cardholders phone or other authorized party; c) using camera for picture by merchant's phone or cardholders phone or other authorized party; d)

using camera for video by merchant's phone or cardholders phone or other authorized party e) using camera in a combination with merchants certification or cardholder certification or other authorized party; f) certification by merchant's or cardholders or other authorized party; or a combination of the above methods. Extracting other information from the phone such as Google ID/Apple ID/Samsung ID, as well as phone number during the NFC transaction and sending it to the processor can also be used to reduce the transaction risk and to prevent fraud. The second requirement can be detected using the following methods: a) something the cardholder has such as any physical object in the possession of the user, for example a security token (USB stick), a bank card, a key, or a phone; b) something the user knows: certain knowledge only known to the user, such as a password, PIN, or the like; c) some physical characteristic attributable to the user (biometrics), such as a fingerprint, eye iris, voice, typing speed, pattern in key press intervals, etc.; d) the user's location: some connection to a specific computing network, or detection of the location using a GPS, GSM, Bluetooth, or WIFI signal to identify the location, or a combination of the above methods. In some instances, a physical location of a home or a business that is owned by a cardholder plus virtual real-time or offline cardholder authorization might be a way to replace the requirement for physical cardholder presence.

As described above, the "card-present" state can be detected by using a camera of a smart device, such as a phone or tablet or glasses, and the like. According to the method of the present invention, the following is the process of taking a picture of the card.

Figure 18:
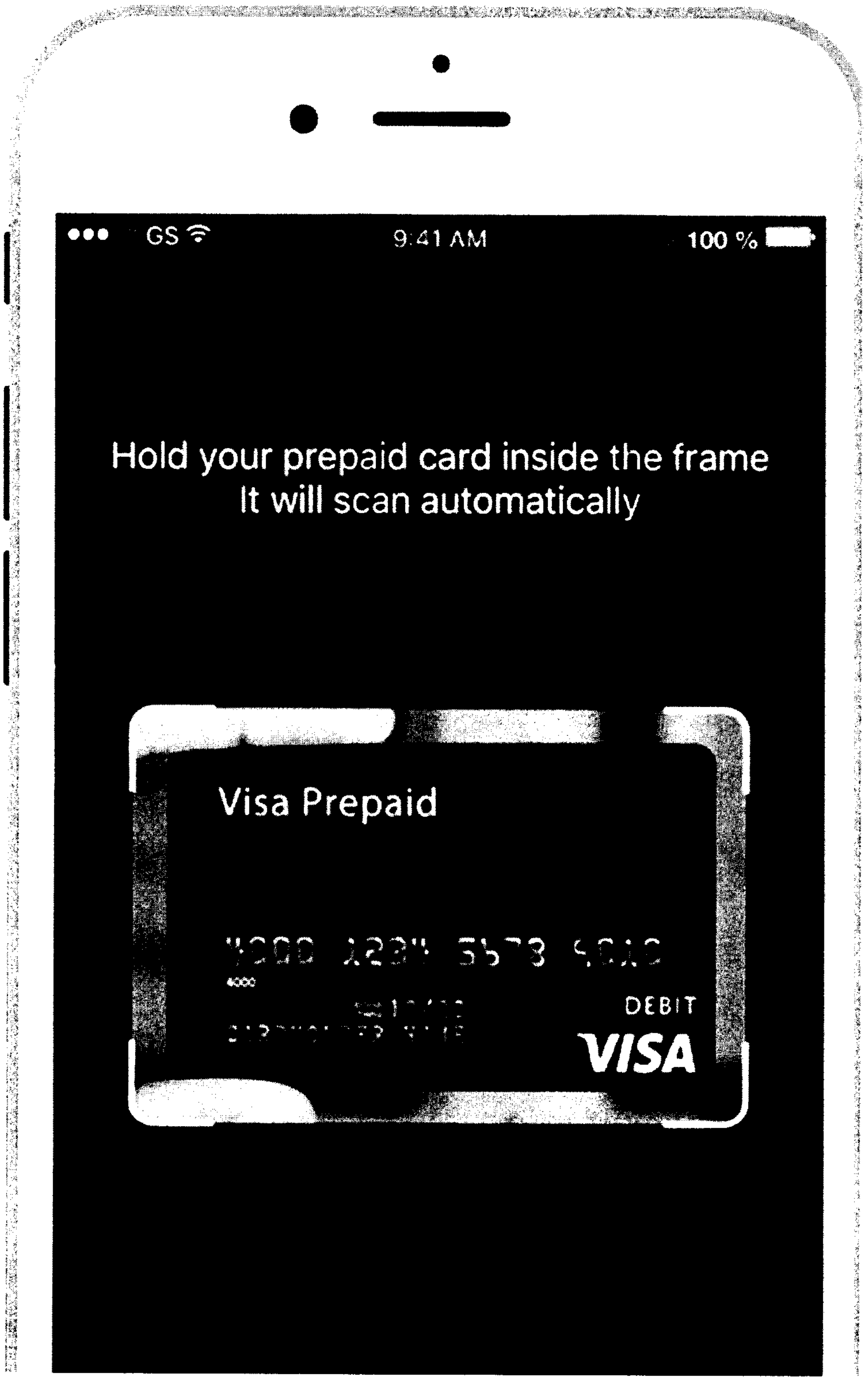
FIG. 18 is a schematic diagram illustrating an embodiment of the present invention for determining card-present status of a financial transaction.
Figure 19:
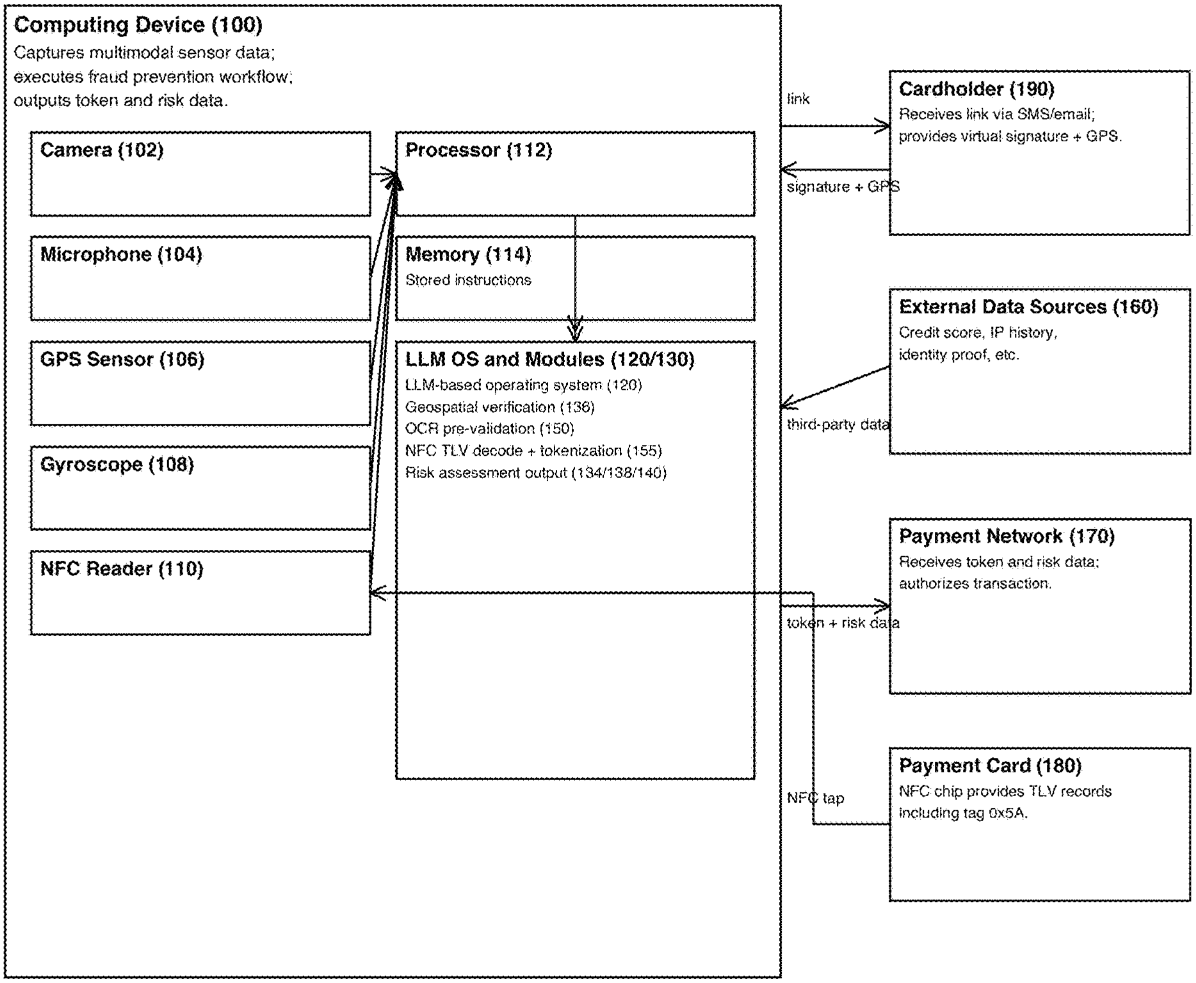
FIG. 19 illustrates an exemplary system-level architecture depicting a computing device with processors, memory, sensors, an LLM-based operating system, and integrated fraud-prevention modules, along with associated external entities.

1. Frame outlining the card edges/perimeter, this will make sure that a user will have a certain distance from card to camera, not too close and not too far. The system is configured to allow the user to hold a card inside a frame to scan the card automatically, as shown in FIG. 18.
2. Preset lens focus—since we know the distance, we can optimize lens focusing.
3. OCR of at least one symbol. The minimum requirement might be detecting at least one symbol to know that the image is acceptable enough.
4. The program will take multiple images/short video prior to the final capturing event to be used in analyzing and assessing risk profile of the card.
5. The OCR engine will pre-validate session to detect errors in photos such as blurriness, glare, document occlusion or damaged ID documents, and will communicate with users if an image needs to be retaken. Regarding the errors associated with blurry images, the system of the present invention is configured for computing the Fast Fourier Transform of the image and then examining the distribution of low and high frequencies: if there is a low number of high frequencies, then the image can be considered blurry. Alternatively, the method can employ the Laplacian operator, which is used to measure the 2nd derivative of an image, plus other more advanced methods. Regarding the errors associated with glare, the system is configured to perform a glare detection method, which is a simple thresholding method including the steps of converting the image to grayscale, setting threshold values (that are larger than 250, for example), counting the number of non-zeros, and if the count is larger than, for example 1% of the image size, then classifying the image as glared. Alternatively, the system can perform the method that divides the document into blocks and collects luminance features from the original image and black-white strokes histograms of the binarized image. Finally, glare is detected using a convolutional neural network on the aforementioned histograms and luminance features. The network consists of several feature extraction blocks, one for each type of input, and the detection block, which calculates the resulting glare heatmap based on the output of the extraction part. Regarding the occlusion detection, the system is configured for object tracking, an essential part in dealing with occlusions is writing an efficient cost function, which will be able to discriminate between the occluded object and the object that is occluding it. If the cost function is not ok, the object instances (ids) may swap and the object will be incorrectly tracked. There are numerous ways in which cost functions can be written, wherein some methods use CNNs, as described in detail in the article called *Simple Online and Realtime Tracking With a Deep Association Metric*, by Wojke et al., published by University of Koblenz-Landau, Queensland University of Technology, the content of which is incorporated by reference in its entirety; while some prefer to have more control and aggregate features (as described in detail in the article called *Stabilization and Validation of* 3*D Object Position Using Multimodal Sensor Fusion and Semantic Segmentation* by Muresan et al., published on Feb. 18, 2020 by Computer Science Department of Technical University of Cluj-Napoca, Romania, the content of which is incorporated by reference in its entirety. In the case of dense Stereo Vision reconstruction, occlusion happens when a region is seen with the left camera and not seen with the right (or vice versa). In the disparity map this occluded region appears black (because the corresponding pixels in that region have no equivalent in the other image). Some techniques use the so-called background filling algorithms which fill the occluded black region with pixels coming from the background. Other reconstruction methods simply let those pixels with no values in the disparity map, because the pixels coming from the background filling method may be incorrect in those regions. Regarding the detection of damaged documents, the system is configured to solve it by using morphological operations such as eroding and dilating. These two operations will help in creating closed rectangles. The erosion thickens all the lines, so to get back to a normal width there is a need to dilate after eroding. Alternatively, the method can include converting the frame to grayscale, downsampling it (to increase performance during detection), equalizing the histogram using cv::equalizeHist, finding markers using cv::aruco::detectMarkers, correlating markers (in case of multiple controllers), analyzing markers (position and rotation), and computing the result and applying some error correction.
6. The OCR engine will compare ratios, between points on a cards image and cards age and card imperfections, cards BIN (first 6 digits)—based design (colors, styles, logos, etc.), validation with video analysis, device, and network fingerprinting.

Another embodiment of the present invention, that might be used by itself or in combination with the described-above methods is a holographic image detection on cards using a smartphone. Most major credit card companies such as Visa, MasterCard, and Discover use a holographic image to make it harder to create a fake credit card. There are multiple ways to detect a valid hologram:

a. by taking multiple pictures at different angles and making sure that the hologram is "moving."

b. since most modern phones have multiple cameras that are located at slightly different angles, it's possible to take a picture/video of the image using multiple cameras at the same time and be able to immediately see/detect the holographic "moving" image with high accuracy.

Card present transactions refer to any transaction where the physical credit or debit card is present at the point of sale. Examples of card present transactions include swiping or inserting the card into a card reader at a retail store or entering the card's chip into a point-of-sale terminal. When a modern card is tapped, i.e., powered and read by an NFC antenna, it's considered a "card present" transaction. In some instances, as described above, card present transactions can also refer to any transactions where a cardholder is present, but the physical card is not present at the point of sale. Card present transactions can also refer to any instances where both the card and cardholder are present at the point of sale.

On the other hand, "card not present" transactions occur when the credit/debit card and the cardholder are not physically present at the time of purchase. Examples of card not present transactions include online purchases, phone orders, and mail-order transactions. In these cases, the card information is typically entered manually by the customer or merchant, and the transaction is authorized through a secure payment gateway.

Card not present transactions can pose a higher risk for fraud because the card information may be stolen or used without the cardholder's permission. Therefore, merchants may use additional security measures to prevent fraudulent transactions, such as requesting additional verification or requiring the use of a secure payment method.

However, there are card transactions that are being run as "card not present" for certain transactions beneficial due to costs or compliance such as merchant category code (MCC), reliability optimization (transactions through varied gateways), multiprocessor environment support, processor agnostic card storage, and the like.

The present disclosure provides a process of converting NFC card reading on a smart phone (or any other suitable computer device such as notebook, tablet, etc.) to "card not present" status from "card present" status.

The process works in the following way and it's a non-standard NFC reading algorithm (can be used for smartphones having an Android operating system, for example or for other computing devices with similar capabilities):

1. Connect, power and read the NFC chip on the card using the NFC reader of the smart phone.
2. Query the NFC chip for its data files and extract the PAN (card) number from those files.
   a. Decode NFC records that are encoded in tag-length-value (TLV) format.
   b. The PAN is typically encoded in a data object with the tag 0x5A, that is where the card number (PAN) and expiration date can be extracted.
3. Perform this as a so-called "zero-dollar transaction" to verify the card validity and to store a token.

In addition to NFC there are other devices on the phone that can be used at the same time or separately to de-risk the transaction, i.e., to minimize the risk.

1. NFC plus camera, on one or on both sides. The camera can detect/record during the NFC reading session the card getting closer or the person(s) doing the transaction(s) as well the holographic image and other unique factors to that card.
2. NFC plus GPS. Determining a Geo position of the card that can aid in fraud detection.
3. NFC and proximity sensor. While a proximity sensor can't record videos, it can detect an object when it's getting closer than 30 mm and can serve as a signal of card location assurance.
4. NFC plus gyroscope. When the phone is stationary, it can be detected, and its micro movements can be used to detect tap presence. When the phone is mobile (in hands), the movement of the phone during the NFC reading session can be detected and be served as proof of transaction.
5. NFC and microphone. Recording of the sounds and detecting the distance from the card to the phone can be detected to serve as proof of transaction.

It should be noted that any combinations of 1, 2, 3, 4 and 5 as described above can be used, in accordance with one embodiment of the present invention.

Extracting other information from the phone such as Google ID/Apple ID/Samsung ID, as well as phone number during the NFC transaction and sending it to the processor can also be used to reduce the transaction risk and to prevent fraud.

A system and method for conducting secure debit and credit card electronic financial transactions involving NFC card reading using a computer device includes the steps of identifying, by a computing system, a first payment source account held by a card holder; receiving, by computing system, transaction data associated with a transaction initiated by the cardholder with a merchant using the first payment source account, the transaction having a transaction amount; requesting, by a computing system, via a first network a first transfer of the transaction amount from the first payment source account within a predetermined time; determining a card status; storing the meta data associated with the transaction in a database wherein the meta data includes at least the card status; if the card status is card-present status, converting the card-present status into card-not-present status by virtue of the NFC card reading process using a computer device having an NFC card reading capabilities; and transferring the transaction amount to pay the merchant. The card-present status condition is met when the card is present, or the cardholder is present, or both. Conversely, when both the card and cardholder are not present, the card-not-present status is assigned to a financial transaction. The process of converting the card-present status into card-not-present status includes the steps of connecting, powering and reading an NFC chip on the card using an NFC reader of the computer device, querying the NFC chip for its data files and extracting at least one of a PAN card number and expiration date from the data files by decoding NFC records that are encoded in tag-length-value (TLV) format, and performing a "zero-dollar transaction" to verify the card validity and to store a token. The process can also include the step of using a camera of the computer device, detecting and recording during the NFC card reading session, unique characteristics of the card comprising at least one of positioning or movement of the card, holographic image of the card, and an image of a person doing the transaction. It can also include the step of determining a geo-position of the card using a GPS sensor of the computing device for the purposes of fraud detection, or the step of using a gyroscope of the computing device, detecting micro movements of the computer device for tap presence, if the computing device is stationary, or the step of using a gyroscope of the computing device, detecting the movement of the computing device during the NFC reading session for proof of transaction, if the computing device is not stationary, or the step of using a microphone of the computing device, recording sounds and detecting the distance from the card to the computing device for proof of transaction, or a combination of any of the above steps. The method of the present invention can also include the step of during the NFC reading session, extracting additional data from the computing device, wherein the data is at least one of computing device ID number and phone number, and sending the data to a processor for the transaction risk reduction and fraud prevention.

The method of the present invention can include these additional inventive features.

1. Detecting missing digits in account number of defective check picture based on previous check images by virtue of machine learning process.
2. Appliance insurance costs based on GPS location of transaction e.g., higher end homes have more expensive appliances, which can be used for extended warranty pricing optimization and customization.
3. Detecting a number of home appliances and type of appliances based on on/off pattern such as Wi-Fi load and signal strength and providing insurance quote based on that parameter for the purposes of extended warranty pricing optimization and customization.
4. Detection of number of people based on Wi-Fi signal strength due to signal interference to quote the insurance for the purposes of extended warranty pricing customization and optimization.
5. Detection of the phone type and dynamic insurance quote, wherein more expensive phones might cause lower or higher quote based on previous data, which can be used for the purposes of extended warranty optimization and customization applicable to everything related to appliances/home repair including furniture/mattresses, windows, and the like.
6. Appliance age detection based on WIFI signal, Bluetooth signal, noise of the appliance, pics of model/serial or pictures of the unit and showing insurance quote based on those parameters.

7a. Secure and encrypted usage of a single payment method for repair company and insurance company. That is ability to pass payments and customer data from one company (such as an appliance company, for example) to another (an insurance company) to be able to sign up somebody for insurance, thereby allowing for a safe method of providing data within the system of the present invention to pass customer data such as an encrypted card number to an insurance company.

7b. Monetizing repair warranty calls by selling extended warranty to customers by referring the customers to sign up directly with the insurance, which constitutes a signature based transaction to buy extended warranty as opposed to payment-based transaction as described in 7a above.

8. Dynamically offer different insurance providers during home service repair checkout process, including self-company-insurance, based on merchant settings.
9. Tracking remote signature capture manual override (in case a cardholder cannot receive a link to be able to sign to approve transaction) with a unique link and device type to prevent sub-account fraud. It's very important that automated link has a flag in it that is different from manually shared link. So that the owner of the company would know and can track the overrides to have an early warning of fraud/suspicious behavior of sub-accounts, wherein a remote transaction without signature can be deemed valid after a signature capture manual override, however, if there are many overrides, it's a red flag event prompting to notify the merchant.
10. Determine GPS location of technicians and customers and provide google review page for that location, which is the reputation management based on the GPS location to leave review to a particular local branch, where GPS is determined when the technician sends an URL/remote signature capture to customer, thereby allowing for a review that is specific to a particular branch location.
11. Providing another offer on a checkout page. For example, if an offer is to buy a new appliance, the method of the present invention includes determining when an appliance or unit is beyond repair and sending a customer to a special offer page to sell an appliance, wherein the determination can be done based on the picture of the appliance tag model/serial number or input of the technician, as well as house address. In some instances, the system of the present invention can analyze and record the conversation between the technician and the customer and using AI determine the best offer that will suit the customer. Multiple appliance stores will have access to the system and based on that, a commission to the technician/company will be determined.

Apple has recently introduced a new feature known as Tap To Pay, enabling individuals to utilize their phone's NFC reader to scan credit cards through a Near Field Communication (NFC) interface, without requiring any additional hardware. This functionality is also available on Android devices. However, a notable challenge lies in the current version's requirement for a merchant to be physically present with both their phone and the cardholder's credit card to initiate a transaction. This type of transaction qualifies for "card present" rates, which boast reduced costs and lower associated risks. To facilitate this process, merchants must install a dedicated app on their device to enable card reading.

In contrast, many merchants often resort to using the less favorable "card not present" rates when processing remote card transactions due to the limitations of the existing setup. Our innovative solution aims to address this issue by empowering cardholders to download an application onto their own smartphones, thereby granting merchants access to the more favorable "card present" rates. As an illustrative scenario, consider a remote cardholder who needs to settle a bill; they would receive a link that allows them to log in using a confirmation code or a dedicated mobile application.

Furthermore, this capability could be mandated for transactions involving larger bill amounts or those characterized by elevated risk and cost profiles. This enhancement not only streamlines remote transactions but also encourages the utilization of "card present" rates, ultimately benefiting both merchants and cardholders alike.

The process of onboarding onto Apple's Tap To Pay feature currently presents challenges and a suboptimal experience for merchants, necessitating the sharing of their personal Apple ID. However, an improved approach has emerged wherein the present invention introduces a streamlined method. In this system, acting as a processor and aggregator, the invention facilitates the creation of an Apple ID dedicated to each merchant. This innovative method significantly enhances the onboarding experience for merchants, eliminating the need for them to provide their personal Apple ID and ensuring a seamless and efficient process.

To ascertain the compatibility of cards with NFC functionality as delineated above, individuals, whether cardholders or merchants, may need to capture an image, video, or scan of the card under specific circumstances.

When the card exhibits visible indications of NFC support, such as an Optical Character Recognition (OCR) scan of the NFC logo or the presence of antenna-related elements and other discernible NFC markers, the merchant or cardholder will be prompted to employ a mobile NFC card application on their smart devices. This enables the reading of the card through NFC technology, resulting in reduced transaction rates and minimized risks. The automated system of the present invention utilizes OCR to determine if the card possesses NFC capabilities; upon confirmation, the client gains the ability to use tap-to-pay functionality.

Additionally, NFC detection can be achieved by employing the Bank Identification Number (BIN), consisting of the initial six digits of the credit card. This BIN-based detection can be accomplished through OCR techniques or by the merchant inputting the card's BIN number.

In summary, the methodology outlined above allows for the identification of NFC-compatible cards, empowering users with optimal payment methods while leveraging automated systems for efficient detection and enhanced transaction experiences.

When utilizing the Tap to Pay functionality on a smart device, such as a phone, smart watch, tablet, etc., the designated application operates as a data processor on behalf of a payment services provider, carrying out tasks in compliance with their provided instructions. Upon initiation of Tap to Pay via a smart device and the launch of a virtual payment terminal, the application gathers essential data required for establishing a valid session. This includes retrieving an encrypted token encompassing identifiers for the payment services provider and the merchant, as well as pertinent merchant details like business name, along with unique identifiers for the virtual payment terminal. Additionally, a secure hardware token indicating the smart device's secure hardware status is gathered by a central server.

Once acquired, the secure hardware token is subjected to validation on the server. If validation is successful, a valid session token is dispatched back to the smart device. This session token becomes instrumental in carrying out subsequent transactions. During the transaction execution process, the smart device encrypts the transaction information and transmits it to the server. Importantly, the server retains the encrypted state of the transaction information and refrains from decrypting its contents.

The server proceeds to authenticate the transaction by employing pertinent details pertaining to the session token, the specific smart device, and the merchant. Notably, the content of the encrypted transaction remains untouched during this authentication process.

Upon successful authentication, an additional layer of transaction security is introduced by the server. This is achieved by altering the encryption key used, effectively replacing it with a key that can solely be decrypted by an authorized payment services partner.

In summary, the process of the present invention outlined above illustrates how the Tap to Pay feature on a smart device collaborates with a server to ensure secure, encrypted, and authenticated transactions while maintaining the confidentiality of transaction details through encryption measures.

The following are two additional tap to pay features in accordance with the embodiments of the present invention.

1. BIN-Based PIN Display for Cost Reduction and Fraud Prevention: to reduce costs and enhance security, the TTP system can generate a Personal Identification Number (PIN) based on the Bank Identification Number (BIN) data of the card. This PIN can be displayed on the customer's smartphone during the transaction. This approach not only adds an extra layer of authentication but also helps in cost reduction and fraud prevention by reducing the need for physical tokens or additional hardware.

2. Merchant Interaction and Transaction Adaptation: in the event that a TTP transaction is canceled by the merchant for various reasons, the system employs a learning mechanism. It collects statistics, learns from interactions, and observes usage patterns. This data allows the system to understand why transactions were canceled. With this knowledge, the system can adapt by either re-running the same transaction or routing it through a different device (e.g., the customer's device instead of the merchant's). This proactive approach aims to increase the percentage of successful TTP transactions, improving overall system efficiency and user experience. These enhancements demonstrate a commitment to both security and user-friendliness in the TTP system, making it a versatile and adaptive solution for modern payment needs.

Due to limitations imposed by check processors on the maximum allowable check amount, instances arise where checks exceeding the stipulated limit face processing issues. For instance, when a check amounting to $10,000 is encountered, it triggers an error code: "DECLINE CHECK WIN LOC $10000." This signifies that the concerned merchant's checking account is subject to a rolling 7-day window restriction, limiting the processing amount to $10,000.

To address this, two practical solutions are identified as per the method of the present invention.

Automatic Delay Mechanism: In cases where the initial deposit of a check is declined due to the aforementioned limit, the system is configured to autonomously detect this situation. Subsequently, the system initiates an automatic delay in processing. This entails scheduling a re-deposit of the check after a period of 7 days, aligning with the merchant's limit renewal. This approach not only ensures adherence to the restriction but also fosters a positive user experience for the merchant by eliminating the need for manual intervention.

Transaction Re-routing Strategy: Alternatively, the system adopts a transaction re-routing strategy. When confronted with a check exceeding the prescribed limit, the system dynamically alters the processing path. Specifically, it re-routes the transaction either from the Check21 process to Automated Clearing House (ACH) processing, or from one Check21 processor (Processor A) to another (Processor B). This strategic re-routing is particularly effective when Processor B is equipped with a higher or unlimited processing limit. By leveraging this approach, the system circumvents processing hurdles while ensuring the successful execution of the transaction.

These workarounds effectively tackle the limitations imposed by check processors' maximum processing thresholds, contributing to enhanced operational fluidity and an improved user experience for merchants.

The majority of cities, including smaller ones, in the United States impose distinct sales taxes. However, for individuals working in the field, accurately tracking these varying sales taxes can be a complex endeavor.

The present invention addresses this challenge by introducing an automated mechanism to incorporate taxes. These taxes can be applied to the entire transaction amount, to specific components like parts or labor, or even separately based on the GPS location where the transaction occurred. This functionality caters to both merchants and customers.

Moreover, this invention's applicability extends to diverse payment methods, encompassing checks, card transactions, digital platforms such as Venmo and PayPal, as well as cash transactions. By accommodating a wide range of payment modes, this innovation ensures comprehensive coverage for tax calculation and application, regardless of the chosen payment avenue.

The system of the present invention has innovated with a new way to collect a signature, tips and reputation by sending customers a link to with a signature screen on their own device. A customer must sign the signature screen and then tap on the "pay" button in order to proceed. However, some customers forget to click the pay button so it's costing the merchant and the customer some time, so there is a faster way to do it. Right after signing the screen the form will detect the end of the user's intention via AI heuristics (such as touch, voice, time delay, user's personal preferences/behaviors) and would automatically submit the form, thus saving time and making it easier for both the merchant and the customer. Hence, by implementing AI heuristics to automatically submit the form after a customer signs the screen, the system of the present invention can save time and make the payment process easier for both the merchant and the customer.

The following is a detailed break down and analysis of the functions of the present invention. 1. Efficiency: automatically submitting the form after the customer signs the screen will potentially save time, as customers won't need to remember to click a separate "pay" button. This could lead to a more streamlined payment process, reducing the chances of abandonment due to user error. 2. User Experience: if the AI heuristics accurately detect the end of the user's intention and submit the form promptly, it could indeed enhance the user experience. Users might find it more convenient and user-friendly, as it eliminates an extra step. 3. Reduced Abandonment: as mentioned above, some customers forget to click the "pay" button, which can result in abandoned transactions. Automatically submitting the form could help reduce abandonment rates and improve conversion rates for merchants. 4. User Preferences and Behaviors: incorporating AI heuristics to detect user behavior and preferences is valuable. According to the embodiments of the present invention, the AI can recognize a consistent pattern of behavior that indicates the user's intention to pay after signing, which could enhance the accuracy of automatic submission. 5. Fallback Mechanism: the system of the present invention provides a fallback mechanism or an option for users to review and confirm their payment before submission. Some users may prefer to double-check their input before finalizing the payment.

In recent times, the Federal Reserve introduced the FedNow real-time payments processing system, primarily supporting push transactions. In this context, push transactions allow only the sender to initiate money transfers. However, it's noteworthy that traditional paper checks involve a pull-type transaction model, where funds are drawn using the physical check as a means of authorization.

The following claim outlines a method that converts a conventional mobile paper check pull transaction into a push transaction. This innovation aligns with the current push-oriented landscape while accommodating pull-type transactions facilitated by paper checks.

Operational Process: When executed, the claim entails the following procedure:

1. Merchant Interaction: Merchant X initiates a transaction request directed towards the check writer's bank.
2. Authorization Inquiry: The check writer's bank, upon receiving the transaction request, promptly sends a text message to the check writer. This message seeks authorization for the transaction amount, such as $xxx.xx, concerning Merchant X.
3. Check Writer's Response: The text message includes an expiration date and solicits the check writer's response on whether the specified transaction is authorized. If affirmative, a six-digit authorization code is provided.
4. Transaction Authorization: In order to grant authorization for the transaction, the check writer employs the provided authorization code to log in to their bank account.
5. Funds Transfer: Effectively, the check writer's involvement culminates in the initiation of a funds transfer, akin to a push transaction, where funds are effectively "pushed" to Merchant X.

The innovative aspect of this method lies in its ability to transform a conventional pull-type paper check transaction into a push transaction, consistent with the contemporary push-based payment landscape.

In a company where secure check transactions are globally activated, and every check transaction necessitates a pre-authorized card on file, there arises a need to have the flexibility to disable secured checks for specific transactions at the user's discretion. The proposed solution of the present invention introduces a new setting for secured check transactions, labeled as "On by default, but switchable to off is allowed." This enhancement enables users to selectively deactivate secured check functionality for specific transactions when deemed necessary.

While Tap to Pay (TTP) transactions offer cost savings with card-present rates and enhanced chargeback protection, some users may hesitate or encounter difficulties in adopting this method. Consequently, card declines present a distinctive opportunity to educate users on using Tap to Pay, as it boasts higher approval rates owing to reduced risk. To capitalize on this opportunity, in accordance with the method of present invention, a solution is proposed wherein, in the event of a transaction decline, users will be presented with the option to revisit the Tap to Pay onboarding flow. This approach aims to encourage users to retry the transaction using Tap to Pay, leveraging its advantages in terms of cost-effectiveness and improved approval rates.

Check21 currently lacks robust protection against check washing, a technique employed by fraudsters to alter information on checks. To address this vulnerability, several measures are proposed in accordance with the method of the present invention. Hidden Image Verification: implement a hidden image on the check to serve as proof that the washed check either originated or did not originate from the storage of the system of the present invention. This embedded image can be a crucial element in validating the authenticity of the check. Watermarking for Alteration Prevention: introduce watermarks on stored check images to thwart unauthorized alterations. For instance, a repeating "void" watermark could be applied either during the deposit process, throughout storage, or upon request when the check is needed. This proactive approach enhances the security of the check and mitigates the risk of tampering.

Owner Retrieval with Enhanced Verification: provide the check owner with the ability to retrieve the original check image through an additional layer of login verification. This added security measure ensures that only authorized individuals can access the original check image, enhancing control and reducing the risk of unauthorized use. By implementing these measures, Check21 can significantly bolster its defenses against check washing and enhance the overall security of stored check images.

(In-streaming application for financial services (or more narrow payments services) for LLM-based operating systems) The advent of real-time, always-on voice and audio Large Language Model (LLM) operating systems has paved the way for the development of an innovative in-stream multimodal financial transaction system. These LLM computing systems leverage various modal triggers within a "context window of LLMs" to seamlessly launch financial applications. An LLM operating system scans the context window for images or videos, recognizing specific triggers that prompt the initiation of an in-stream processing application, facilitating swift and efficient financial transactions. The system supports a variety of payment methods, including: LLM processing of a paper check; LLM processing of a credit card; LLM processing of mobile payments; LLM processing of QR codes; and LLM processing of bank transfers. Eight distinct modalities enhance the user experience, providing a diverse range of input and output channels between the computer and the user: Vision—computer graphics, typically through a screen; Audition—various audio outputs; Tactition—vibrations or other movements; Gustation—incorporating taste; Olfaction—integrating smell; Thermoception—sensing heat; Nociception—recognizing pain; and Equilibrioception—maintaining balance.

This groundbreaking system ensures a seamless and secure financial transaction experience, leveraging the capabilities of LLM-based operating systems and offering users a comprehensive array of input and output modalities.

According to the embodiments of the present invention, a multimodal financial transaction system includes: a. A Large Language Model (LLM) based operating system configured to continuously analyze a context window for multimodal triggers; b. A plurality of payment processing modules integrated into said LLM-based operating system, wherein said payment processing modules include: i. A paper check processing module utilizing LLM processing; ii. A credit card processing module utilizing LLM processing; iii. A mobile payment processing module utilizing LLM processing; iv. A QR code processing module utilizing LLM processing; and v. A bank transfer processing module utilizing LLM processing; and c. A plurality of modalities facilitating diverse channels of input and output between the LLM-based operating system and a user, said modalities including: i. Vision modality for computer graphics through a screen; ii. Audition modality for various audio outputs; iii. Tactition modality for vibrations or other movement; iv. Gustation modality for taste; v. Olfaction modality for smell; vi. Thermoception modality for heat; vii. Nociception modality for pain; and viii. Equilibrioception modality for balance.

The LLM-based operating system is configured to dynamically select an appropriate payment processing module based on the identified multimodal triggers within the context window. The multimodal financial transaction system further includes a user interface module for presenting transaction options and receiving user preferences through any of said modalities. In some instances, the LLM-based operating system is configured to employ natural language understanding to interpret user commands related to financial transactions through any of said modalities.

In accordance with the embodiments of the present invention, a method for conducting multimodal financial transactions includes the steps of: a. Analyzing a context window using a Large Language Model (LLM) based operating system to identify multimodal triggers; b. Selecting an appropriate payment processing module from a plurality of modules, each associated with different payment methods, based on the identified multimodal triggers; c. Initiating a financial transaction utilizing the selected payment processing module; d. Facilitating diverse channels of input and output between the LLM-based operating system and a user through a plurality of modalities.

In some instances, a system for interactive communication with users within an in-streaming financial transaction application can include: a. A Generative Artificial Intelligence (Generative AI) module capable of generating dynamic and context-aware content in various formats, including text, image, video, sound, or combinations thereof; b. An in-streaming financial transaction application integrated with said Generative AI module, wherein the Generative AI module is configured to communicate with users in real-time during financial transactions; c. A communication interface enabling the exchange of information between the Generative AI module and the in-streaming financial transaction application; d. A database storing user profiles, transaction history, and contextual information for facilitating personalized communication through the Generative AI module; and e. A user interaction module within the in-streaming financial transaction application allowing users to engage in a dynamic conversation with the Generative AI module, wherein the conversation pertains to financial services, transaction details, and additional offers.

The system can be configured such that the Generative AI module utilizes natural language processing techniques to understand and respond to user queries and requests in a contextually relevant manner. The system can further include a recommendation engine integrated with the Generative AI module, the recommendation engine configured to analyze user preferences, transaction history, and contextual data to suggest personalized financial services and offers during the conversation. In some instances, the Generative AI module is configured to generate multimedia content, including interactive tutorials, promotional videos, and visual aids, to enhance user understanding of financial services and offers.

A method for interactive communication within an in-streaming financial transaction application, comprising the steps of: a. Employing a Generative AI module to dynamically generate context-aware content in response to user interactions during financial transactions; b. Communicating with users in real-time through the in-streaming financial transaction application, wherein the Generative AI module tailors responses based on user profiles, transaction history, and contextual information; and c. Facilitating a dynamic conversation between users and the Generative AI module, wherein the conversation includes discussions related to financial services, transaction details, and personalized offers.

According to some embodiments of the present invention, a fraud prevention and analysis system for financial services includes: a. A Large Language Model (LLM) based operating system configured to continuously analyze multimodal data from a plurality of independent channels, said multimodal data including: i. Vision data from visual sensors or cameras for capturing images or videos; ii. Auditory data from audio sensors or microphones for processing various audio outputs; iii. Tactile data from tactile sensors or devices capable of detecting vibrations or movement; iv. Gustatory data incorporating taste; v. Olfactory data incorporating smell; vi. Thermoceptive data sensing heat; vii. Nociceptive data recognizing pain; and viii. Equilibrioceptive data maintaining balance; b. A plurality of fraud prevention modules integrated into the LLM-based operating system, wherein said modules include: i. A multimodal biometric authentication module utilizing visual, auditory, and tactile data for user identity verification; ii. A transaction anomaly detection module analyzing transaction patterns using visual, auditory, and tactile data to identify irregularities indicative of fraud; iii. A geospatial analysis module incorporating visual and auditory data to verify the user's physical location during financial transactions; iv. A behavioral analysis module utilizing visual, auditory, and tactile data to assess user behavior and identify aberrations indicative of fraudulent activity; and v. A third-party data integration module fetching external data sources for additional contextual information to enhance fraud detection accuracy; and c. A feedback mechanism facilitating communication with users through any of the modalities to address potential fraud concerns or obtain additional verification.

In some instances, the LLM-based operating system is configured to dynamically adjust fraud prevention strategies based on real-time analysis of multimodal data and external information from third-party data sources. The fraud prevention and analysis system further can include a machine learning component within the LLM-based operating system, the machine learning component continuously evolving based on detected fraud patterns and user interactions. In some instances, the LLM-based operating system is configured to generate real-time alerts or notifications through any of the modalities to inform users or financial institutions of potential fraudulent activities.

A method for preventing and analyzing fraud in financial services, comprising the steps of: a. Continuously collecting multimodal data from a plurality of independent channels, including visual, auditory, and tactile data; b. Analyzing the multimodal data using a Large Language Model (LLM) based operating system and fraud prevention modules to detect and prevent fraudulent activities; c. Integrating third-party data from external sources to enhance contextual understanding and improve fraud detection accuracy; and d. Communicating with users through any of the modalities to address potential fraud concerns or obtain additional verification.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A fraud prevention and analysis system for financial services, comprising:

a computing device comprising at least one processor, a memory, a camera, a microphone, a GPS sensor, a gyroscope, and a near-field communication (NFC) reader, wherein the memory stores instructions that, when executed by the at least one processor, configure the computing device to provide:

a. a Large Language Model (LLM) based operating system configured to continuously analyze multimodal data from a plurality of independent channels, said multimodal data comprising:

i. vision data from visual sensors or cameras for capturing images or videos;

ii. auditory data from audio sensors or microphones for processing various audio outputs;

iii. tactile data from tactile sensors or devices capable of detecting vibrations or movement;

iv. gustatory data incorporating taste;

v. olfactory data incorporating smell;

vi. thermoceptive data sensing heat;

vii. nociceptive data recognizing pain; and viii. equilibrioceptive data maintaining balance;

b. a plurality of fraud prevention modules integrated into the LLM-based operating system, wherein said modules include:

i. a multimodal biometric authentication module utilizing visual, auditory, and tactile data to authenticate an account holder initiating a financial transaction, including verifying login credentials;

ii. a transaction anomaly detection module analyzing transaction patterns using visual, auditory, and tactile data to generate risk assessment data for dispute resolution and fraud detection based on at least transaction data and phone sensor data;

iii. a geospatial analysis module configured to: (1) store a first GPS location in metadata of at least one image of a payment card or check captured by the camera; (2) transmit a link via SMS or email to a cardholder and receive a virtual signature; (3) store signature meta data including a second GPS location at a time of signature capture; and (4) determine a card status comprising a card-present status when the first GPS location and the second GPS location are within a predetermined distance;

iv. a behavioral analysis module utilizing visual, auditory, and tactile data to assess user behavior including, during an NFC reading session, using at least one of the gyroscope to detect micro movements for tap presence and the microphone to record sounds and detect distance from a card to the computing device as proof of transaction; and v. a third-party data integration module fetching external data sources comprising at least one of a credit score, social media profile, IP address history, user-agent history, history of phone calls, connected funding sources, movement of funds between funding sources, email domain, original registration information, or proof of digital identity from blockchain services, for inclusion in the risk assessment data; and c. a feedback mechanism configured to:

(i) pre-validate, via an OCR engine, at least one image captured by the camera to detect blurriness or glare using at least one of (A) computing a Fast Fourier Transform (FFT) and examining a distribution of low and high frequencies and (B) a thresholding glare detection method, and prompt a user to retake the at least one image when blurriness or glare is detected; and (ii) when the card status is the card-present status, convert the card-present status into card-not-present status by executing a non-standard NFC reading algorithm comprising connecting, powering and reading an NFC chip on the card using the NFC reader, querying the NFC chip for its data files, extracting at least one of a primary account number (PAN) and an expiration date from the data files by decoding NFC records encoded in tag-length-value (TLV) format including tag 0x5A, performing a zero-dollar transaction to verify card validity and to store a token, extracting at least one of computing device ID number and phone number, and sending the token and extracted data to a processor for transaction risk reduction and fraud prevention.

2. The fraud prevention and analysis system of claim 1, wherein the LLM-based operating system dynamically adjusts fraud prevention strategies based on real-time analysis of multimodal data and external information from third-party data sources.

3. The fraud prevention and analysis system of claim 1, further comprising a machine learning component within the LLM-based operating system, the machine learning component continuously evolving based on detected fraud patterns and user interactions.

4. The fraud prevention and analysis system of claim 1, wherein the LLM-based operating system generates real-time alerts or notifications through any of the modalities to inform users or financial institutions of potential fraudulent activities.

5. A method for preventing and analyzing fraud in financial services, comprising the steps of:

a. continuously collecting multimodal data from a plurality of independent channels, including visual, auditory, and tactile data including capturing, by a camera of a computing device, at least one image of a payment card or check and storing a first GPS location in metadata of the at least one image;

b. analyzing the multimodal data using a Large Language Model (LLM) based operating system and fraud prevention modules to detect and prevent fraudulent activities including:

(i) pre-validating, via an OCR engine, the at least one image to detect blurriness or glare using at least one of (A) computing a Fast Fourier Transform (FFT) and examining a distribution of low and high frequencies and (B) a thresholding glare detection method, and prompting a user to retake the at least one image when blurriness or glare is detected;

(ii) transmitting a link via SMS or email to a cardholder and receiving a virtual signature, and storing signature meta data including a second GPS location at a time of signature capture;

(iii) determining a card status comprising a card-present status when the first GPS location and the second GPS location are within a predetermined distance; and (iv) when the card status is the card-present status, converting the card-present status into card-not-present status by executing a non-standard NFC reading algorithm comprising connecting, powering and reading an NFC chip on the card, querying the NFC chip for its data files, extracting at least one of a primary account number (PAN) and an expiration date from the data files by decoding NFC records encoded in tag-length-value (TLV) format including tag 0x5A, and performing a zero-dollar transaction to verify card validity and to store a token, extracting at least one of computing device ID number and phone number, and sending the token and extracted data to a processor for transaction risk reduction and fraud prevention;

c. integrating third-party data from external sources comprising at least one of a credit score, social media profile, IP address history, user-agent history, history of phone calls, connected funding sources, movement of funds between funding sources, email domain, original registration information, or proof of digital identity from blockchain services, and generating risk assessment data used for dispute resolution and fraud detection; and d. communicating with users through any of the modalities including at least one of transmitting the prompt to retake the at least one image and transmitting the link via SMS or email for remote virtual signature capture.

* * * * *